US010748005B2

(12) United States Patent
Jung et al.

(10) Patent No.: US 10,748,005 B2
(45) Date of Patent: Aug. 18, 2020

(54) DATA SHARING METHOD AND ELECTRONIC DEVICE THEREFOR

(71) Applicant: Samsung Electronics Co., Ltd., Gyeonggi-do (KR)

(72) Inventors: Do-Young Jung, Suwon-si (KR); Sung-Rok Yoon, Seoul (KR); Seok-Yong Lee, Seoul (KR); Ohyun Jo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 15/505,234

(22) PCT Filed: Aug. 20, 2015

(86) PCT No.: PCT/KR2015/008679
§ 371 (c)(1),
(2) Date: Feb. 20, 2017

(87) PCT Pub. No.: WO2016/028093
PCT Pub. Date: Feb. 25, 2016

(65) Prior Publication Data
US 2018/0218220 A1  Aug. 2, 2018

(30) Foreign Application Priority Data
Aug. 20, 2014 (KR) .................. 10-2014-0108429

(51) Int. Cl.
G06K 9/00 (2006.01)
H04W 52/04 (2009.01)
(Continued)

(52) U.S. Cl.
CPC ......... G06K 9/00677 (2013.01); G06F 3/005 (2013.01); G06K 9/00221 (2013.01);
(Continued)

(58) Field of Classification Search
CPC .......... G06K 9/00677; G06K 9/00221; G06K 9/00979; H04W 4/023; H04W 52/04;
(Continued)

(56) References Cited

U.S. PATENT DOCUMENTS 8,339,500 B2 * 12/2012 Hattori ................. G11B 27/034
348/207.1
8,458,753 B2 * 6/2013 Hasek ................. H04N 7/17309
725/86
(Continued)

FOREIGN PATENT DOCUMENTS

CN  103370922 A  10/2013
CN  103634559 A   3/2014
(Continued)

OTHER PUBLICATIONS

Kurashige, H., "Imaging Apparatus," English translation of Japanese Patent Publication JP2013211742(A), published Oct. 10, 2013.*
(Continued)

Primary Examiner — Xuemei G Chen

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. The present disclosure relates to share data among electronic devices, a method for operating an electronic device includes determining an area where at least one other electronic device to share data is located based on an angle of view of a camera and a distance from a subject, transmitting a signal for identifying the at least one other electronic device located in the area, and transmitting the data to
(Continued)

the at least one other electronic device. In addition, the present disclosure includes different embodiments other than above embodiment.

20 Claims, 39 Drawing Sheets

(51) Int. Cl.
| | |
|---|---|
| *H04W 4/08* | (2009.01) |
| *H04W 4/02* | (2018.01) |
| *H04L 29/08* | (2006.01) |
| *G06F 3/00* | (2006.01) |
| *H04N 1/00* | (2006.01) |
| *H04W 8/00* | (2009.01) |
| *H04W 4/70* | (2018.01) |
| *H04W 4/80* | (2018.01) |

(52) U.S. Cl.
CPC .......... *G06K 9/00979* (2013.01); *H04L 67/16* (2013.01); *H04N 1/00183* (2013.01); *H04N 1/00336* (2013.01); *H04W 4/023* (2013.01); *H04W 4/08* (2013.01); *H04W 52/04* (2013.01); *H04W 4/70* (2018.02); *H04W 4/80* (2018.02); *H04W 8/005* (2013.01)

(58) Field of Classification Search
CPC .......... H04W 4/08; H04W 4/80; H04W 4/70; H04W 8/005; H04L 67/16; H04N 1/00336; H04N 1/00183; G06F 3/005
USPC .......... 345/158, 175, 473; 348/207.1, 208.7, 348/135, 162; 370/216, 331; 455/457, 455/461; 701/454; 715/53, 753; 726/4
See application file for complete search history.

(56) References Cited

U.S. PATENT DOCUMENTS

| | | | | |
|---|---|---|---|---|
| 9,172,905 | B2* | 10/2015 | Song | H04N 7/141 |
| 9,426,568 | B2* | 8/2016 | Lakkundi | H04R 3/005 |
| 9,538,444 | B2* | 1/2017 | Kuwabara | H04W 36/22 |
| 9,563,265 | B2* | 2/2017 | You | G06F 3/167 |
| 9,609,033 | B2* | 3/2017 | Hong | H04L 65/403 |
| 9,679,477 | B2* | 6/2017 | Cho | B60R 1/00 |
| 9,825,774 | B2* | 11/2017 | Park | H04L 12/2825 |
| 10,097,792 | B2 | 10/2018 | Song et al. | |
| 10,372,307 | B2 | 8/2019 | Pastor et al. | |
| 2007/0117576 | A1* | 5/2007 | Huston | A63B 24/0021 |
| | | | | 455/461 |
| 2008/0154494 | A1* | 6/2008 | Kato | G01C 21/3638 |
| | | | | 701/454 |
| 2008/0309772 | A1* | 12/2008 | Ikeda | G03B 5/00 |
| | | | | 348/208.7 |
| 2010/0036967 | A1 | 2/2010 | Caine et al. | |
| 2010/0060575 | A1* | 3/2010 | Ohta | A63F 13/10 |
| | | | | 345/158 |
| 2010/0067631 | A1* | 3/2010 | Ton | H04L 51/38 |
| | | | | 375/358 |
| 2012/0072971 | A1* | 3/2012 | Zhang | H04W 4/08 |
| | | | | 726/4 |
| 2012/0149304 | A1* | 6/2012 | Baliga | H04M 1/7253 |
| | | | | 455/41.2 |
| 2013/0013683 | A1 | 1/2013 | Elliott | |
| 2013/0027353 | A1* | 1/2013 | Hyun | G06F 3/041 |
| | | | | 345/175 |
| 2013/0135315 | A1* | 5/2013 | Bares | G06T 13/20 |
| | | | | 345/473 |
| 2013/0194438 | A1 | 8/2013 | Sweet, III et al. | |
| 2013/0282793 | A1 | 10/2013 | Swings et al. | |
| 2013/0332156 | A1* | 12/2013 | Tackin | H04M 1/6041 |
| | | | | 704/226 |
| 2013/0345978 | A1* | 12/2013 | Lush | G01C 21/3461 |
| | | | | 701/533 |
| 2014/0040829 | A1 | 2/2014 | Pastor et al. | |
| 2014/0223028 | A1* | 8/2014 | Peng | H04L 67/10 |
| | | | | 709/246 |
| 2015/0033150 | A1* | 1/2015 | Lee | H04N 5/23206 |
| | | | | 715/753 |
| 2015/0036000 | A1* | 2/2015 | Cho | G06F 1/1686 |
| | | | | 348/207.1 |
| 2015/0055158 | A1* | 2/2015 | Ogata | H04N 1/0035 |
| | | | | 358/1.13 |
| 2015/0128070 | A1* | 5/2015 | Lee | G06Q 50/10 |
| | | | | 715/753 |
| 2015/0131616 | A1* | 5/2015 | Jo | H04W 16/28 |
| | | | | 370/331 |
| 2015/0181137 | A1* | 6/2015 | Terashima | G01S 17/89 |
| | | | | 348/162 |
| 2015/0325201 | A1* | 11/2015 | Toba | G09G 5/003 |
| | | | | 345/520 |
| 2016/0080194 | A1* | 3/2016 | Tsutsui | H04W 16/14 |
| | | | | 370/216 |
| 2016/0205501 | A1* | 7/2016 | Lee | H04W 8/005 |
| | | | | 455/457 |
| 2016/0292922 | A1* | 10/2016 | Kasahara | G06F 3/1454 |
| 2016/0316480 | A1* | 10/2016 | Oh | H04B 7/0608 |
| 2016/0377426 | A1* | 12/2016 | Kim | G01C 3/08 |
| | | | | 348/135 |
| 2017/0126907 | A1* | 5/2017 | Tamura | H04N 5/225 |

FOREIGN PATENT DOCUMENTS

| | | |
|---|---|---|
| CN | 103635892 A | 3/2014 |
| JP | H02103005 A | 4/1990 |
| JP | 2011135380 A | 7/2011 |
| JP | 2011155385 A | 8/2011 |
| JP | 2012235282 A | 11/2012 |
| JP | 2013211742 A | 10/2013 |

OTHER PUBLICATIONS

Supplementary European Search Report dated Feb. 7, 2018 in connection with European patent Application No. 15 83 3464.
IEEE Std. 802.11™, "Part 11: Wireless LAN Medium Access Control (MAC) and Physical Layer (PHY) Specifications," IEEE Standard for Information technology—Telecommunications and information exchange between systems Local and metropolitan area networks—Specific requirements, 2012, 2793 pages, publisher IEEE, New York, NY.
IEEE Std 802.11ad™, "Part 11: Wireless LAN Medium Access Control (MAC) and Physical Layer (PHY) Specifications," Amendment 3: Enhancements for Very High Throughput in the 60 GHz Band, Dec. 28, 2012, 628 pages, publisher IEEE, New York, NY.
Antenna, "The Basic of RF," Corner Book, Jan. 1, 2009, 34 pages, available at http://www.rfdh.com/bas_rf/begin/antenna.php3.
China National Intellectual Property Administration, "The First Office Action," Application No. CN201580054529.4, dated Sep. 25, 2019, 22 pages.
Examination report in connection with Indian Application No. 201737008864 dated Jun. 24, 2020, 6 pages.

* cited by examiner

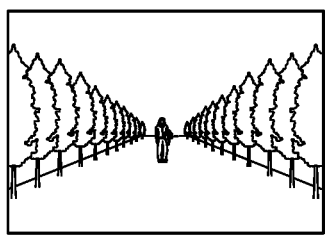 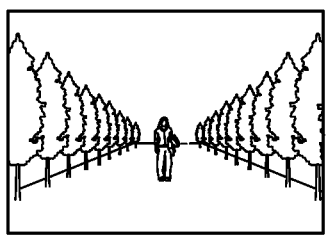 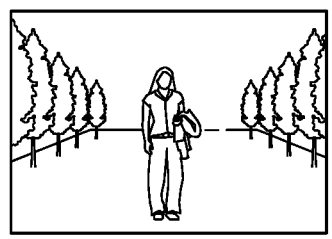
FIG.5A  FIG.5B  FIG.5C
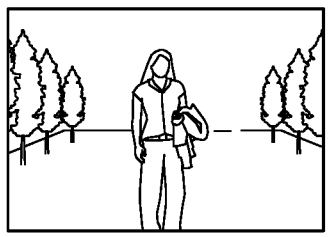 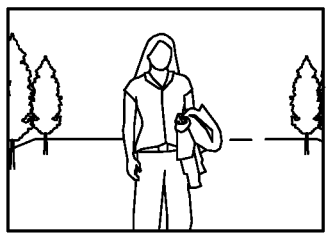 
FIG.5D  FIG.5E  FIG.5F

| ELEMENT ID ~2702 | LENGTH ~2704 | GROUP LIFETIME ~2706 | LIFETIME UNIT ~2708 |
|---|---|---|---|

FIG.27

| ┌2802 | ┌2804 | ┌2806 | ┌2808 | ┌2810 |
|---|---|---|---|---|
| TYPE | USER ID | SOURCE TYPE | RESOLUTION | COMPRESSION TYPE |

FIG.28A

| ┌2812 | ┌2814 | ┌2816 | ┌2818 |
|---|---|---|---|
| TYPE | USER ID | RESOLUTION SELECT | COMPRESSION TYPE SELECT |

FIG.28B

| ┌2822 | ┌2824 | ┌2826 | ┌2828 |
|---|---|---|---|
| ELEMENT ID | LENGTH | SUPPORTED RESOLUTION | SUPPORTED COMPRESSION TYPE |

FIG.28C

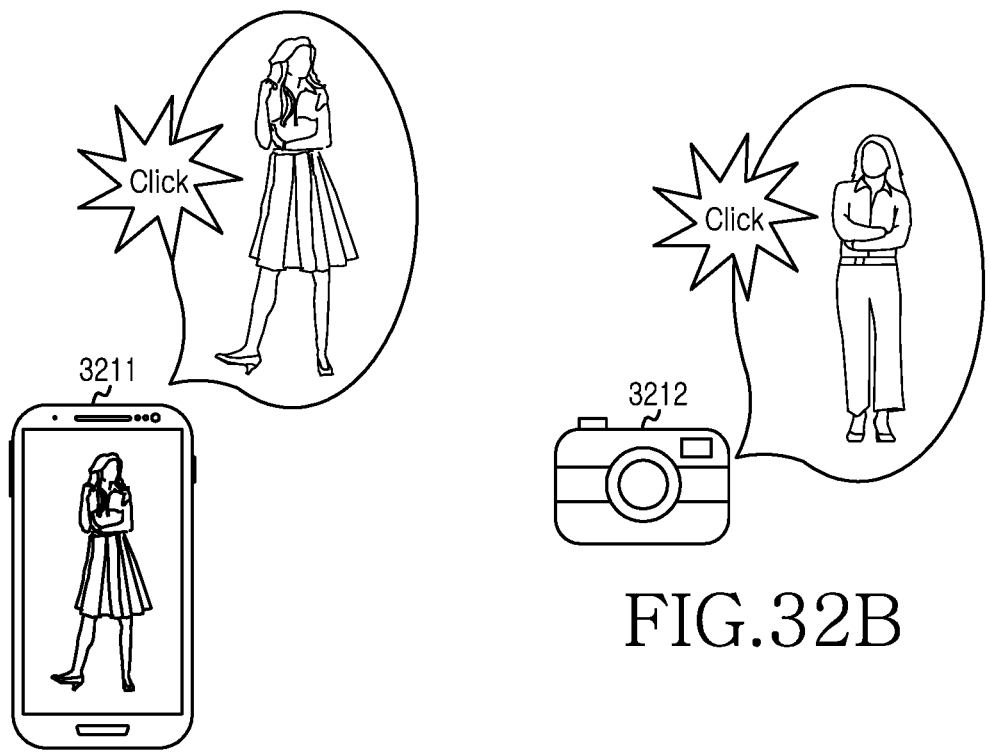
FIG.32A
FIG.32B
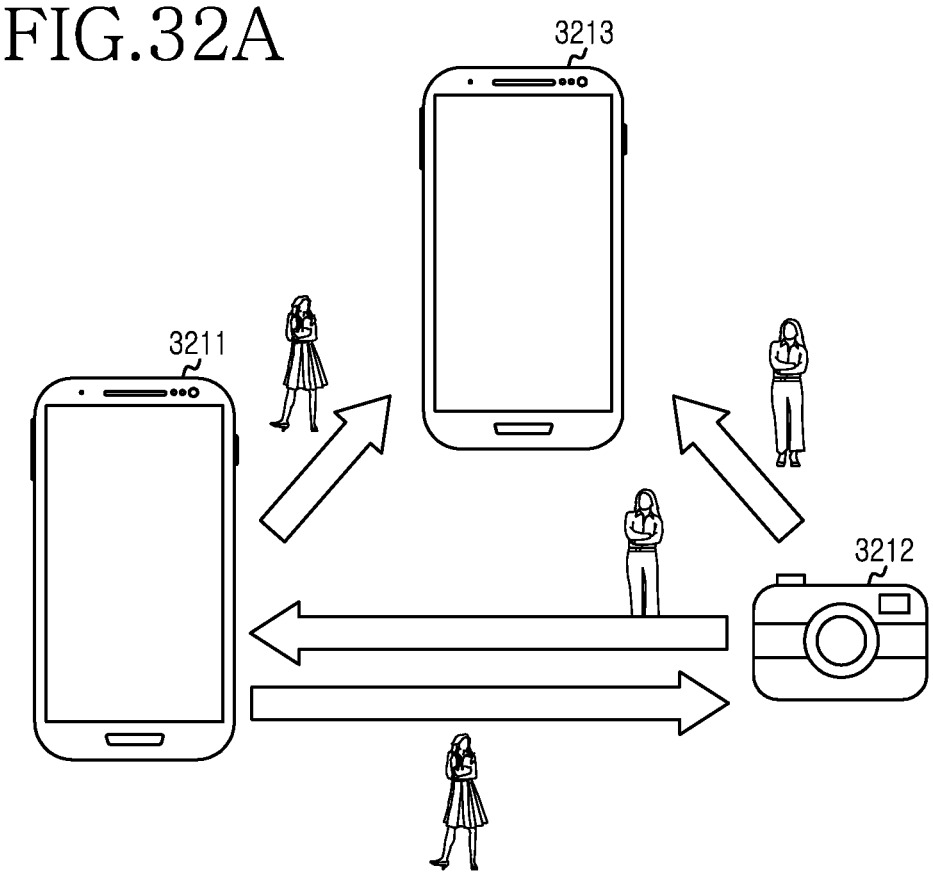
FIG.32C

DATA SHARING METHOD AND ELECTRONIC DEVICE THEREFOR

CROSS-REFERENCE TO RELATED APPLICATIONS AND CLAIM OF PRIORITY

The present application claims priority under 35 U.S.C. § 365 to International Patent Application No. PCT/KR2015/008679, which was filed on Aug. 20, 2015, and claims a priority to Korean Patent Application 10-2014-0108429, which was filed on Aug. 20, 2014, each of which are incorporated herein by reference into the present disclosure as if fully set forth herein.

TECHNICAL FIELD

The present invention relates to data sharing between electronic devices.

BACKGROUND ART

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Further, according to advance of a communication technology and enhancement of hardware performance, services provided using an electronic device offer more diversity. For example, various services based on data sharing between multiple electronic devices are developed. The data sharing provides contents stored or created in one electronic device to at least one other electronic device, and thus multiple electronic devices can consume the same contents. Specifically, video contents stored in one electronic device are shared with another electronic device having a larger screen, and thus a user can view the video contents on the larger screen. Also, image contents captured by one electronic device can be shared with other electronic devices of users who are subjects. Also, to simply provide particular data to other electronic device, a service based on the data sharing can be used.

As the communication technology advances and is generalized, the data sharing can be conducted through a wired/wireless communication means. Generally, when a user A is to share data with a user B, the following process can be performed. First, the data sharing can be conducted via a sharing server on Internet. In this case, when the user B for receiving the data is registered in the sharing server, the user A of an electronic device which provides the data can scan and select the user B, and create a sharing group. However, when the user B is not registered in the sharing server, the user B registers as a user in the sharing server and the data sharing is feasible after a registration IDentification (ID) of the user B is obtained. Practically, it is hard to share data regardless of the registration in the sharing server and the registration ID acquisition. Secondly, the data sharing can be conducted using a short-range wireless network. In this case, as the electronic device of the user A serves as an Access Point (AP) and the electronic device of the user B serves as a station, a communication connection can be established and then data can be shared. Notably, in this case, pre-registration in the sharing server and the registration ID acquisition are not necessary as in the aforementioned example, but a wireless initial connection procedure defined in a corresponding wireless communication technology is required. To simplify the initial connection procedure, a sharing group method using Near Field Communication (NFC) tagging which is one of Out-Of-Band (OOB) technologies or using Personal Identification Number (PIN) is suggested. However, it is still inconvenient to physically contact for the NFC tagging, or to share and input the PIN.

As discussed above, the data sharing via the sharing server on the Internet limits a target for receiving data, to a pre-registered user. Also, the data sharing using the short-range wireless network carries a procedural burden in conducting the inconvenient wireless initial connection procedure.

DISCLOSURE OF INVENTION

Technical Problem

An embodiment of the present invention provides a method for sharing data and an electronic device thereof.

Another embodiment of the present invention provides a method for creating a group for data sharing and an electronic device thereof.

Yet another embodiment of the invention provides a method for sharing data based on a relative location of other electronic device and an electronic device thereof.

Still another embodiment of the present invention provides a method for sharing data using beamforming and an electronic device thereof.

A further embodiment of the present invention provides a method for determining a data sharer using beamforming and an electronic device thereof.

A further embodiment of the present invention provides a method for sharing data using a camera angle of view and a focal length, and an electronic device thereof.

A further embodiment of the present invention provides a method for determining a data sharer using a camera angle of view and a focal length, and an electronic device thereof.

A further embodiment of the present invention provides a method for providing an intuitive User Interface (UI)/User Experience (UX) to a user while creating a sharing group, and an electronic device thereof.

Solution to Problem

An operating method of an electronic device according to an embodiment of the present invention includes determining an area where at least one other electronic device to share data is located based on an angle of view of a camera and a distance from a subject, transmitting a signal for identifying the at least one other electronic device located in the area, and transmitting the data to the at least one other electronic device.

An operating method of a control node which provides a wireless connection in a multi-access network according to another embodiment of the present invention includes receiving information for determining an area specified by an angle of view of a camera of a first electronic device and a distance from a subject, from the first electronic device, and transmitting information of a second electronic device located in the area, to the first electronic device.

An electronic device according to yet another embodiment of the present invention includes a camera including a lens and an image sensor, a control unit for determining an area where at least one other electronic device to share data is located based on an angle of view of the camera and a distance from a subject; and a transmitting unit for transmitting a signal for identifying the at least one other electronic device located in the area, and transmitting the data to the at least one other electronic device.

An apparatus of a control node which provides a wireless connection in a multi-access network according to still another embodiment of the present invention includes a receiving unit for receiving information for determining an area specified by an angle of view of a camera of a first electronic device and a distance from a subject, from the first electronic device, and a transmitting unit for transmitting information of a second electronic device located in the area, to the first electronic device.

Advantageous Effects of Invention

Since an electronic device shares data using a wireless communication function and an image acquisition function through a lens, convenience of content sharing can be greatly enhanced.

BRIEF DESCRIPTION OF DRAWINGS

FIG. 5 depicts an example of image changes based on a focal length in an electronic device according to an embodiment of the present invention.

FIG. 27 depicts a configuration example of group lifetime information according to an embodiment of the present invention.

FIG. 28 depicts a configuration example of control information for sharing in consideration of electronic device characteristics according to an embodiment of the present invention.

FIG. 32 depicts an example of data sharing using a lifetime in an electronic device according to an embodiment of the present invention.

BEST MODE FOR CARRYING OUT THE INVENTION

Figure 1:
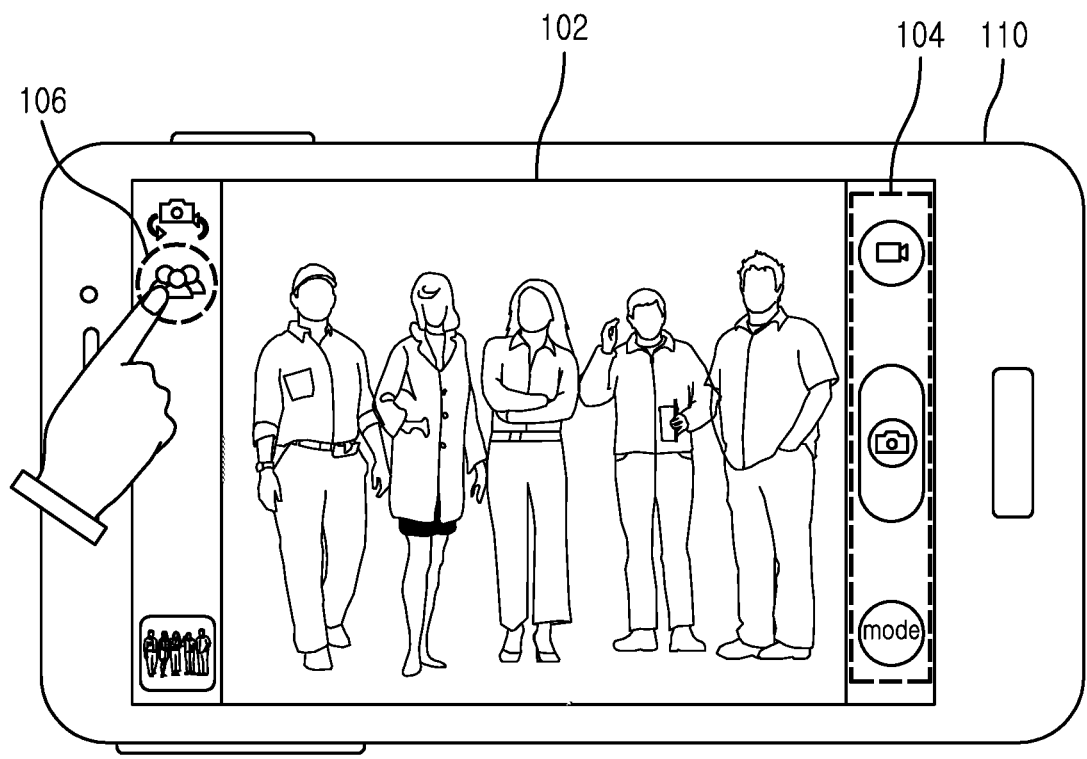
FIG. 1 depicts an example of a photographing interface of an electronic device according to an embodiment of the present invention.

Hereinafter, an operational principle of the present invention is described in detail with reference to the accompanying drawings. In the following explanations, well-known functions or constitutions will not be described in detail if they would unnecessarily obscure the subject matter of the present invention. Also, terminologies to be described below are defined in consideration of functions in the present invention and can vary depending on a user's or an operator's intention or practice. Thus, their definitions should be defined based on all the contents of the specification.

Hereinafter, a technique for sharing data in an electronic device is explained. Specifically, the present invention now describes various embodiments for a procedure for determining other electronic devices for data sharing, and a procedure for sharing data with the selected electronic devices.

In the following, the electronic device can be a portable electronic device, and can be one of a smart phone, a portable terminal, a mobile phone, a mobile pad, a media player, a tablet computer, a handheld computer, or a Personal Digital Assistant (PDA). Also, the electronic device can be a device which combines two or more functions of those devices.

Hereafter, to ease the understanding, the present invention explains various embodiments using photographing as an example. Specifically, the present invention provides embodiments for wirelessly sharing media data captured or pre-stored in an electronic device having a wireless communication function and a camera function, with another electronic device having a wireless communication function. More specifically, the present invention explains embodiments for intelligently creating and managing a group for data sharing so as to share media data captured using the camera function or pre-stored data with other user. However, various embodiments of the present invention can be realized to share data of any type. That is, various embodiments of the present invention are not limited to the data type.

Hereafter, terms for identifying signals, terms for indicating network entities, terms for indicating contents, terms for indicating network types, and terms for indicating items of control information are used to ease the understanding. Accordingly, the present invention is not limited to those terms and can adopt other terms indicating targets having technically equivalent meaning.

A problem which can typically occur in sharing a captured image in an electronic device is as follows.

A portable electronic device such as a smart phone generally has a wireless communication function and a camera function, and sharing of captured data (e.g., photo, video, etc.) can be widely utilized using the wireless communication function. For example, the sharing of the media data can be used to, after making photo and video data, provide the captured photo and video to targets captured, that is, to subjects. However, unlike data sharing using a wired communication technology, the sharing through the wireless communication technology does not connect a physical communication line. Accordingly, to restrict a sharer and a range, a separate procedure for creating a sharing group for the data sharing and managing the sharing group is additionally required.

A sharing process including the sharing group creation is described in brief as follows. A photographer shoots a photo and a video and then selects data to share from the stored data. Next, after a sharing group is created by the photographer, the selected data is wirelessly provided to the sharing group. The sharing group can be set by using a sharing server (e.g., Social Network Service (SNS), a message service, etc.) on Internet, or using a short-range communication network (e.g., wireless Local Area Network (LAN), Bluetooth, etc.).

Using the wireless LAN, an electronic device of the photographer operates in an Access Point (AP) mode, and an electronic device of the other party who desires the sharing operates in a station mode. Herein, the electronic device operating in the AP mode can be referred to as a 'Personal basic service set Central Point (PCP)'. Electronic device operating in the station mode generate an AP list by scanning all of available channels and displays it for the user. When the user selects an intended AP, that is, an AP having data to share from the AP list, the electronic device performs a connection procedure. However, the AP list is displayed based on Service Set Identification (SSID). Thus, when a plurality of APs is scanned, it is not easy for the user to select his/her intended AP.

To address the difficulty in the AP selection, Near Field Communication (NFC) tagging or password (e.g., Personal Identification Number (PIN)) input method can be considered instead of user's selecting the SSID. However, since all the methods such as NFC tagging also require an additional sharing group creation procedure from the photographer or the subject, it makes the data sharing more difficult due to the inconvenient sharing group creation.

Further, the aforementioned data sharing technique cannot immediately check the sharing data. In other words, when taking a picture, it is hard to construct a scenario of checking the captured image and immediately taking a picture again on the spot. Also, since the aforementioned data sharing technique needs to select data to share one by one from pre-stored data, it is not suitable for an environment where sharers and sharing contents dynamically change. For example, in a venue such as wedding hall or graduation, when a plurality of photographers takes pictures of different subject groups and share only photos captured from a corresponding subject group in the corresponding group, it is hard to apply all of the aforementioned data sharing techniques.

Also, the aforementioned data sharing techniques do not provide a function for managing a plurality of sharing groups at the same time. Further, once the sharing group is determined, the sharing group cannot be dynamically changed and cannot be easily reused.

Due to the above-stated problems, even when the user has an electronic device having the data sharing function through the wireless communication function, the inconvenience still exists on account of the complicated procedure for the data sharing. Hence, the present invention explains various embodiments for the data sharing technique which minimizes the user's intervention.

The data sharing technique according to an embodiment of the present invention has features in terms of the content sharing and in terms of User Experience (UX). In terms of the content sharing, an electronic device includes subjects to share into a view finder range or a preview screen range of a camera, and automatically creates a sharing group, that is, without user's intervention. The electronic device can freely share contents within the sharing group. That is, in the conventional photographing process, a procedure for creating the sharing group is added before the photographing. In terms of the user UX, the electronic device can create the sharing group through the conventional photographing User Interface (UI)/UX and thus provide convenience in creating and changing the sharing group.

FIG. 1 depicts an example of a photographing interface of an electronic device according to an embodiment of the present invention. FIG. 1 shows an example of a UI/UX for the photographing.

Referring to FIG. 1, an electronic device 110 includes a display means. The display means is a touch screen, and can have a function of an input means. However, according to another embodiment of the present invention, the electronic device 110 can include a separate input means physically separated from the display means. Alternatively, the electronic device 110 can further include an input means physically separated, in addition to the touch screen.

In FIG. 1, the electronic device 110 can execute an application for the photographing and thus operate in a photographing mode. In this case, the electronic device 110 displays a preview image 102 and at least one photographing control button 104. Also, according to an embodiment of the present invention, the electronic device 110 can display a button 106 for creating a sharing group.

The button 106 is an example of the interface for recognizing a user's command for the data sharing according to an embodiment of the present invention. According to various embodiments of the present invention, the user's command for the data sharing can be input in other manner than the button 106. For example, the user's command can be defined in the form of a voice, a motion pattern, and so on. For example, the procedure for the data sharing can be performed without a user's explicit command.

Figure 2:
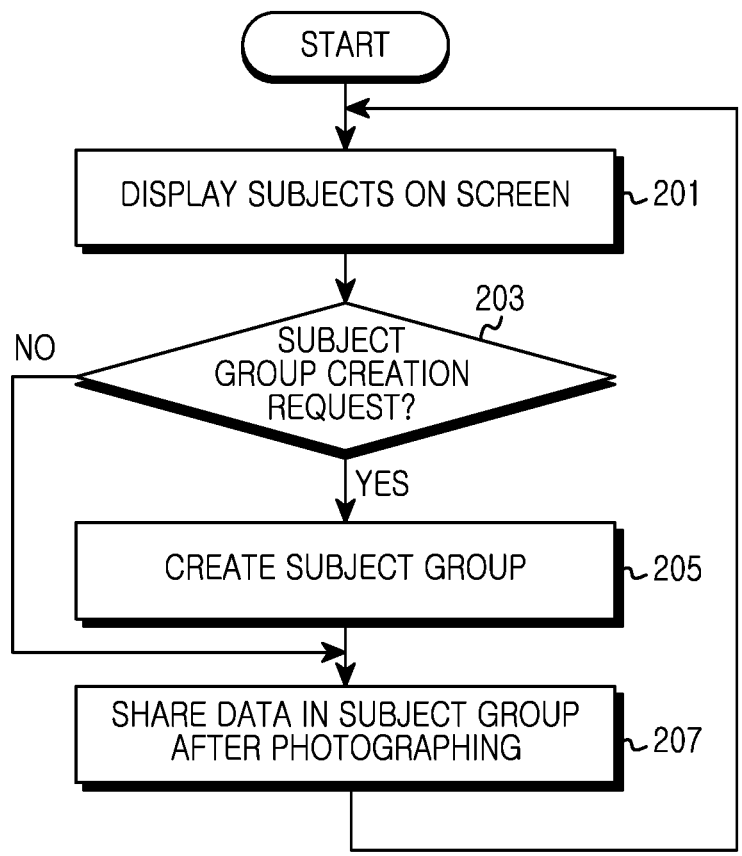
FIG. 2 depicts a data sharing procedure in an electronic device according to an embodiment of the present invention.

FIG. 2 depicts a data sharing procedure in an electronic device according to an embodiment of the present invention. FIG. 2 depicts the data sharing procedure of a photographer. FIG. 2 depicts an operating method of the electronic device.

Referring to FIG. 2, the electronic device displays subjects on a screen in step 201. In other words, the electronic device displays a preview image through the display means. The preview image indicates an image currently input through a camera of the electronic device, that is, an image input to an image sensor. That is, when the user executes a photographing function, the electronic device displays the subjects in an angle of view through the display means.

Next, the electronic device determines whether a subject group creation request occurs in step 203. The subject group can be referred to as a 'sharing group'. The subject group creation request can be generated by a user's manipulation. For example, the subject group creation request can be determined through pressing of a button defined for the subject group creation, detection of an audio pattern, and other particular sensor. For example, when the UI/UX of FIG. 1 is displayed, the electronic device determines whether the button for the subject group creation is pressed. According to another embodiment of the present invention, the step 203 can be omitted. For example, the subject group creation request can be automatically processed.

When the subject group creation request occurs, the electronic device creates a subject group in step 205. The subject group includes subjects for sharing data. Hence, the subject group can be referred to as a 'sharing group'. The subject group can be determined based on the current angle of view of the camera, and a distance from the subject.

Next, the electronic device shares data in the subject group after the photographing in step 207. That is, the electronic device conducts the photographing according to the user command and then transmits the captured contents (e.g., photo, video) to at least one other electronic device of the subject group. According to another embodiment of the present invention, the step 205 can be omitted. In this case, the electronic device can transmit the contents to the at least one other electronic device belonging to the created sharing group.

When the captured photo is shared, the sharing group can frequently change. For example, in the event such as wedding or graduation, when different subjects are captured, when a new user participates in the existing sharing group, or when the existing user leaves, the sharing group can be created. Thus, a procedure for not only creating the sharing group but also dynamically managing is demanded.

Figure 3:
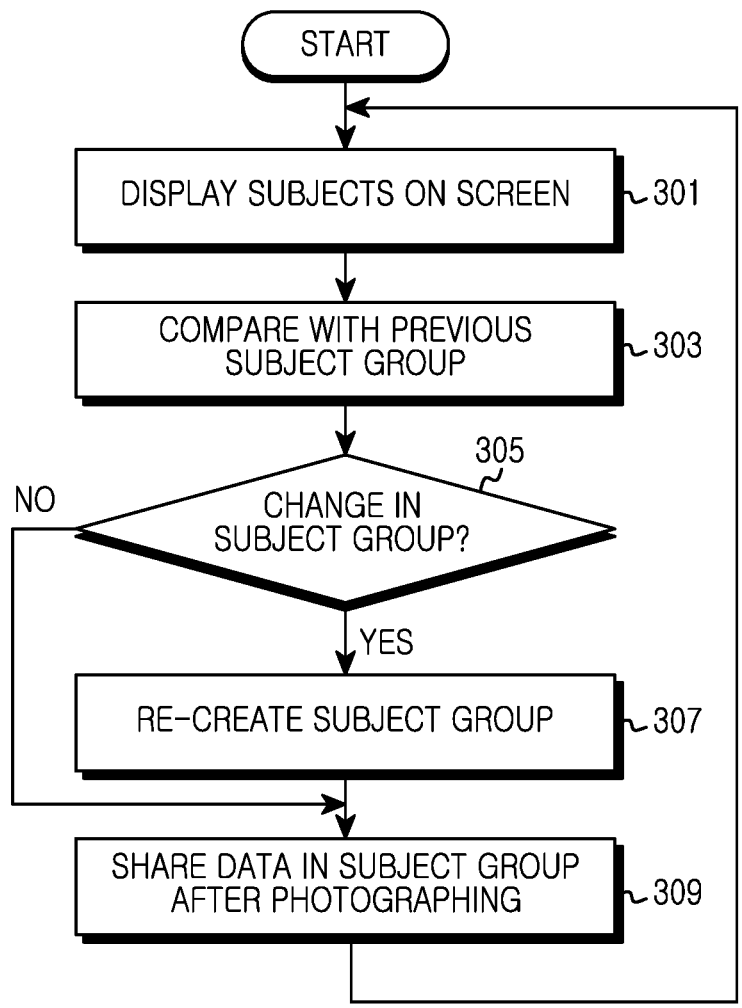
FIG. 3 depicts a data sharing procedure in an electronic device according to another embodiment of the present invention.

The data sharing procedure when the sharing group is changed can be conducted as shown in FIG. 3. FIG. 3 depicts a data sharing procedure in an electronic device according to another embodiment of the present invention. FIG. 3 depicts an operating method of the electronic device.

Referring to FIG. 3, the electronic device displays subjects on a screen in step 301. In other words, the electronic device displays a preview image through the display means. The preview image indicates an image currently input through a camera of the electronic device, that is, an image input to an image sensor.

Next, the electronic device compares a current subject group and a previous subject group in step 303. That is, the electronic device creates the subject group and compares with the subject group previously created. For example, the electronic device can compare the number of subject users by recognizing faces of persons on the preview image. For example, the electronic device can compare at least one other electronic device belonging to the current subject group and at least one other electronic device belonging to the previous subject group. Herein, the other electronic device can be identified using a user name, device ID information, a phone number, and network identification information (e.g., Media Access Control (MA) address, Internet Protocol (IP) address, etc.) of the corresponding electronic device.

Next, the electronic device determines whether the subject group is changed in step 305. For example, according to a comparison result of the step 303, the electronic device can determine whether the current subject group includes other electronic device or other user which or who is not included in the previous subject group, or whether the current subject group does not include other electronic device or other user which or who is included in the previous subject group. For example, the electronic device can determine the change of the subject group according to a user's command. That is, the user can directly determine the change of the subject group and input the subject group change to the electronic device. In this case, the step 303 can be omitted. When the subject group is not changed, the electronic device goes to step 309.

By contrast, when the subject group is changed, the electronic device re-creates the subject group in step 307. For doing so, the electronic device can perform the procedure for creating the subject group again. Alternatively, the electronic device can display a UI for changing the subject group through the display means, and modify the subject group according to a user's command.

Next, the electronic device shares data in the subject group after the photographing in step 309. That is, the electronic device conducts the photographing according to the user command and then transmit captured contents (e.g., photo, video) to at least one other electronic device of the subject group.

To provide the UI/UX and the data sharing procedure as above, embodiments of the present invention can use the angle of view of the camera, a focal length, and a distance from the subject. The angle of view indicates an angle of the camera for receiving light through a lens. That is, the angle of view indicates the angle for the photographer to observe through the view finder of the camera. The focal length indicates a distance from an optical center of the lens to a principal focus (e.g., a surface of a film in a film camera, an image sensor in a digital camera). A relation of the angle of view of the camera and the focal length is as follows.

Figure 4:
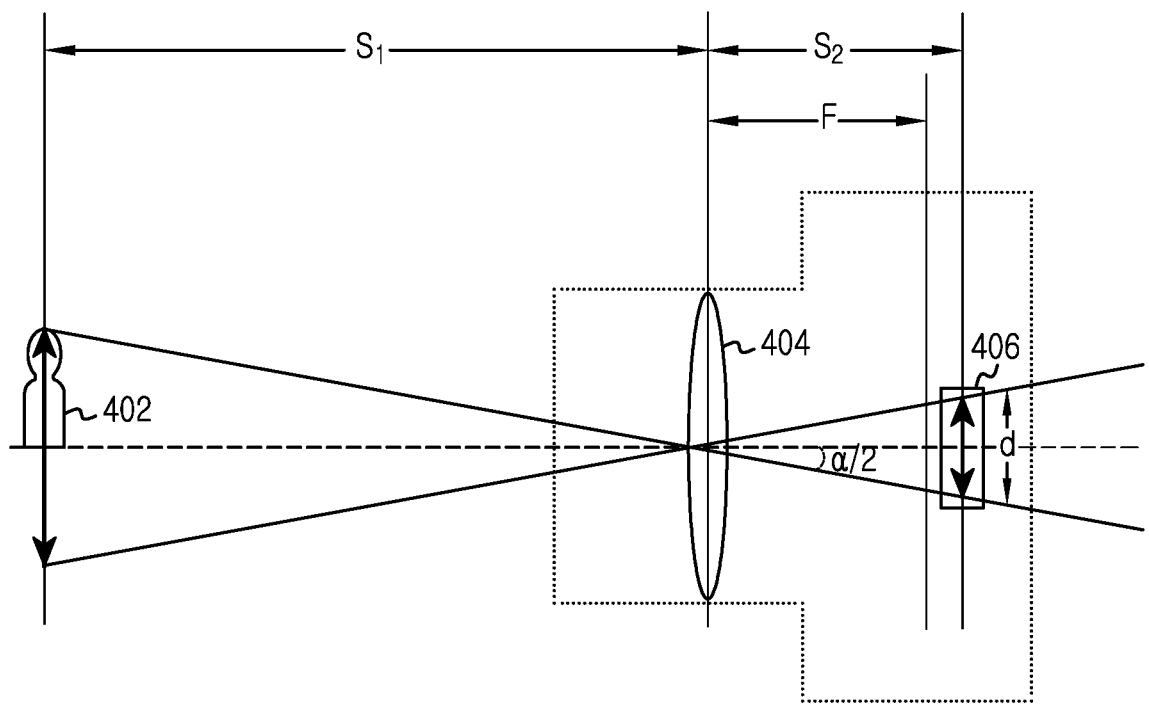
FIG. 4 depicts a relation of an angle of view and a focal length of a camera in an electronic device according to an embodiment of the present invention.

FIG. 4 depicts a relation of an angle of view of a camera and a focal length in an electronic device according to an embodiment of the present invention. Referring to FIG. 4, the camera includes a lens 404 and an image sensor 406. In FIG. 4, $S_1$ denotes a distance between the lens 404 and a subject 402, $S_2$ denotes a distance between the lens 404 and the image sensor 406 after autofocusing, and F denotes the focal length. That is, the autofocusing is a technology which controls a focus of an image according to a given algorithm without user's intervention. Based on the autofocusing, at least one location of the lens 404 and the image sensor 406 can change. In so doing, the actual distance between the lens 404 and the image sensor 406 after the autofocusing is expressed as $S_2$. F, which is the focal length which determines the angle of view of the camera, is a fixed value regardless of the autofocusing. Relations of $S_1$, $S_2$, and F are shown in Equation 1.

$$\tan\frac{\partial}{2} = \frac{d/2}{S_2}, \partial = 2\tan^{-1}\frac{d}{2S_2}, \partial = 2\tan^{-1}\frac{d}{2F}$$ Equation 1

In Equation 1, $\partial$ denotes the angle of view, d denotes a size of the image sensor 406, $S_2$ denotes the distance between the lens 404 and the image sensor 406 after the autofocusing, and F denotes the focal length corresponding to the angle of view.

A relation of the distance from the subject 402 and the focal length is shown in Equation 2.

$$\frac{1}{S_1} + \frac{1}{S_2} = \frac{1}{F}, \frac{1}{S_1} = \frac{1}{F} - \frac{1}{S_2}, S_1 = \frac{F \times S_2}{S_2 - F}$$ Equation 2

In Equation 2, $S_1$ denotes the distance between the lens 404 and the subject 402, $S_2$ denotes the distance between the lens 404 and the image sensor 406 after the autofocusing, and F denotes the focal length corresponding to the angle of view. F denotes the focal length of the lens corresponding to the angle of view when the subject is located infinitely far away, that is, when $S_1$ is close to infinity. In this case, $S_2$ and F have the same value in Equation 2. However, in reality, since $S_1$ does not have the infinite value, $S_2$ and F have different values. Also, in a zoom lens, for the focusing, it is required to adjust the value F or $S_2$ appropriately according to the change of $S_1$.

According to an embodiment of the present invention, the distance between the lens 404 and the subject 402 can be calculated based on the focal length and the distance between the lens 404 and the image sensor 406 as shown in Equation 2. According to another embodiment of the present invention, the distance between the lens 404 and the subject 402 can be determined using a reflective wave such as radio signal, sound signal, and light signal. For example, the distance between the lens 404 and the subject 402 can be determined through distance measurement based on Round Trip Time (RTT).

In some cases, for example, on account of implementation, after the autofocusing, it can be difficult to directly measure the distance $S_2$ between the lens 404 and the image sensor 406. At this time, when only indirect or auxiliary sensor data is available, according to yet another embodiment of the present invention, the distance $S_2$ can be predicted using only available data. For example, the sensor data can include data used or generated to control the lens 404, specifically, a voltage, a current, or a consumed power applied to a driving unit which moves the lens 404. When predicting the distance $S_2$ using the sensor data, initial calibration can be performed to increase prediction accuracy. For example, the initial calibration can be carried out by placing an object, that is, a subject at a preset or known position (e.g., 1 m, 2 m), conducting the autofocusing, and comparing the generated indirect data with the distance $S_2$.

The angle of view can vary according to the focal length. The following Table 1 shows examples of the angle of view based on a general focal length.

TABLE 1

| focal length (mm) | angle of view (°) |
|---|---|
| 13 | 118 |
| 15 | 111 |
| 18 | 100 |
| 21 | 91.7 |
| 24 | 84.1 |
| 28 | 75.4 |
| 35 | 63.4 |
| 43.3 | 53.1 |
| 50 | 46.8 |
| 70 | 34.4 |
| 85 | 28.6 |
| 105 | 23.3 |
| 135 | 18.2 |
| 180 | 13.7 |
| 200 | 12.4 |

The angle of view based on different focal lengths in Table 1 is exemplary, and embodiments of the present invention can be applied to an electronic device having the angle of view according to the focal length different from Table 1.

As the angle of view changes according to the focal length, a photographing range of a photo image also changes according to the focal length. For example, the photographing range of the photo image according to the focal length is shown in FIG. 5. FIG. 5 depicts an example of image changes based on a focal length in an electronic device according to an embodiment of the present invention. FIG. 5 illustrates six images captured with different focal lengths at the same location. In FIG. 5, the focal length increases in order of (a), (b), (c), (d), (e), and (f). As shown in FIG. 5, the angle of view reduces as the focal length increases, and thus the photographing range narrows. That is, FIG. 5 visually represents the variation of the angle of view based on the focal length. When the focal length is short, the angle of view widens and accordingly more persons or landscape is included in the photo image. On the contrary, when the focal length is long, the angle of view narrows and accordingly less persons or landscape is included in the photo image.

As described above, the angle of view changes according to the focal length, and the photographing range varies as the angle of view changes. In conclusion, the angle of view and the range of the subject can be determined from the focal length. Hence, the electronic device according to various embodiments of the present invention can specify a certain physical range based on the focal length and the angle of view, identify at least one other electronic device located in the specified range, and thus determine the sharing group.

According to an embodiment of the present invention, a beamforming technology can be applied to identify at least one other electronic device located in the specific range. Unlike using a single antenna, when a plurality of antennas is arranged as an array of a particular form, a beam pattern of each antenna is spatially composed and thus a directional beam is generated. Thus, an antenna gain can be greatly enhanced. Also, a beam direction can be adjusted into an intended direction by adjusting a phase characteristic of each antenna. The beamforming is the technique for adjusting the beam direction using the phase characteristic.

That is, using the beamforming technique, directivity can be imposed on a signal transmitted from the electronic device. Hence, when forming the beam within the physical range determined based on the focal length and the angle of view, the electronic device can transmit a signal toward other electronic devices located in the range.

Figure 6:
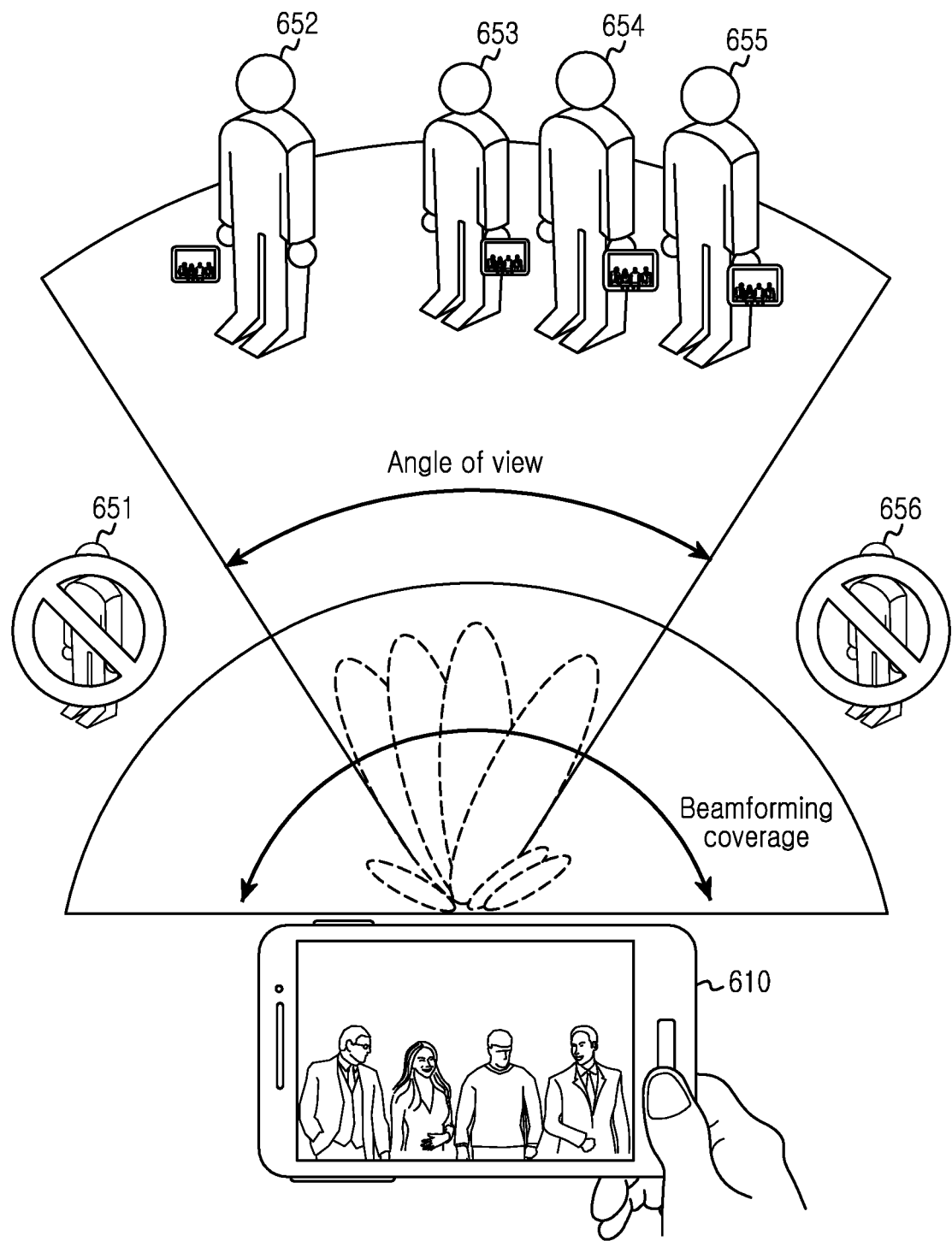
FIG. 6 depicts an example of limiting sharers using beamforming in an electronic device according to an embodiment of the present invention.

FIG. 6 depicts an example of limiting sharers using beamforming in an electronic device according to an embodiment of the present invention. Referring to FIG. 6, a plurality of users 651 through 656 is distributed near an electronic device 610. A picture is taken through the electronic device 610, and some users 652 through 655 of the users 651 through 656 are subjects. Accordingly, the angle of view of a camera of the electronic device 610 is determined to a range including only the subjects 652 through 655. Thus, to transmit signals to electronic devices of the subjects 652 through 655, the electronic device 610 forms beams belonging to the range of the angle of view. That is, whole beamforming coverage is far wider than the angle of view, but the electronic device 610 can form the beam only within the range corresponding to the angle of view. Hence, signals transmitted from the electronic device 610 do not arrive at the users 651 and 656 who are not the subjects.

As described above, in addition to determining the signal direction using the angle of view, the electronic device can adjust a power of the signal using the distance from the subject calculated from the focal length. When other user than the subject exists in the angle of view range, the beamforming alone cannot exclude the user and accordingly additional control based on the distance is required. For example, the additional control can include at least one of transmit power control, and distance measurement and comparison.

Figure 7:
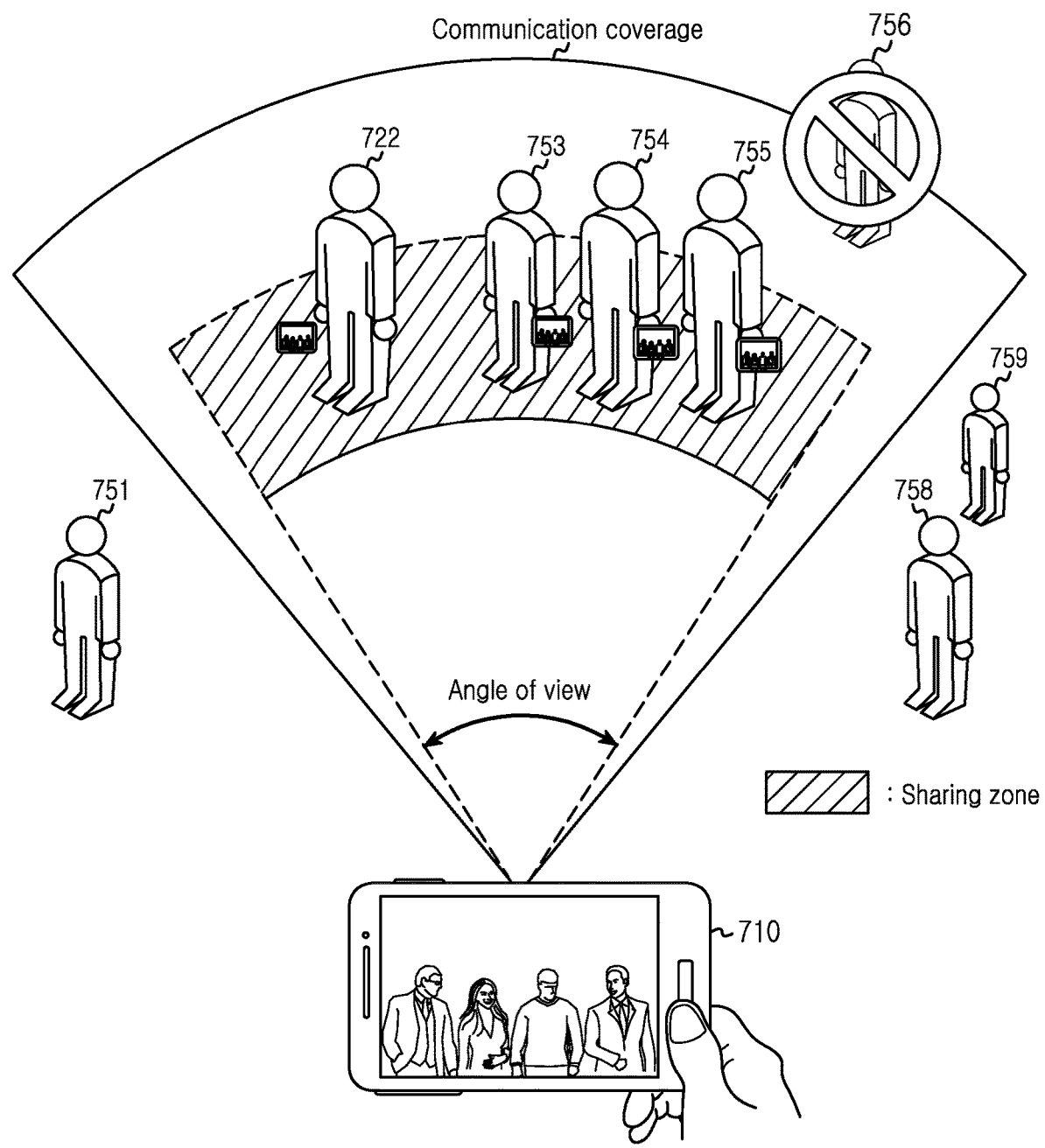
FIG. 7 depicts an example of limiting sharers using power control in an electronic device according to an embodiment of the present invention.

FIG. 7 depicts an example of limiting sharers using power control in an electronic device according to an embodiment of the present invention. Referring to FIG. 7, a plurality of users 751 through 758 is distributed near an electronic device 710. A picture is taken through the electronic device 710, and some users 752 through 755 of the users 751 through 756 are subjects. Hence, an angle of view of a camera of the electronic device 710 is determined to a range including only the subjects 752 through 755. However, the user 756 which is not the subject is located inside the angle of view range. Accordingly, to transmit signals to electronic devices of the subjects 752 through 755, the electronic device 710 adjusts the power of the signal. That is, the electronic device 710 can estimate distances from the subjects 752 through 755 based on a focal length and a distance between a lens and an image sensor, or based on an RTT, adjust the power of the signal not to reach an area exceeding the estimated distance, and thus reduce the communication coverage. Thus, a user located in the angle of view range can be excluded. Thus, signals transmitted from the electronic device 710 do not reach the user 756 which is not the subject.

As mentioned above, the electronic device can transmit the signal only to the subject through the beamforming and the communication coverage control. However, in some cases, the angle of view of the camera can include a range outside the subject. For example, the photographer desires to capture a background as well. Further, a case where data sharing is excluded for some subjects can be considered. Hence, in addition to the beamforming and the communication coverage control, a sharing range can be limited by the user's direct control.

Figure 8:
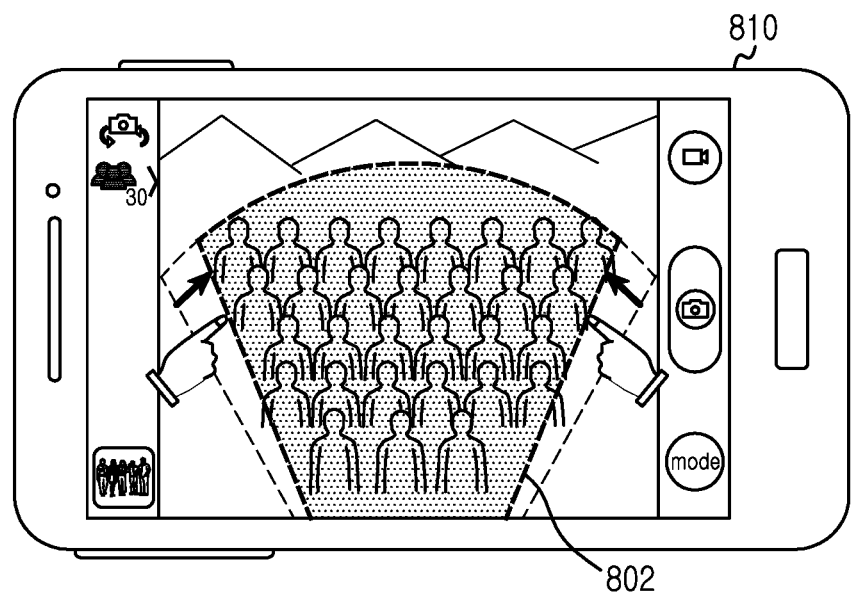
FIG. 8 depicts an example of suggesting sharers by adjusting an angle of a sharing range in an electronic device according to an embodiment of the present invention.

FIG. 8 depicts an example of suggesting sharers by adjusting an angle of a sharing range in an electronic device according to an embodiment of the present invention. Referring to FIG. 8, an electronic device 810 displays a preview image. In so doing, according to an embodiment of the present invention, the electronic device 810 can superimpose and display an interface 802 indicating a sharing range on the preview image. Hence, a user can expand or reduce the sharing range through drag.

According to another embodiment of the present invention, the sharing range can be controlled through other manipulation than the drag. For example, the manipulation for controlling the sharing range can be defined as at least one of key inputting, defining a boundary of a figure (e.g., a circle, a polygon, etc.) which defines the sharing range, and click or touch of a particular subject.

The data sharing according to an embodiment of the present invention includes a sharing group determining procedure, a data transmitting procedure, an individual sharing procedure based on a user request, and a dynamic group managing procedure based on a group lifetime.

The sharing group determining procedure is performed in steps of selecting sharing candidates, creating a sharing group, and a confirming the sharing group. To select the sharing candidates, the electronic device defines a sharing area. The sharing area indicates a physical area covering subjects, and can be determined based on a distance from the subject and the angle of view. Hence, the electronic device determines a transmit power and a beamwidth, and determines a beam set. For example, the beam set determination includes beam set adjustment based on user's zoom in/out. Also, the electronic device can select the sharing candidate based on an Angle of Arrival (AoA) and the distance from the subject. The electronic device creates a sharing group from the selected sharing candidates according to a defined protocol, and confirms the sharing group. In so doing, when AoA estimation and the beamforming are infeasible, the electronic device can confirm the sharing group in a list based manner. When at least one of the AoA estimation and the beamforming is feasible, the electronic device can confirm the sharing group in an angle of view based manner.

The data transmitting procedure can be performed based on a capability of other electronic device belonging to the sharing group. When creating the group, the electronic device can exchange information about the capability of the other electronic device and user-preference, and select a transmission technique according to the exchanged information. When the transmission fails, the electronic device can change the wireless transmission technique and then re-attempt the transmission.

The individual sharing procedure based on the user request can be performed based on software and hardware capabilities and a resource condition of the other electronic device. For example, the electronic device can properly process contents according to characteristics of the other electronic device, and then transmit. For example, even when sharing the same contents, the electronic device can process the contents with a different resolution and a different compression type per electronic device.

The dynamic group managing procedure based on the group lifetime maintains a corresponding sharing group during a set lifetime. That is, by applying the group lifetime to the sharing group, electronic devices can freely share data during a certain time by creating a group one time. The lifetime can be referred to as a 'validity period'.

The sharing group determining procedure is elucidated as follows.

The sharing group determination can commence by selecting sharing candidates. When the procedure for selecting the sharing candidates is not conducted, all of devices in vicinity which are not the sharers can be included in the sharing group in the process of the sharing group creation. In this case, many user inputs are required in the sharer confirming step, and a longer time is taken. Further, there can be a risk of sharing data with other unintended electronic device.

To select the sharing candidate, the electronic device can obtain the distance from the subject and measure the distance from a device of the subject. When the beamforming is feasible, by defining the sharing range, the electronic device can enhance accuracy of the sharing selection, reduce overhead, and greatly reduce user's intervention in the sharing group confirming procedure. Through the above-stated procedure, the subject in the view finder can be automatically extracted and candidates for creating the sharing group can be automatically selected.

Figure 9:
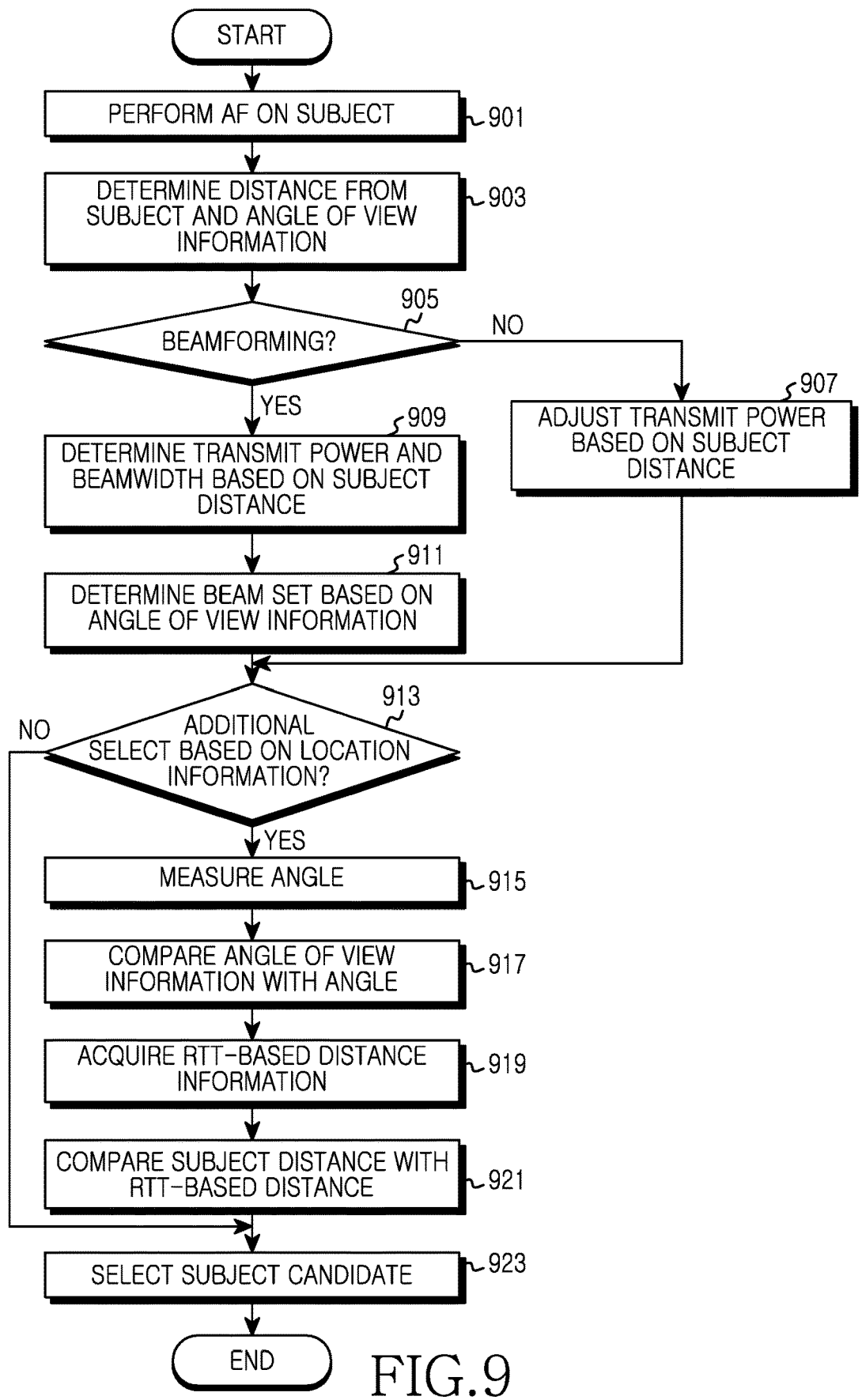
FIG. 9 depicts a procedure for selecting a sharing candidate in an electronic device according to an embodiment of the present invention.

FIG. 9 depicts a procedure for selecting a sharing candidate in an electronic device according to an embodiment of the present invention. FIG. 9 illustrates an operating method of the electronic device.

Referring to FIG. 9, the electronic device performs Auto Focusing (AF) in step 901. The AF is a function for the device itself to focus on the subject. The AF can be conducted based on the distance from the subject calculated by detecting reflection of infrared light or ultrasonic waves, or based on sharpness of an input image.

After the AF, the electronic device determines the distance from the subject and the angle of view information in step 903. The angle of view and the distance from the subject can be determined by an operation parameter of a camera of the electronic device. The operation parameter includes a focal length, and a distance between a lens and an image sensor after the AF. For example, the distance between the lens and the image sensor is determined by the AF, and the distance from the subject can be determined based on the focal length relating to the angle of view and the distance between the lens and the image sensor. Also, the angle of view can be determined by the focal length. For example, the electronic device can determine the angle of view using the relation of Equation 1. Also, the electronic device can determine the distance from the subject using the relation of Equation 2.

Next, the electronic device determines whether the beamforming is feasible in step 905. That is, the electronic device checks the hardware capability of whether an antenna array for the beamforming is equipped, and whether the beamforming function is supported.

When the beamforming is not feasible, the electronic device adjusts a transmit power according to the distance from the subject in step 907. That is, based on the distance from the subject, the electronic device adjusts the transmit power such that a signal does not reach a range exceeding the distance. That is, the electronic device can adjust the transmit power such that communication coverage does not include the range exceeding the distance. According to another embodiment of the present invention, the step 907 can be omitted. Although the transmit power is not adjusted, the subject candidate can be selected by comparing the angle of view and the distance from the subject using at least one of distance measurement and angle estimation performed in a subsequent procedure. Notably, since a target of the angle and distance measurement can be limited in the step 907, the step 907 can provide an advantage of drastically reducing an operation time for the comparison.

By contrast, when the beamforming is possible, the electronic device determines the transmit power and the beamwidth according to the distance from the subject in step 909. That is, based on the distance from the subject, the electronic device determines the transmit power such that a signal does not reach a range exceeding the distance. Also, the electronic device determines the widest beamwidth within a range which secures a sufficient receive power in the other electronic device which is the sharer. The procedure for determining the transmit power and the beamwidth shall be elucidated by referring to FIG. 13.

After determining the transmit power and the beamwidth, the electronic device determines the beam set based on the angle of view information in step 911. The beam set includes at least one beams belonging to the range of the angle of view. The number of beams included in the beam set can vary according to the beamwidth. That is, the electronic device includes beams directed into the angle of view range, to the beam set. The beam set determining procedure shall be elucidated by referring to FIG. 15.

According to another embodiment of the present invention, the step 909 and the step 911 can be omitted. Similarly to the step 907, according to whether or not subsequent angle estimation and distance estimation procedures are performed, all or part of the step 909 and the step 911 can be omitted. Yet, by performing the step 909 and the step 911, the electronic device can effectively select the subject candidate even when the angle estimation and the distance estimation are not allowed or the accuracy drops too much to exhibit no usability. Even when the angle estimation and the distance estimation are possible, the step 909 and the step 911 can exclude an unnecessary target device and thus provide an advantage of drastically reducing the operation time for the estimation and the comparison.

Next, the electronic device determines whether additional selection based on location information is possible in step 913. The location information can be obtained over a multi-access network, or through direct communication between the electronic devices. When the additional selection is not possible, the electronic device proceeds to step 923.

By contrast, when the additional selection is possible, the electronic device measures an angle of the subject in step 915. The angle can be measured based on the AoA of the signal transmitted from the electronic device of the subject. For example, the electronic device can measure the AoA using a phase difference of signals received via different antennas. In so doing, the electronic device can measure the AoA using at least one of a response signal for a signal for scanning other electronic devices, a response signal corresponding to a group participation request, a signal defined to measure the AoA, and other signal. The AoA measurement principle shall be explained in detail by referring to FIG. 10.

After measuring the angle, the electronic device compares the angle of view information and the angle in step 917. That is, the electronic device determines a relative angle of the subject based on the angle of view information, and compares the angle determined based on the angle of view information with the angle determined in the step 915. Thus, the electronic device can determine whether the subject matches the user of the electronic device which transmits the signal used in the AoA measurement. Hence, accuracy of the subject candidate selection can be enhanced.

Next, the electronic device obtains distance information based on RTT in step 919. In other words, the electronic device estimates the distance from the subject based on the RTT. That is, the electronic device transmits a request signal for the distance measurement to other electronic device and receives a response signal of the signal. The request signal and the response signal can include at least one of a radio signal, sound signal, and a light signal. The response signal can be a signal generated by the other electronic device in response to the request signal, or a reflected wave of the request signal. The electronic device can measure the RTT based on a time elapsed from the transmission of the request signal to the reception of the response signal, and a signal processing time of the other electronic device, and estimate the distance based on the RTT. Herein, the distance estimation is carried out for at least one other electronic device selected in the step 901 through the step 915. According to another embodiment of the present invention, the distance information can be determined based on radio signal strength measurement. According to yet another embodiment of the present invention, the distance information can be determined based on the location information provided from the multi-access network.

Next, the electronic device compares the distance from the subject with the distance estimated based on the RTT in step 921. In other words, the electronic device determines whether the distance from the subject determined based on the operation parameter of the camera matches the distance of the other electronic device estimated based on the RTT. That is, to determine whether the other electronic device estimating the distance is the electronic device of the captured subject, the electronic device compares the distance from the subject determined in a different manner with the distance from the other electronic device. Yet, when cannot accurately determine the distance from the subject, the electronic device can set the shortest distance value of the distances estimated based on the RTT, as the distance from the subject, and utilize the distance as an input for selecting the subject candidate among other electronic devices within a preset range from the shortest distance.

Next, the electronic device selects the subject candidate in step 923. That is, the electronic device determines a sharing candidate for sharing data.

Figure 10:
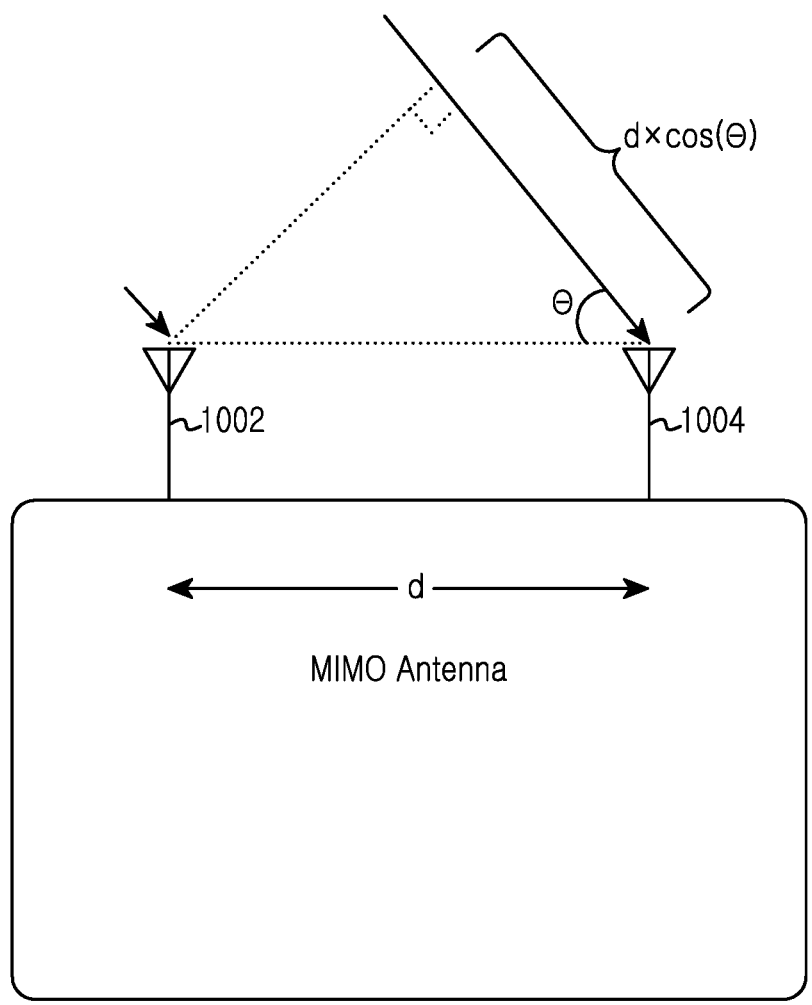
FIG. 10 depicts a signal angle of arrival measurement principle in an electronic device according to an embodiment of the present invention.

In the procedure of FIG. 9, the signal AoA measurement of the step 909 can be carried out as shown in FIG. 10. FIG. 10 depicts a signal AoA measurement principle in an electronic device according to an embodiment of the present invention. Referring to FIG. 10, the electronic device includes a plurality of antennas including a first antenna 1002 and a second antenna 1004. Herein, the first antenna 1002 and the second antenna 1004 can be omni-directional antennas. The first antenna 1002 and the second antenna 1004 are apart from each other by a distance d. Hence, when a signal is received from outside at a certain angle, a phase difference of a magnitude in proportion to the d between a signal received via the first antenna 1002 and a signal received via the second antenna 1004 occurs. Specifically, the phase difference is $d \times \cos(\theta)$, where d denotes the AoA. That is, the electronic device can measure the phase difference of each antenna according to a relative propagation delay, calculate the AoA based on the phase difference, and thus estimate the relative angle with the electronic device which transmits the signal.

Another example of the angle measurement is as follows. When the beamforming is possible using a directional antenna or an array antenna, the electronic device can estimate the angle based on signal strength of incidence in each sector or beam. For example, when conducting receive beamforming, a gain of the antenna varies according to an incidence angle of the signal of the incidence in one sector or beam and accordingly the received signal strength can change. In so doing, the incidence angle can be estimated based on the varying received signal strength. Yet, the received signal strength can be affected by not only the gain of the antenna but also other factors such as a distance between a transmitter and a receiver. Hence, to minimize the influence from the other factors, the electronic device can use a normalized pattern of the received signal strength of each beam or sector, rather than absolute received signal strength.

In the embodiment explained by referring to FIG. 9, the beam set is determined according to the angle of view. However, in the electronic device, the camera lens and the antenna can be installed at different locations, not at the same location, due to the form factor or other mounting problem. In this case, identity between the angle of view of the camera and the beam angle may not be guaranteed. Thus, it is required to compensate the angle of view according to the location of the antenna. That is, unless the angle is compensated based on the distance of the lens and the antenna, the angle of view through an actual lens and the beam angle cannot be matched properly. For example, the correction of the angle of view can be performed as shown in FIG. 11.

Figure 11:
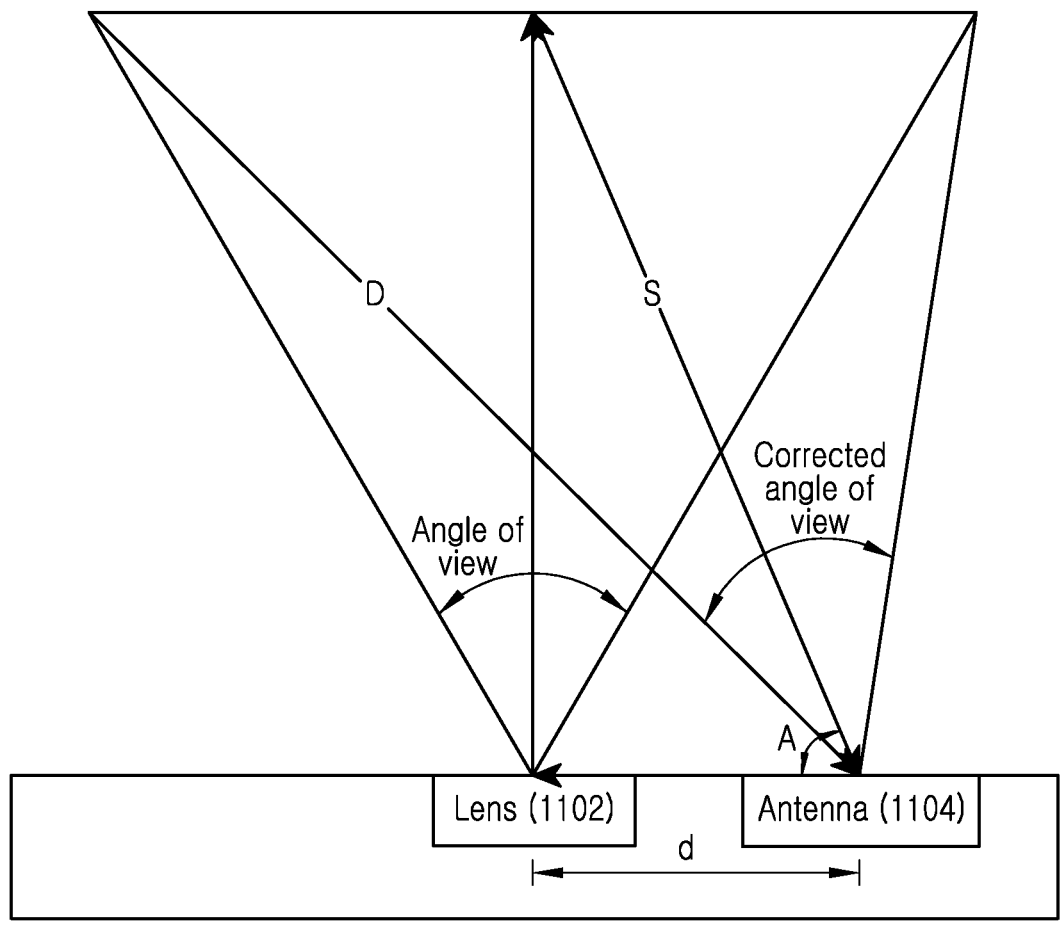
FIG. 11 depicts an example of angle correction in an electronic device according to an embodiment of the present invention.

FIG. 11 depicts an example of angle correction in an electronic device according to an embodiment of the present invention. Referring to FIG. 11, a lens 1102 of a camera and an antenna 1104 are apart from each other by a distance d, a distance between a subject and the lens 1102 of the electronic device is D, and a distance between the subject and the antenna 1104 is S. An angle from a center point of the antenna 1104 toward the subject is A. When a size of the electronic device is small and the distance from the subject is considerably greater than the distance d between the lens 1102 and the antenna 1104 (D>>d), it can be less necessary to compensate the angle. However, when the distance from the subject is short or the distance between the lens 1102 and the antenna 1104 is long, mismatch degree of the angle of view and the beam direction can increase.

In FIG. 11, the distance D can be determined by the focal length. That is, the electronic device can know the D after the AF and calculate the distance S and the angle A. Hence, the electronic device can map a vertical direction (e.g., 90°) of the angle of view to the angle A with respect to the beam direction. As a result, in FIG. 11, compared to an angle range of the angle of view before the correction, the corrected angle range can have a decreased value.

Figure 12:
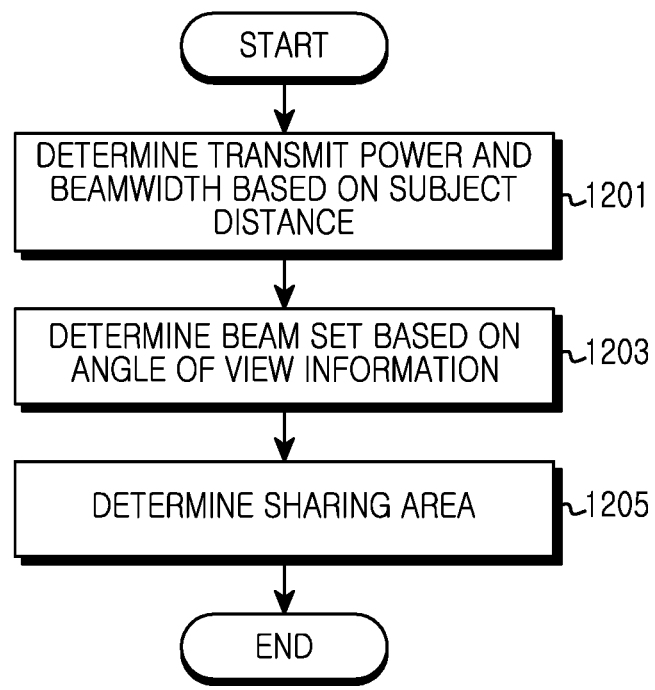
FIG. 12 depicts a procedure for defining a sharing area in an electronic device according to an embodiment of the present invention.

In the embodiment explained by referring to FIG. 9, the electronic device determines the sharing candidate. The procedure for determining the sharing candidate includes a step for defining a sharing area. The sharing area indicates locations of subjects within the angle of view based on angle of view information and the distance information of the subject obtained from the electronic device of the photographer, that is, a physical area where sharers exist. The sharing area can be referred to as a 'subject area'. When the sharing area is not defined, an electronic device not existing in the angle of view can be selected as the sharing candidate. For doing so, the electronic device determines the transmit power and the beamwidth based on the distance from the subject, and determines the beam set based on the angle of view. Thus, the accuracy of the subject selection is raised, the overhead is reduced, and the sharing group confirming step is simplified. The sharing area can be determined as shown in FIG. 12. FIG. 12 depicts a procedure for defining a sharing area in an electronic device according to an embodiment of the present invention. FIG. 12 illustrates an operating method of the electronic device.

Referring to FIG. 12, the electronic device determines the transmit power and the beamwidth according to the distance from the subject in step 1201. That is, based on the distance from the subject, the electronic device determines the transmit power such that a signal does not reach a range exceeding the distance. Also, the electronic device determines the widest beamwidth within a range which ensures a sufficient receive power in other electronic device which is the sharer. The procedure for determining the transmit power and the beamwidth shall be elucidated by referring to FIG. 13.

After determining the transmit power and the beamwidth, the electronic device determines the beam set based on the angle of view information in step 1203. The beam set includes at least one beams belonging to the range of the angle of view. The number of beams included in the beam set can vary according to the beamwidth. That is, the electronic device includes beams directing within the range of the angle of view, to the beam set. The procedure for determining the beam set shall be elucidated by referring to FIG. 15.

Next, the electronic device determines the sharing area in step 1205. The electronic device determines signal coverage determined by the transmit power, the beamwidth, and the beam set, as the sharing area. That is, the sharing area is determined based on the beamwidth, a signal radiation angle determined by the beam set, and a signal arrival distance determined by the transmit power.

In the embodiment shown in FIG. 9 and the embodiment shown in FIG. 12, the electronic device determines the transmit power and the beamwidth. The transmit power and the beamwidth are parameters applied to transmit a sharing request signal to the sharing candidates, and require an algorithm for building a communication link with other electronic devices which are the sharing candidates and determining a minimum transmit power and a maximum beamwidth. For doing so, the electronic device can perform the following procedure of FIG. 13.

Figure 13:
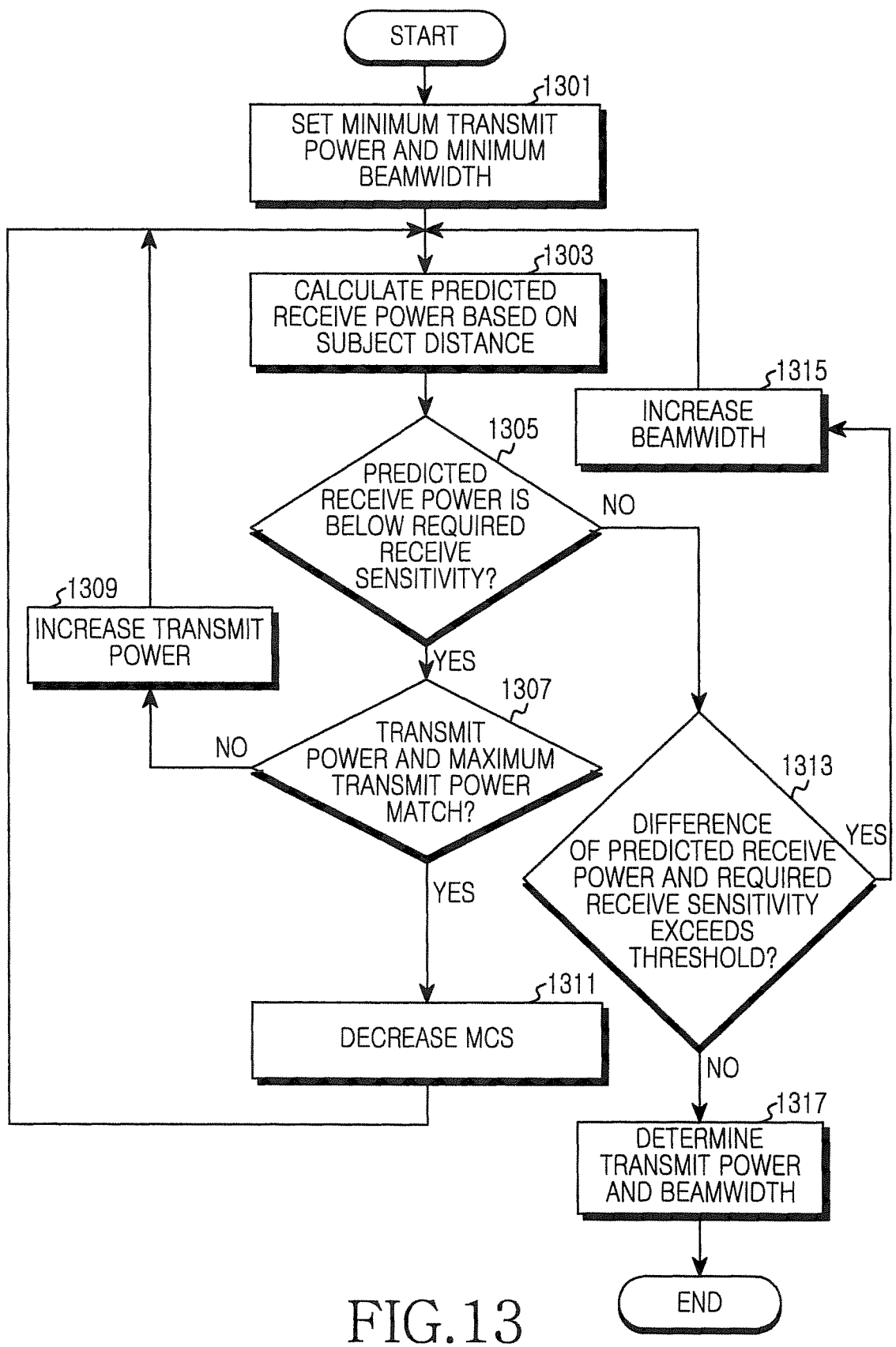
FIG. 13 depicts a procedure for determining a transmit power and a beamwidth in an electronic device according to an embodiment of the present invention.

FIG. 13 depicts a procedure for determining a transmit power and a beamwidth in an electronic device according to an embodiment of the present invention. FIG. 13 illustrates an operating method of the electronic device.

Referring to FIG. 13, the electronic device sets a minimum transmit power and a minimum beamwidth in step 1301. That is, for predicted receive power estimation in a next step, the electronic device is assumed to apply the minimum transmit power and the minimum beamwidth.

Next, the electronic device calculates the predicted receive power based on the distance from the subject in step 1303. In so doing, the electronic device applies the transmit power and the beamwidth which are assumed for the predicted receive power estimation. Specifically, the electronic device can estimate a path loss based on the distance from the subject, and estimate the predicted receive power based on a beam gain according to the beamwidth, a receive gain, and the path loss. For example, the predicted receive power can be estimated as shown in Equation 3.

$$P_r = P_t + G_t + G_r + 20\log_{10}\left(\frac{c}{4\pi R \times f}\right)^2 \qquad \text{Equation 3}$$

In Equation 3, $P_r$ denotes the predicted receive power, $P_t$ denotes the transmit power, $G_t$ denotes a transmit antenna gain, $G_r$ denotes a receive antenna gain, R denotes the distance from the subject, F denotes a carrier frequency, and c denotes the speed of light. Herein, the transmit antenna gain can be a beamforming gain, and the receive antenna gain can be an omni-directional antenna gain.

After estimating the predicted receive power, the electronic device determines whether the predicted receive power is below a required receive sensitivity in step 1305. The required receive sensitivity indicates a minimum receive power allowed by a Modulation and Coding Scheme (MCS) to apply. That is, the required receive sensitivity is a minimum receive signal level required for a receiver to normally decode a packet, and is widely used as a metric indicating reception performance. Although it may differ per manufacturer, most of communication standards define the minimum receive sensitivity required per data rate or per modulation scheme. The required receive sensitivity can be expressed as 'RX sensitivity (MCS)'. The predicted receive power below the required receive sensitivity means that a corresponding MCS level cannot be used as a current condition.

When the predicted receive power is below the required receive sensitivity, the electronic device determines whether the current assumed transmit power is the maximum transmit power in step 1307. That is, the electronic device determines whether the transmit power can be set higher.

When the current assumed transmit power is not the maximum transmit power, the electronic device increases the transmit power in step 1309. That is, the electronic device assumes the transmit power of a one-level higher value. In so doing, according to another embodiment of the present invention, the transmit power can be set to a two-level higher value. Next, the electronic device returns to the step 1303.

When the current assumed transmit power is the maximum transmit power, the electronic device decreases the MCS level to apply to the signal transmission to the other electronic device, by one level in step 1311. That is, the electronic device decreases the data rate. According to another embodiment of the present invention, the MCS level can be decreased by two or more levels. Next, the electronic device returns to the step 1303.

In step 1305, when the predicted receive power is over the required receive sensitivity, the electronic device determines whether a difference between the predicted receive power and the required receive sensitivity is greater than a threshold in step 1313. In other words, the electronic device determines whether the predicted receive power is greater than or equal to a sum of the required receive sensitivity and the threshold.

When the difference is greater or equal to the threshold, the electronic device increases the beamwidth in step 1315. That is, the electronic device increases a current assumed beamwidth by one level. That is, the electronic device decreases the beam gain by one level. According to another embodiment of the present invention, the beamwidth can increase by two or more levels. Next, the electronic device returns to the step 1301.

When the difference is less than the threshold, the electronic device determines the transmit power and the beamwidth in step 1317. That is, the electronic device determines the transmit power and the beamwidth which are currently assumed, as the transmit power and the beamwidth to apply to the signal transmission. Through such a process, the maximum beamwidth and the minimum transmit power with which the predicted receive power satisfies the required receive sensitivity can be determined.

In the embodiment shown in FIG. 9 and the embodiment shown in FIG. 12, the electronic device determines the beam set. The beam set specifies a range for transmitting the sharing request signal to sharing candidates. That is, the beam set includes beams within the angle of view based on the determined transmit power and beamwidth. The beams included in the beam set have the following characteristics of FIG. 14.

Figure 14:
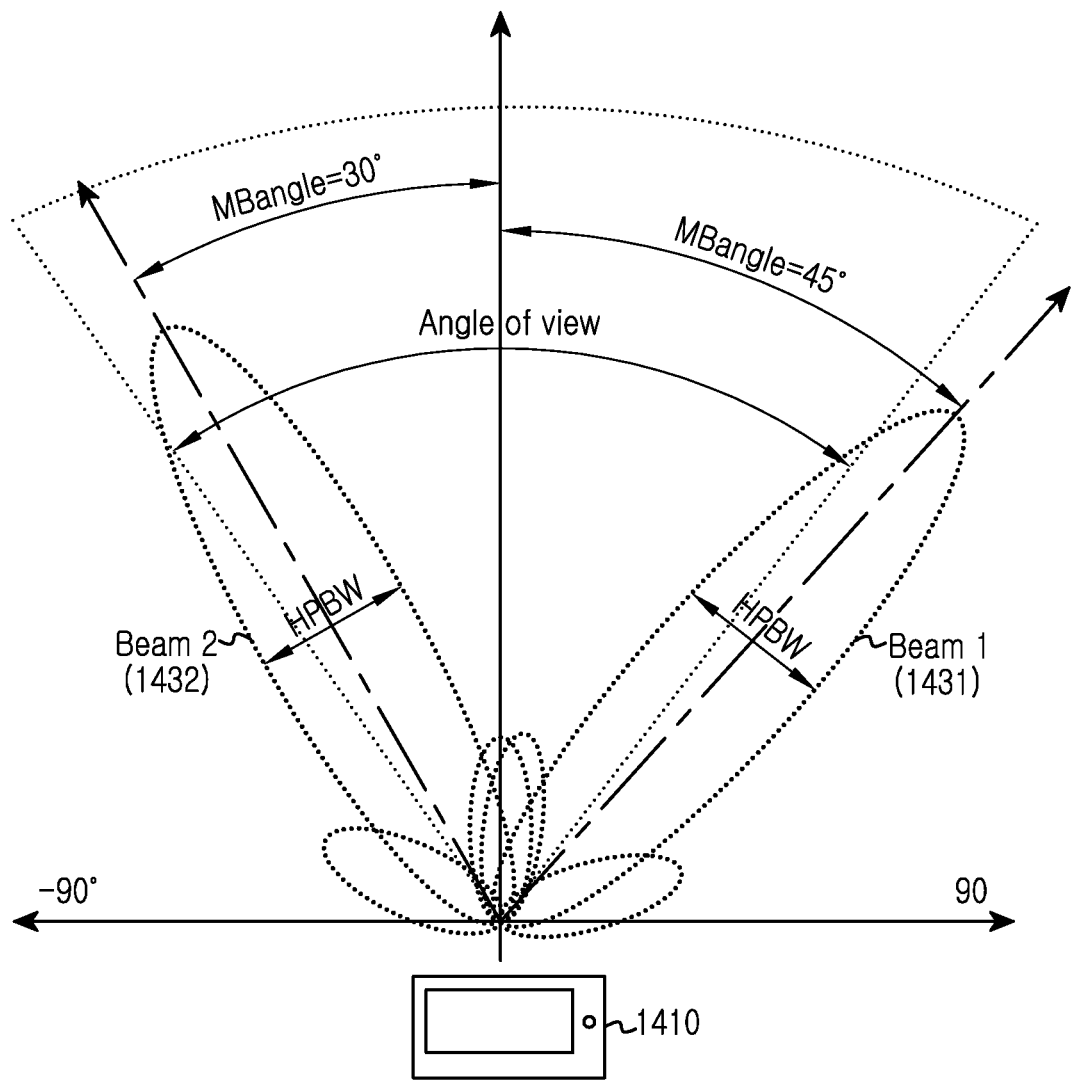
FIG. 14 depicts an example of beam characteristics considered in determining a beam set in an electronic device according to an embodiment of the present invention.

FIG. 14 depicts an example of beam characteristics considered in beam set determination in an electronic device according to an embodiment of the present invention. Referring to FIG. 14, beams only corresponding to both side boundaries of the angle of view range are depicted, a beam 1 1431 exists on the right boundary, and a beam 2 1432 exists on the left boundary. A Main Beam (MB) indicates a region in a direction where maximum radiation arises in the beamforming, and is generally defined as a region where the gain reduces down to −3 dB (=50%) of a peak gain. In FIG. 14, an MB orientation angle of the beam 1 1431 is 45° and an MB orientation angle of the beam 2 1432 is 30° by way of example. A Half Power Beam Width (HPBW) is a parameter indicating the beamwidth, and is defined as an angle difference at a point where a radiation gain falls from the peak gain to −3 dB (=50%).

Figure 15:
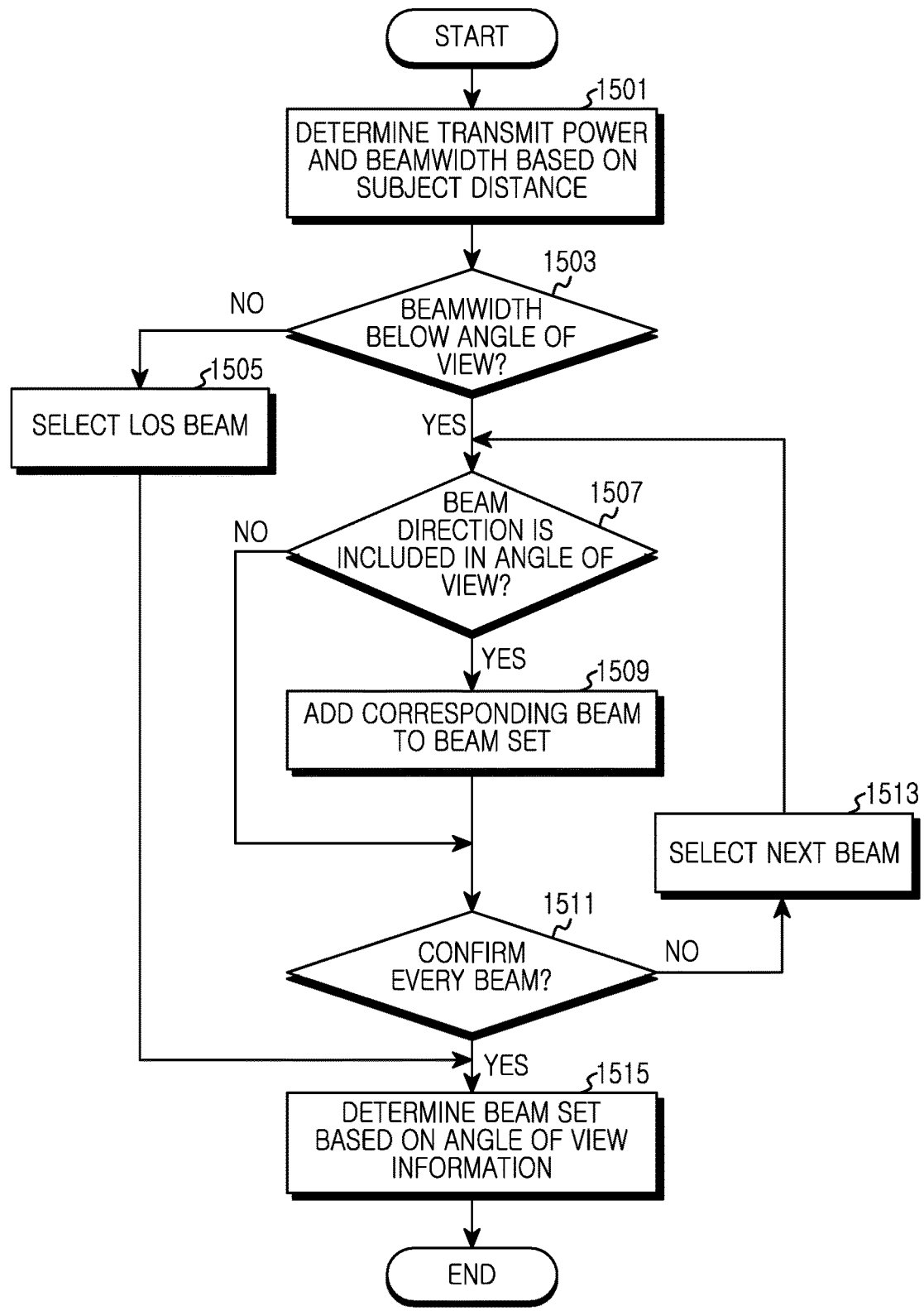
FIG. 15 depicts a procedure for determining a beam set in an electronic device according to an embodiment of the present invention.

FIG. 15 depicts a procedure for determining a beam set in an electronic device according to an embodiment of the present invention. FIG. 15 depicts an embodiment for determining a set of beams to use to define a sharing area by combining a transmit power, a beamwidth, and angle of view information. FIG. 5 illustrates an operating method of the electronic device.

Referring to FIG. 15, the electronic device determines the transmit power and the beamwidth according to a distance from a subject in step 1501. That is, based on the distance from the subject, the electronic device determines the transmit power such that a signal does not reach a range exceeding the distance. Also, the electronic device determines the widest beamwidth within a range which ensures a sufficient receive power in other electronic device which is a sharer. For example, the electronic device can determine the transmit power and the beamwidth as in the embodiment of FIG. 13.

After determining the transmit power and the beamwidth, the electronic device determines whether the beamwidth is below the angle of view in step 1503. In other words, the electronic device determines whether one beam having the beamwidth determined in the step 1501 can cover all the angle of view range.

When the beamwidth is greater than the angle of view, the electronic device selects a Line of Sight (LOS) beam in step 1505. The LOS beam indicates a beam of a direction in which the light approaches the lens, that is, of a front direction of the electronic device. In this case, the beam set includes one beam. Next, the electronic device proceeds to step 1515.

When the beamwidth is below the angle of view, the electronic device selects one particular beam and then determines whether a direction of the selected beam is included in the angle of view range in step 1507. Herein, whether it is included in the angle of view is determined based on the direction of the MB of the beam. When the direction of the selected beam is not included in the angle of view range, the electronic device proceeds to the following step 1511. By contrast, when the direction of the selected beam is included in the angle of view range, the electronic device adds the corresponding beam to the beam set in step 1509. Next, the electronic device determines whether all of the beams are checked in step 1511. When a beam is not checked, the electronic device selects a next beam in step 1513 and then goes back to the step 1507. Thus, when the beamwidth is below the angle of view, two or more beams are included to the beam set.

Upon checking all of the beams, the electronic device generates the beam set based on the angle of view information in step 1515. That is, the electronic device confirms the beam set.

Figure 16:
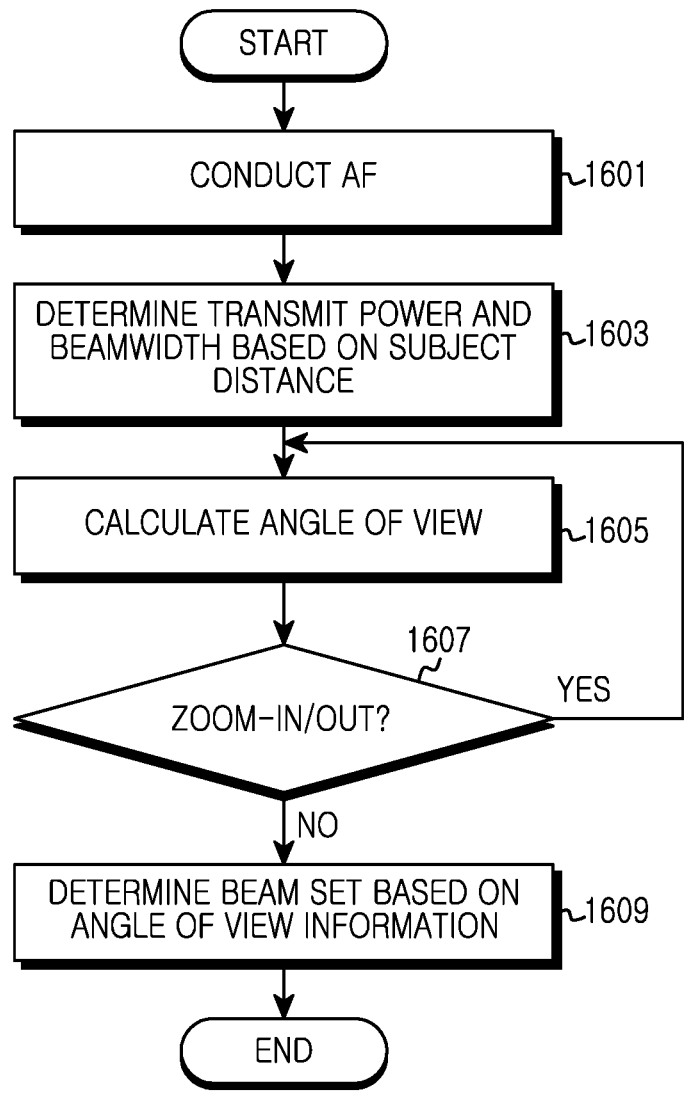
FIG. 16 depicts a procedure for changing a beam set in an electronic device according to an embodiment of the present invention.

As shown in FIG. 15, the beam set can be determined. After determining the beam set, when the user zooms in or zooms out the camera, the angle of view changes and the captured subject changes. That is, although the beam set is determined once, when an image zoom-in/output input is generated by the user's manipulation, the angle of view changes. Accordingly, it is necessary to determine a new beam set based on the changed angle of view. The beam set can be changed as shown in FIG. 16. FIG. 16 depicts a procedure for changing a beam set in an electronic device according to an embodiment of the present invention. FIG. 16 illustrates an operating method of the electronic device.

Referring to FIG. 16, the electronic device performs the AF in step 1601. The AF is the function of the device for focusing on a subject by itself. The AF can be conducted based on a distance from the subject calculated by detecting a reflection of an infrared light or ultrasonic waves, or based on sharpness of an input image. Based on the AF, the electronic device can calculate the distance from the subject from an operation parameter of the camera. For example, the distance from the subject can be determined based on Equation 2.

Next, the electronic device determines the transmit power and the beamwidth based on the distance from the subject in step 1603. That is, based on the distance from the subject, the electronic device determines the transmit power such that a signal does not reach the range exceeding the distance. Also, the electronic device determines the widest beamwidth within a range which ensures a sufficient receive power in other electronic device which is a sharer. For example, the electronic device can determine the transmit power and the beamwidth as shown in FIG. 13.

After determining the transmit power and the beamwidth, the electronic device calculates an angle of view in step 1605. For example, the electronic device can check the focal length and determine the angle of view from the focal length. For example, the electronic device can determine the angle of view using the relation as shown in Equation 1.

Next, the electronic device determines whether a user's zoom-in/out input occurs in step 1607. That is, the electronic device determines whether a camera zooms in or zooms out. When the zoom-in/out input occurs, the electronic device re-determines the angle of view back in the step 1505.

When the zoom-in/out input does not occur, the electronic device determines the beam set based on the angle of view in step 1609. The beam set includes at least one beams belonging to the angle of view range. The number of the beams included in the beam set can vary according to the beamwidth. That is, the electronic device includes the beams directing within the angle of view range, to the beam set. For example, the electronic device can determine the beam set as shown in FIG. 15.

Figure 17:
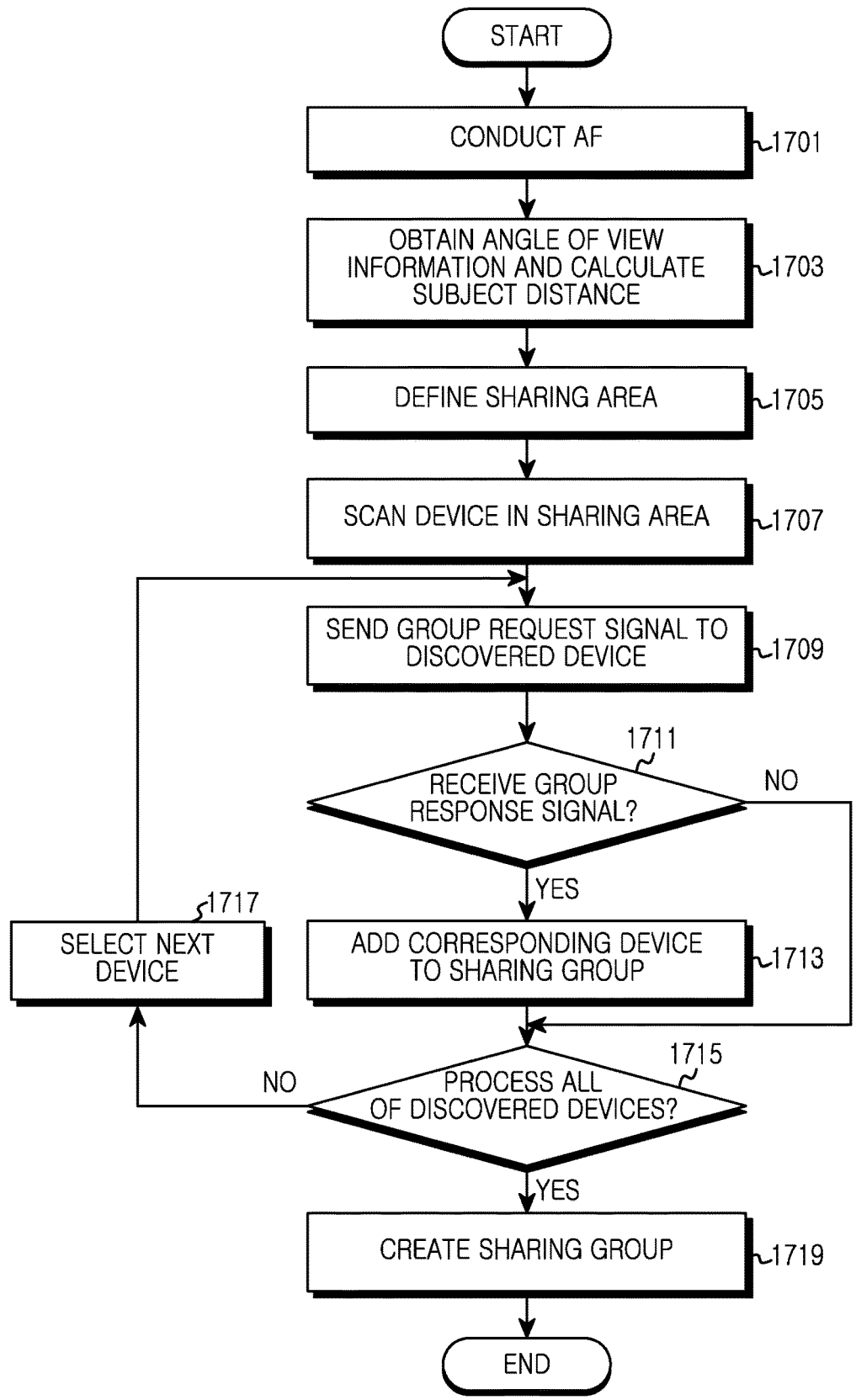
FIG. 17 depicts a procedure for determining a sharing group in an electronic device according to an embodiment of the present invention.

As mentioned above, after defining the sharing area by determining the transmit power, the beamwidth, and the beam set, the electronic device generates a sharing group using radio signals. For doing so, the electronic device performs device scanning in the sharing area. For example, the device scanning can be conducted through a device discovery procedure of the wireless LAN (e.g., Institute of Electrical and Electronical Engineers (IEEE) 802.11ad). Yet, when performing the device discovery procedure, the electronic device does not use all of the beams and uses only subsets of the beams belonging to the beam set determined to define the sharing area. When completing the scanning, the electronic device performs signaling for creating a group with other electronic device scanned. The sharing group creation can be performed as shown in FIG. 17. FIG. 17 depicts a procedure for determining a sharing group in an electronic device according to an embodiment of the present invention. FIG. 17 illustrates an operating method of the electronic device.

Referring to FIG. 17, the electronic device performs the AF in step 1701. The autofocusing is the function of the device for focusing on a subject by itself. The AF can be conducted based on a distance from the subject calculated by detecting a reflection of an infrared light or ultrasonic waves, or based on sharpness of an input image.

After the AF, the electronic device determines the distance from the subject and angle of view information in step 1703. The angle of view and the distance from the subject can be determined by an operation parameter of a camera of the electronic device. The operation parameter includes a focal length, and a distance between lens and an image sensor after the AF. For example, the distance between the lens and the image sensor is determined by the AF, and the distance from the subject can be determined based on the focal length regarding the angle of view and the distance between the lens and the image sensor. Also, the angle of view can be determined by the focal length. For example, the electronic device can determine the angle of view using the relation of Equation 1. Also, the electronic device can determine the distance from the subject using the relation of Equation 2.

Next, the electronic device defines a sharing area in step 1705. Specifically, the electronic device determines the transmit power and the beamwidth according to the distance from the subject, and determines the beam set based on the angle of view. For example, the electronic device can determine the transmit power and the beamwidth as shown in FIG. 13. Also, the electronic device can determine the beam set as shown in FIG. 15.

After defining the sharing area, the electronic device scans a device in the sharing area in step 1707. That is, the electronic device transmits a predefined signal for the device scanning, and checks whether a response of the signal is received. For example, the signal for the scanning can be referred to as a 'beacon signal'. In so doing, the electronic device applies the transmit power and the beamwidth determined in the step 1705 to the beacon signal, and transmits using the beam set. Hence, the electronic device can transmit the signal for the scanning so as to reach within the range of the sharing area. The beacon signal can include information (e.g., identification information) about the electronic device, and the response can include information about other electronic device which transmits the response. At this time, the electronic device can determine an optimal beam for the other electronic device. That is, a beam training procedure can be performed together. The beacon signal is the predefined signal for the scanning, and can be referred to as a different name. In this embodiment, the present invention assumes that at least one other electronic device is scanned.

After scanning the device, the electronic device selects one of at least one electronic device discovered, and transmits a group request signal to the selected electronic device in step 1709. The group request signal is a message or a frame which requests to participate in the sharing group, and can include at least one of a message or frame type, user identification information, content related information to share, and a data processing scheme. According to an embodiment of the present invention, the electronic device can apply the transmit power and the beamwidth determined in the step 1705, to the request signal, and transmit using the beam set. According to another embodiment of the present invention, the electronic device can transmit the request signal using the optimal beam for other electronic devices discovered in the step 1707. According to yet another embodiment of the present invention, the electronic device can transmit the request signal without beamforming.

Next, the electronic device determines whether a group response signal is received from the selected electronic device in step 1711. The group response signal is a message or a frame notifying that the electronic device receiving the group request signal participates in the group, and can include at least one of a message or frame type, user identification information, and hardware/software capability information. When not receiving the group response signal within a predefined time, the electronic device can determine that the group response signal is not received. When not receiving the group response signal, the electronic device proceeds to step 1715.

When receiving the group response signal, the electronic device adds the selected electronic device to the sharing group in step 1713. Next, the electronic device determines whether signaling for the group addition with respect to all of the electronic devices discovered in the step 1707, that is, the step 1709 through the step 1713 are performed, in step 1715. When not conducting the signaling for the group addition with respect to all of the discovered electronic devices, the electronic device selects a next electronic device in step 1717 and returns to the step 1409.

When conducting the signaling for the group addition with respect to all of the discovered electronic devices, the electronic device creates a sharing group in step 1719. That is, the electronic device includes at least one other electronic device added in the step 1713, in the sharing group. Hence, the sharing group includes at least one electronic device which transmits the group response signal.

As mentioned above, the sharing group can be created. To create the sharing group, electronic devices perform signaling for the group participation, that is, sharing request signal transmission/reception and sharing response signal transmission/reception. To conduct the signaling between the electronic devices, a procedure for connection establishment between the electronic devices is required. In so doing, the connection establishment procedure can be combined with the signaling for creating the sharing group, or executed independently. The connection establishment is elucidated as follows.

In general, connection processes in a wireless LAN system and a cellular system are performed in a station-initiated manner. Specifically, the AP or the PCP corresponding to a controller broadcasts a beacon message, receives a connection request, transmits a connection response, and thus completes the connection. In response to this, the electronic device corresponding to the station scans to discover a neighboring AP or PCP, selects the AP or the PCP, transmits a connection request, receives a connection response, and thus completes the connection. That is, in general, the electronic device first triggers the connection. The connection request and the connection response can include necessary information for the connection establishment. For example, the connection request and the connection response can include at least one of information notifying that the connection is requested/accepted, capability information relating to the communication, communication channel information, and information for determining the controller.

In the embodiments of the present invention, unlike the existing connection procedure as mentioned above, the roles of the controller and the station can change. In the present invention, the controller (e.g., the electronic device of the photographer), not the station, scans stations (e.g., other electronic devices) located in the sharing area. Also, the controller, not the station, transmits a group request signal, which is the similar to the connection request, to the scanned device. Next, the connection can be established by the group response signals transmitted by the stations, and the group can be created.

Also, the connection procedure according to an embodiment of the present invention targets only stations located in a particular region (e.g., the sharing area). That is, the controller which controls the service and the connection establishment can determine that stations located in a particular region have an intention of the connection and the service reception. Thus, the controller can scan the stations within the particular region and re-confirm the connection intention of the discovered stations, and thus the connection can be established. According to the above-stated characteristics, the connection establishment procedure according to an embodiment of the present invention can be referred to a 'zone-based reverse directed connection procedure'.

The above-stated connection establishment procedure is summarized as follows. The subject of the connection establishment is the controller (e.g., the electronic device of the photographer) and at least one station (e.g., other electronic device). A station which is located in the sharing area and executes an application for the data sharing is assumed to have the intention of the connection. First, the control node performs regional scan within the angle of view, or scans stations in the sharing area through peripheral position recognition. The controller transmits a connection request to the discovered station. Herein, the connection request can be transmitted through the group request signal. Hence, the station requested to connect transmits a connection response. Herein, the connection response can be transmitted through the group response signal. The controller confirms the station which transmits the connection response, and completes the connection process.

According to another embodiment of the present invention, the station-initiated connection establishment procedure as described above can be performed independently before or after the sharing group creation. Yet, in this case, efficiency can decline due to the overlap with the sharing group creation process. This is because, when the controller which determines whether or not to connect in the station-initiated connection establishment procedure scans stations to connect and has a corresponding list, it has to conduct the signaling for the connection request with the station one more time for the sharing group creation. However, if necessary, the sharing group creation procedure and the connection establishment procedure can be performed independently. In this case, the control which completes the scanning for the sharing group creation can transmit the connection request only to the scanned stations, and perform a separate connection establishment procedure only for stations which receive the connection request.

Figure 18:
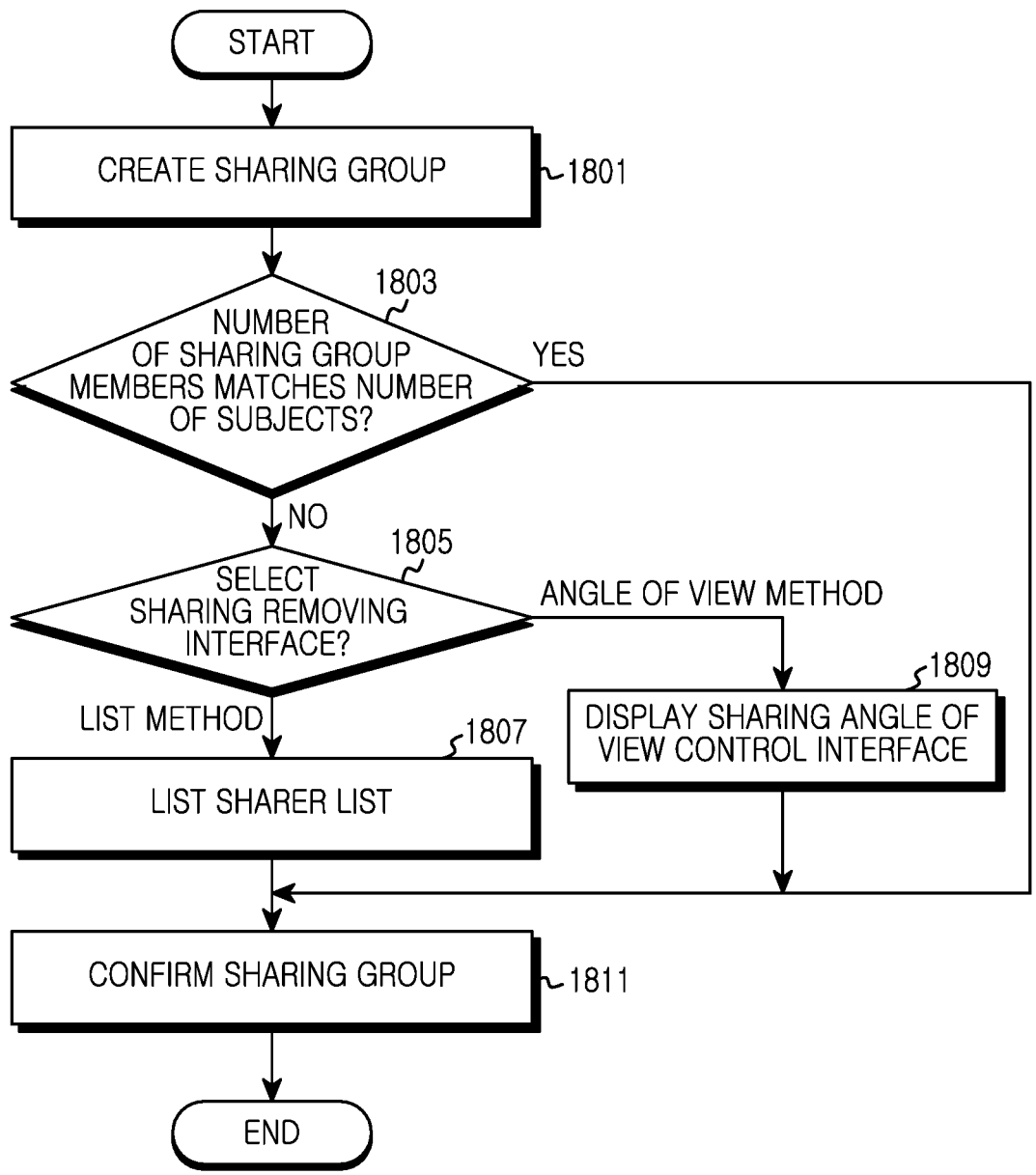
FIG. 18 depicts a procedure for confirming a sharing group in an electronic device according to an embodiment of the present invention.

As described above, after the sharing group is created, when the number of the sharers of the created sharing group and the actual number of the subjects match, the photographer can confirm the sharing group and proceed with the photographing. However, when the number of the sharers of the created sharing group and the actual number of the subjects do not match, the photographer needs to be able to remove a device which is not the subject. Accordingly, the electronic device according to an embodiment of the present invention performs a procedure for confirming the sharing group. For doing so, the electronic device provides an interface for removing some sharer from the created sharing group, removes the some sharer according to a user's command, and then confirms the sharing group. The confirmation of the sharing group can be performed as shown in FIG. 18. FIG. 18 depicts a procedure for confirming a sharing group in an electronic device according to an embodiment of the present invention. FIG. 18 illustrates an operating method of the electronic device.

Referring to FIG. 18, the electronic device creates a sharing group in step 1801. Specifically, the electronic device defines a sharing area, scans other electronic device in the sharing area, and performs signaling for group addition with respect to at least one other electronic device discovered. For example, the electronic device can create the sharing group as shown in FIG. 17.

Next, the electronic device determines whether the number of sharers of the created sharing group and the number of captured subjects match in step 1803. For example, the electronic device can determine the number of the subjects through face recognition from a preview image. When the number of the sharers and the number of the subjects match, the electronic device goes to step 1811.

When the number of the sharers and the number of the subjects do not match, the electronic device checks a sharer removing interface in step 1805. The sharer removing interface includes a list method or a sharing angle of view control method. When the electronic device can provide both of the list method or the sharing angle of view control method, the electronic device can provide the interface for one of the list method and the sharing angle of view control method based on a predefined criterion. For example, the predefined criterion can be a user's selection or the number of the subjects. When the electronic device can provide only one of the list method and the sharing angle of view control method, the electronic device can provide the one possible method.

When providing the list method, the electronic device displays a sharer list in step 1807. The sharer list displays identification information of sharers in the sharing group created in the step 1801. The identification information can include one of a user name, device identification information, a phone number, and network identification information (e.g., Media Access Control (MAC) address, Internet Protocol (IP) address, etc.). Hence, the user can remove some sharer from the sharer list. An example of a specific interface for displaying the sharer list shall be explained by referring to FIG. 20.

When providing the sharing angle of view control method, the electronic device displays an interface for controlling the sharing angle of view in step 1809. Hence, the user can add or remove a sharer by changing the sharing angle of view. When the sharing angle of view is changed, the procedure of FIG. 17 can be performed again. An example of a specific interface for controlling the sharing angle of view shall be explained by referring to FIG. 21.

Next, the electronic device confirms the sharing group in step 1811. That is, when the number of the sharers and the number of the subjects match in step 1803, the sharing group created in the step 1801 is confirmed as a final sharing group. By contrast, when the number of the sharers and the number of the subjects do not match in step 1803, the sharing group changed in the step 1807 or the step 1809 is confirmed as the final sharing group.

In the procedure of FIG. 18, the electronic device determines whether to remove the sharer based on the number of the sharers and the number of the subjects in the step 1803. However, determining whether to remove the sharer based on the number of the sharers and the number of the subjects is an example, and the procedure for removing the sharer of the sharing group can be performed based on a different criterion. For example, a user's determination, not the electronic device, can proceed with the procedure for removing the sharer. In this case, the step 1803 can be replaced by the step for checking the user's command.

Figure 21A:
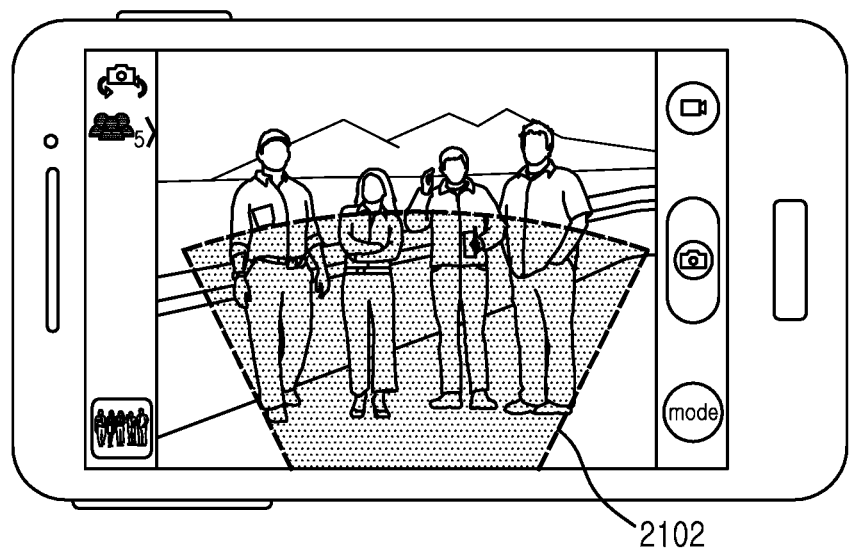
FIG. 21 depicts an example of a UI/UX for changing a sharer in an electronic device according to an embodiment of the present invention.
Figure 21B:
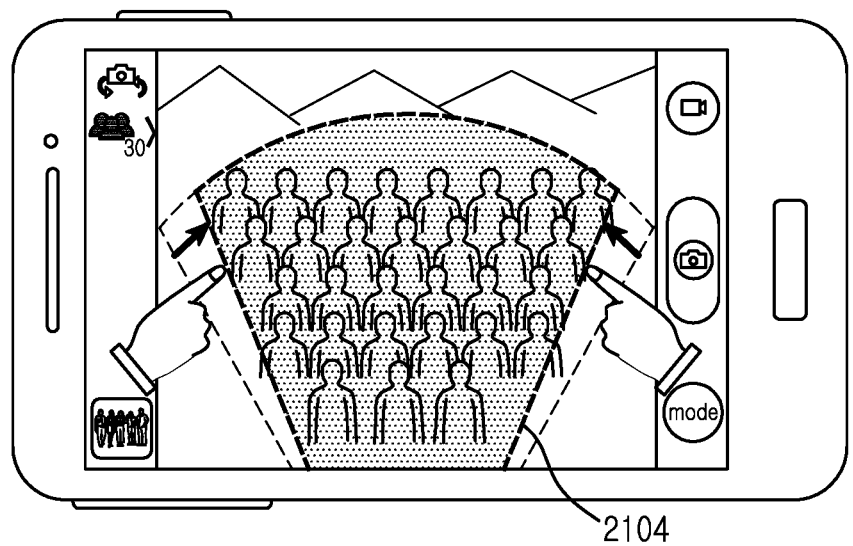

As described above, the sharing group can be determined. To determine the sharing group, users' manipulation such as application execution and sharer change can be required. In the following, FIG. 19 through FIG. 21 depict UI/UXs applicable to determine the sharing group.

Figure 19A:
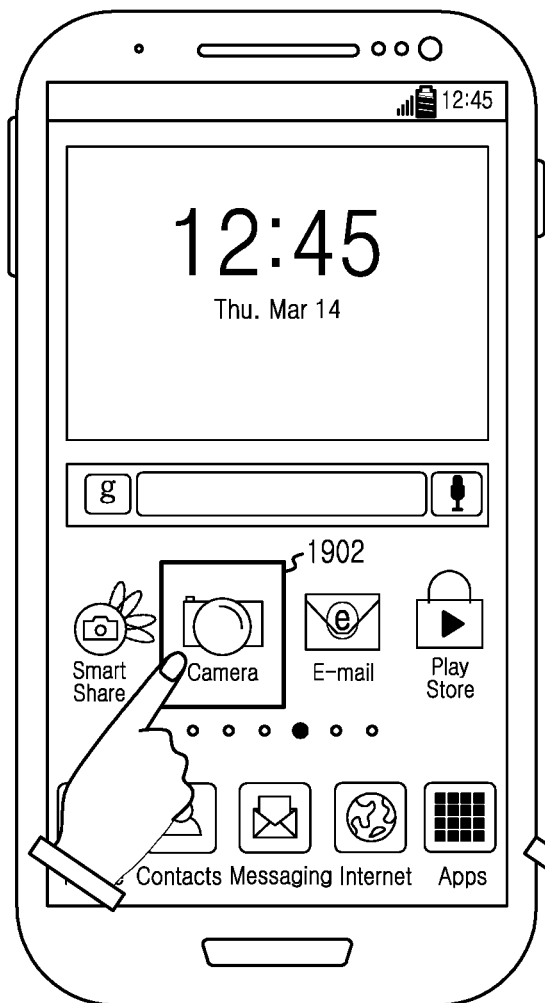
FIG. 19 depicts an example of application execution for data sharing in an electronic device according to an embodiment of the present invention.
Figure 19B:
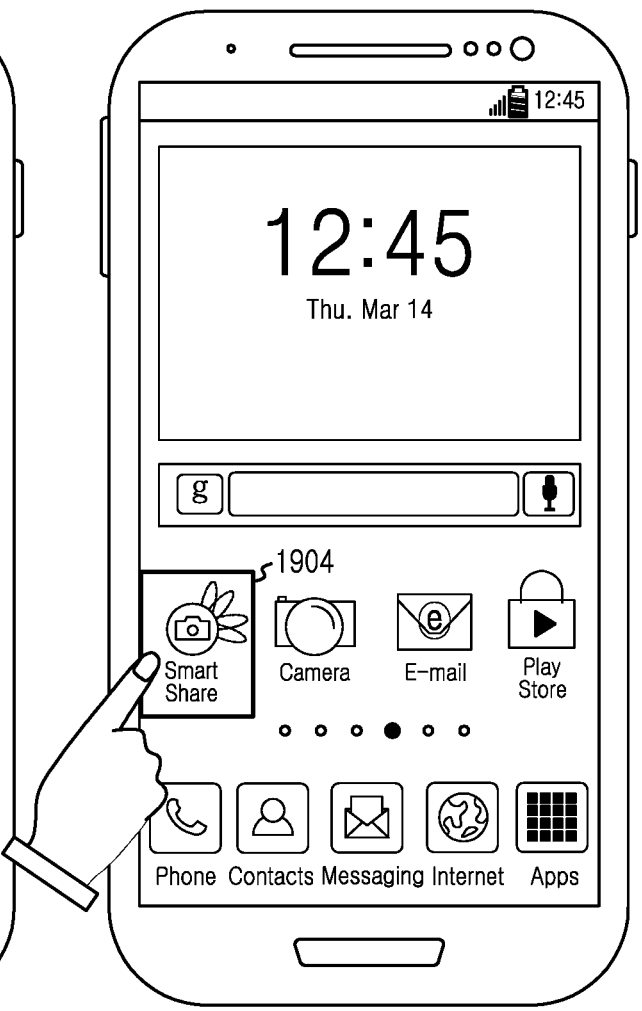
Figure 20B:
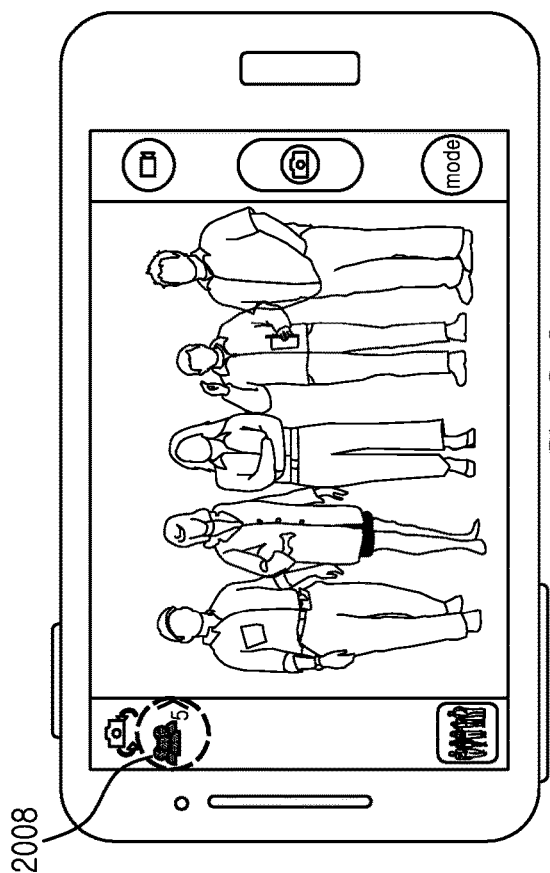
FIG. 20 depicts an example of a User Interface (UI)/User Experience (UX) for determining a group in an electronic device according to an embodiment of the present invention.
Figure 20D:
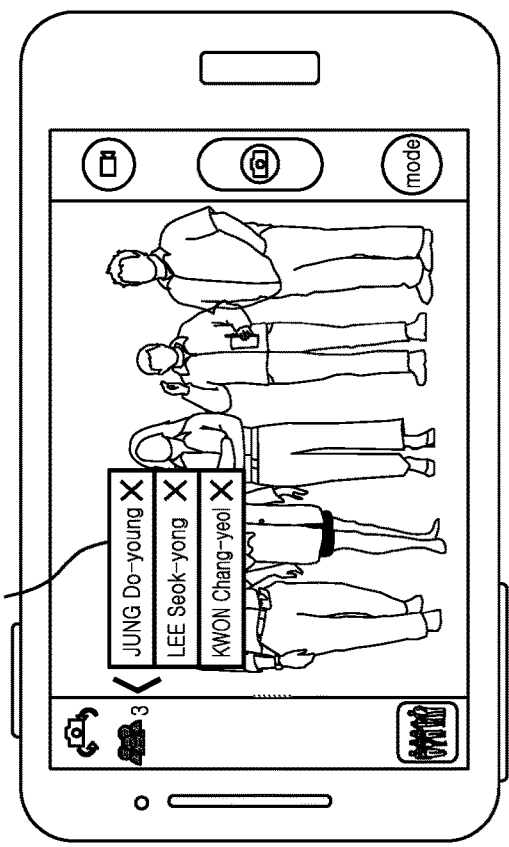
Figure 20A:
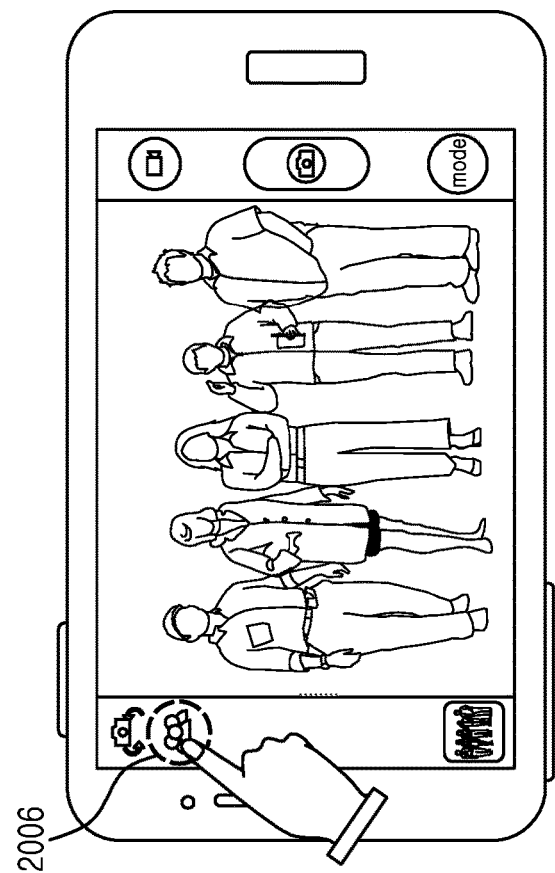
Figure 20C:
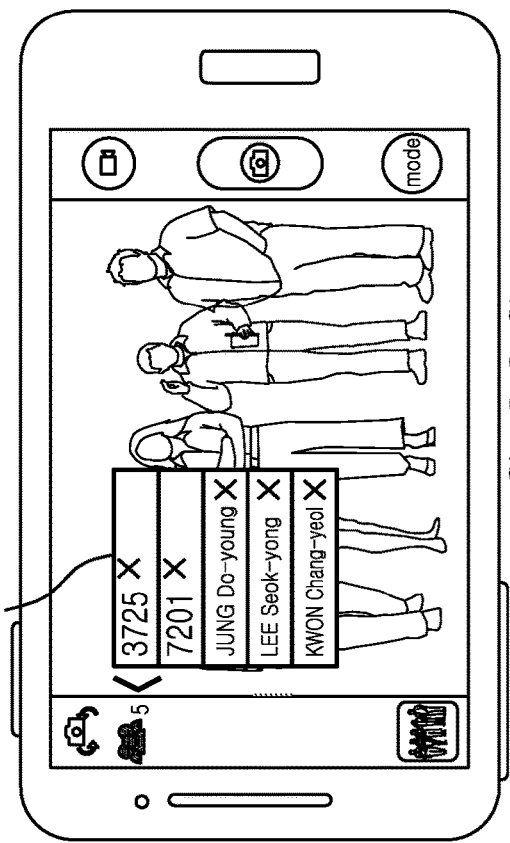

FIG. 19 depicts an example of application execution for data sharing in an electronic device according to an embodiment of the present invention.

In FIG. 19, (a) shows an application execution example for providing data, that is, in an electronic device of a photographer, and (b) shows an application execution example for receiving data, that is, in an electronic device of a sharer. As shown in (a) of FIG. 19, the photographer executes a camera application by selecting a camera application icon 1902. Also, as shown in (b) of FIG. 19, the sharer executes a sharing application by selecting a sharing application icon 1904. Alternatively, the sharer can allow content sharing through the camera application through device setting. Thus, the electronic device of the sharer enters a mode for receiving the sharing request signal and transmitting the sharing response signal.

FIG. 20 depicts an example of a UI/UX for determining a group in an electronic device according to an embodiment of the present invention. FIG. 20 depicts, as the UI/UX provided from an electronic device of a photographer, the UI/UX provided while creating an initial sharing group and changing sharers. FIG. 20 depicts the list method. Hereafter, to ease explanations, the electronic device of the photographer is referred to as a 'photographing device'.

Referring to FIG. 20, as shown in initial (a), the electronic device displays a preview image and a button 2006 for creating a sharing group. When a user selects the button 2006 for creating a sharing group, the electronic device performs a sharing group creating procedure. For example, the electronic device can perform the sharing group creating procedure as shown in FIG. 17.

Next, when the sharing group is created, as shown in (b), an indicator 2008 indicating the number of sharers in the created sharing group is displayed. Hence, the user can compare the number of subjects and the number of the sharers, and determine whether they match. In so doing, when the number of the subjects and the number of the sharers match, the user commands to take a picture. However, when the number of the subjects and the number of the sharers do not match, the user can change the sharers by selecting the indicator 2008. That is, the indicator 208 not only displays the number of the sharers also functions a UI (e.g., a button) for commanding the sharer change. According to another embodiment of the present invention, without the user's command, the electronic device can determine whether the number of the subjects and the number of the sharers match based on a face recognition result in the preview image.

When the sharer change is processed, as shown in (c), the electronic device displays a list 2010 of the sharers. The list 2010 includes identification information of sharers included in a current sharing group. In FIG. 20, the identification information is a user name or device identification information. For example, when a corresponding sharer is a user registered in an address book of the photographing device, the name can be displayed. For example, based on a previous sharing record and whether or not a user is registered, a plurality of sharers can be summarized in one identification information. Hence, the user can remove at least one sharer. When some sharer is removed, as shown in (d), the electronic device displays a list 2012 of the remaining sharers.

FIG. 21 depicts an example of a UI/UX for changing a sharer in an electronic device according to an embodiment of the present invention. FIG. 21 shows the UI/UX provided when a sharer is changed. FIG. 21 shows the sharing angle of view control method.

The UI/UX provided when the sharing group is created can be similar to (a) and (b) of FIG. 20. Next, when the sharer is changed according to the user's command or the determination of the electronic device, as shown in (a) or (b) of FIG. 21, the electronic device displays sharing angle of views 2102 and 2104. As shown in FIG. 21, the sharing angle of views 2102 and 2104 can include regions divided with color superimposed on a preview image, and can be represented translucently so as to view the preview image. The sharing angle of views 2102 and 2104 can be changed by a user's manipulation (e.g., drag). In (b) of FIG. 21, the angle of view is narrowed. When the sharing angle of views 2102 and 2104 are changed by a user's manipulation, the electronic device can re-perform the sharing group creating procedure.

As mentioned above, the sharing group is determined through the sharing candidate selection, the sharing group creation, and the sharing group confirmation. As shown in the embodiment explained by referring to FIG. 17, the signaling for the scanning and the signaling for creating the sharing group are conducted between the electronic devices. However, the signaling between the electronic devices may be infeasible. Namely, direct communication between the electronic devices may not be supported. In this case, the signaling between the electronic devices cannot be carried out.

The transmit power, the beamwidth, and the beam set of the signal applied to the signaling are determined to distinguish electronic devices located in the sharing area determined based on the angle of view of the camera. That is, the signaling, particularly, the signaling for the scanning is conducted to identify the electronic devices in the sharing area. Accordingly, when it is possible to locate other electronic devices, the signaling for the scanning can be replaced by the locating.

Thus, according to another embodiment of the present invention, the electronic device can determine locations of other electronic devices using a multi-access network. Herein, the multi-access network is a network for communicating with other electronic device via a third control node such as base station, AP, or PCP, and includes, for example, a cellular network, a wireless LAN, a wireless Personal Area Network (PAN), and so on. Thus, when the direction communication between devices is infeasible and indirect communication via the control node is allowed, the electronic device can create the sharing group based on the locations of the other electronic devices.

Figure 22:
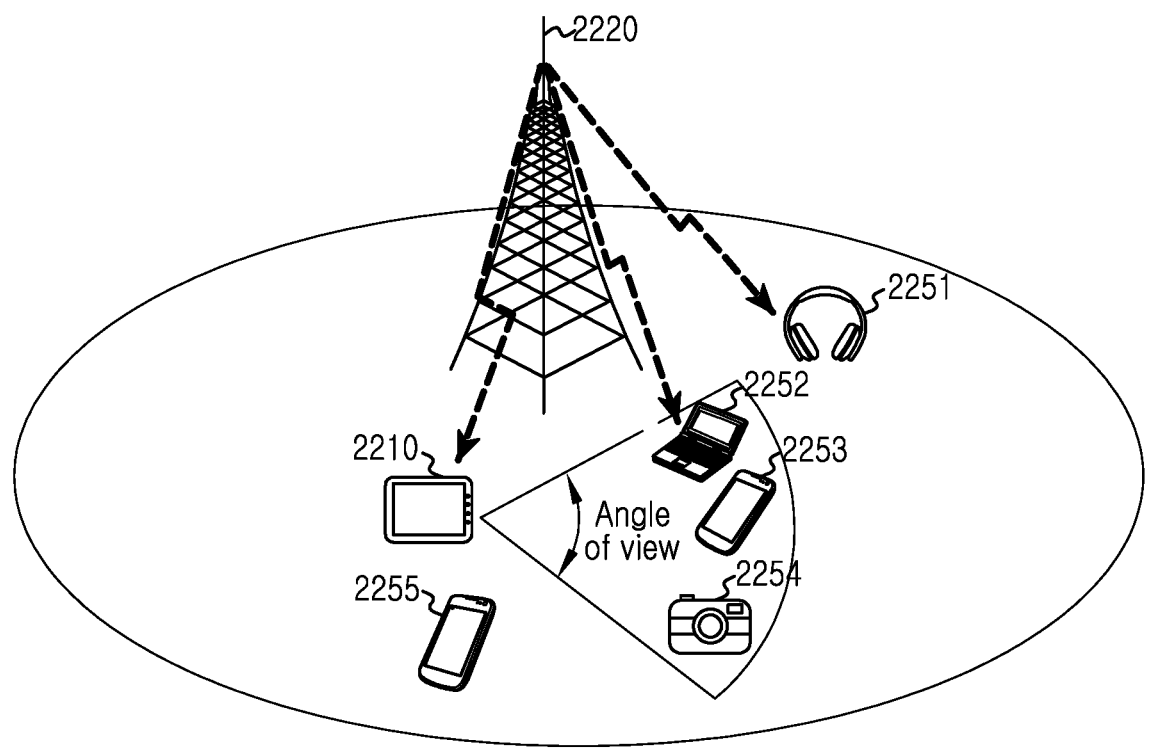
FIG. 22 depicts an example when direct communication is not supported in an electronic device according to an embodiment of the present invention.

To ease explanations, the present invention describes a situation of FIG. 22 as an example. FIG. 22 depicts an example when direct communication is not supported in an electronic device according to an embodiment of the present invention. Referring to FIG. 22, a photographing device 2210 and a plurality of other electronic devices 2251 through 2255 are positioned in a cell of a base station 2220. At this time, electronic devices 2252 through 2254 of subjects reside within a camera angle of view of the photographing device 2210. However, direct communications between the photographing device 2210 and the other electronic devices 2251 through 2255 are not possible, and communication via the base station 2220 is possible.

Figure 23:
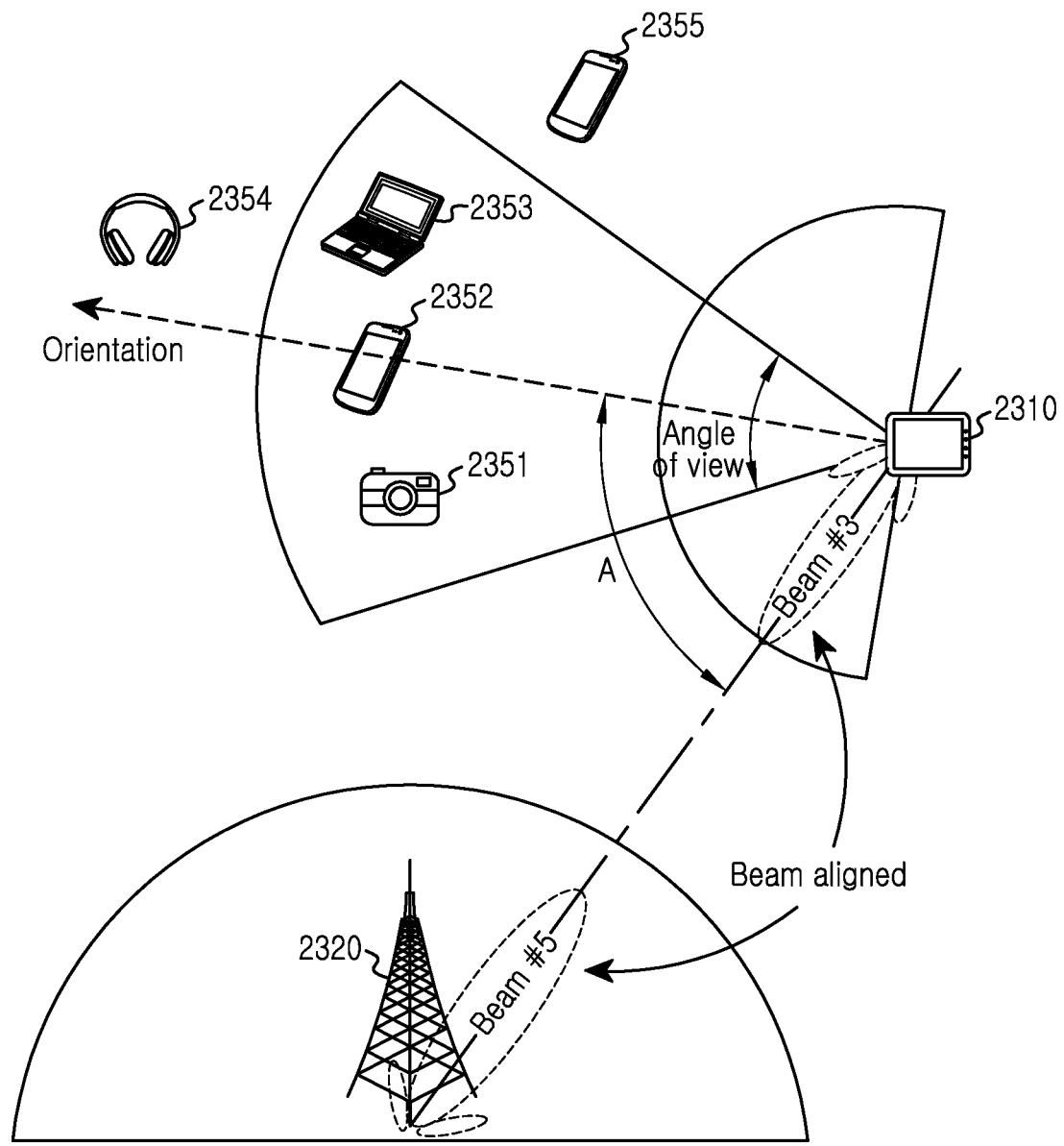
FIG. 23 depicts another example of determining locations of other electronic devices using a multi-access network in an electronic device according to an embodiment of the present invention.

At this time, the photographing device 2210 can determine locations of the other electronic devices 2251 through 2255 as shown in FIG. 23. FIG. 23 depicts another example of determining locations of other electronic devices using a multi-access network in an electronic device according to an embodiment of the present invention.

Referring to FIG. 23, although a base station 2320 locates a photographing device 2310 and other electronic devices 2351 through 2355, electronic devices 2352 through 2354 included in an angle of view of the photographing device 2310 cannot be identified directly from the location information based on the base station 2320. In terms of the base station 2320, to determine the angle of view of the photographing device 2310, a particular electronic device needs to know not only the location of the photographing device 2310 but also an orientation angle of the photographing device 2310. The orientation angle indicates an angle at which a front side of a camera lens of a corresponding electronic device faces.

Since the base station 2320 and the photographing device 2310 are being connected, beam alignment between the base station 2320 and the photographing device 2310 is completed. The beam alignment can be performed through a beam training procedure or a separate procedure, and can be completed based on the signal strength. Based on the beam alignment, a direction between the base station 2320 and the photographing device 2310 can be obtained. When both of the base station 2320 and the photographing device 2310 define the direction for the other party as a reference, a relative angle for the orientation can be determined. In FIG. 23, the base station 2320 fulfills the beam alignment through a beam #5 and the photographing device 2310 fulfills the beam alignment through a beam #3. That is, the base station 2320 can define the direction of the beam #5 as the reference, and the photographing device 2310 can define the direction of the beam #3 as the reference. In FIG. 23, an angle difference of the orientation of the photographing device 2310 is expressed as A. When transmitting the group request signal, the photographing device 2310 can include the angle difference A in the group request signal. Hence, the base station 2320 can estimate the orientation of the photographing device 2310.

Specifically, the photographing device 2310 transmits the distance information of the subject obtained through the AF, the angle of view information, and the angle difference information against the reference after the beam alignment, to the base station 2320. Based on the information received from the photographing device 2310 and the locations of the other electronic device 2351 through 2355, the base station 2320 can identify the electronic devices 2322 through 2324 located in the sharing area among the other electronic devices 2351 through 2355. When sharing data using the multi-access network, specific operating procedures of the photographing device 2310 and the base station 2320 are explained by referring to FIG. 24 and FIG. 25.

Figure 24:
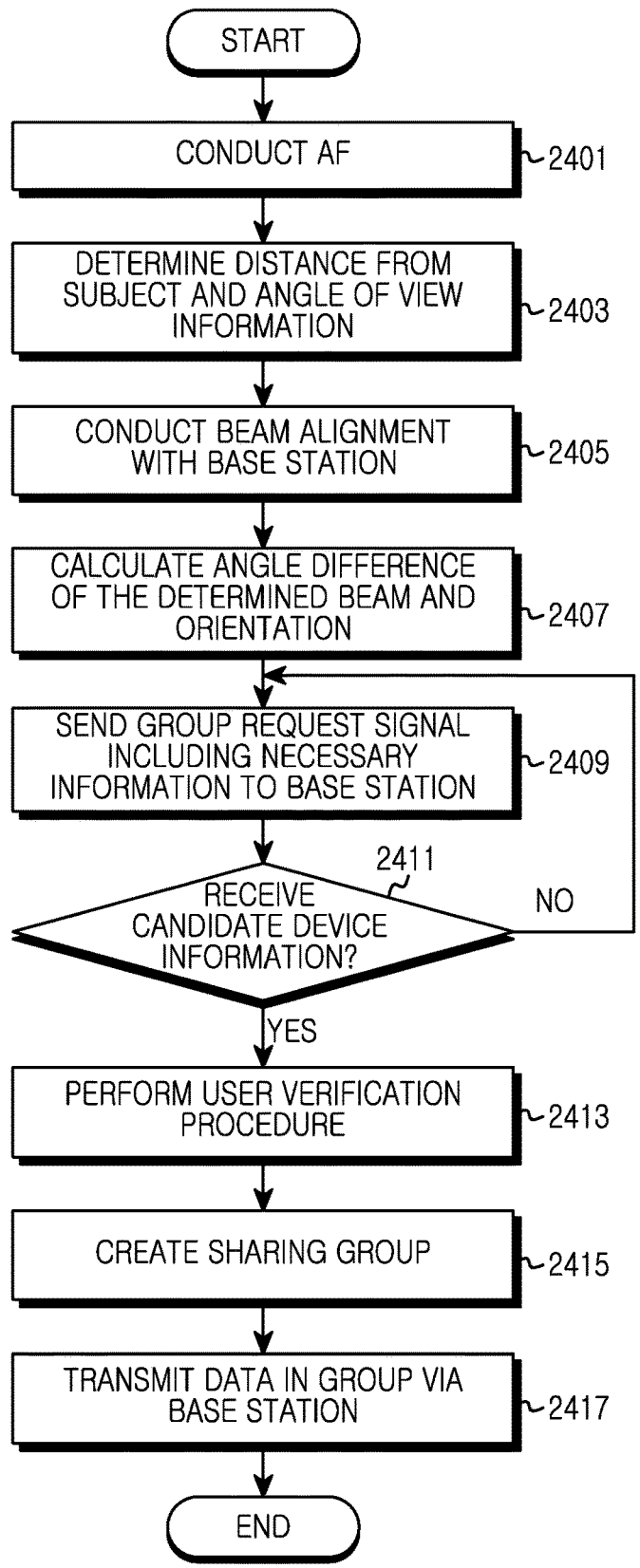
FIG. 24 depicts an operation procedure of an electronic device for sharing data using a multi-access network in the electronic device according to an embodiment of the present invention.

FIG. 24 depicts an operation procedure of an electronic device for sharing data using a multi-access network in the electronic device according to an embodiment of the present invention. FIG. 24 illustrates an operating method of the electronic device.

Referring to FIG. 24, the electronic device performs the AF in step 2401. The AF is the function for a device itself to focus on the subject. The AF can be conducted based on a distance from a subject calculated by detecting reflection of infrared light or ultrasonic waves, or based on sharpness of an input image.

After the AF, the electronic device determines a distance from a subject and angle of view information in step 2403. The angle of view and the distance from the subject can be determined by an operation parameter of a camera of the electronic device. The operation parameter includes a focal length, and a distance between a lens and an image sensor after the AF. For example, the distance between the lens and the image sensor is determined by the AF, and the distance from the subject can be determined based on the focal length regarding the angle of view and the distance between the lens and the image sensor. Also, the angle of view can be determined by the focal length. For example, the electronic device can determine the angle of view using the relation of Equation 1. Also, the electronic device can determine the distance from the subject using the relation of Equation 2.

Next, the electronic device performs beam alignment with a base station in step 2405. The beam alignment is the procedure for determining a beam direction facing each other between the electronic device and the base station. For example, one of the electronic device and the base station can repeatedly transmit a pre-arranged signal (e.g., training signal, sync signal, preamble, etc.) over transmit beams of different directions, and the other can receive the signals repeatedly transmitted, over different receive beams. Thus, the electronic device can determine a pair of an optimal transmit beam and an optimal receive beam having the greatest received signal strength. Next, the electronic device can transmit or receive information of the optimal beam pair to the base station or from the base station. Through the beam alignment, the electronic device and the base station can set the same angle reference.

After the beam alignment, the electronic device calculates an angle difference between the aligned beam and an orientation in step 2407. The orientation indicates a direction in which a front side of the camera lens of the corresponding electronic device faces. That is, the electronic device calculates a relative angle of the orientation based on the aligned direction.

Next, the electronic device transmits a group request signal including necessary information to the base station in step 2409. The group request signal is the message or the frame which requests other electronic devices to participate in the sharing group, and can include at least one of a message or frame type, user identification information, content related information to share, and a data processing scheme. In particular, the group request signal can further include information of the distance from the subject, the orientation angle, the angle of view, and the angle difference. Accordingly, the base station can estimate the orientation of the electronic device. Herein, the distance from the subject can be replaced by an operation parameter of the camera of the electronic device.

Next, the electronic device determines whether information of a candidate device is received in step 2411. The candidate device information can be included in a group response signal. The group response signal is a message or frame notifying that the other electronic device receiving the group request signal participates in the group, and can include at least one of a message or frame type, user identification information, and hardware/software capability information. When not receiving the candidate device information within a predefined time, the electronic device can determine that the candidate device information is not received. When not receiving the candidate device information, the electronic device returns to the step 2409.

When receiving the candidate device information, the electronic device performs a user verification procedure in step 2413. The user verification procedure can include at least one of an operation for checking whether the number of candidate devices provided from the base station and the number of subjects match, and an operation for removing some candidate device. Herein, whether the number of the candidate devices and the number of the subjects match can be determined by the user or by the electronic device.

Next, the electronic device determines a sharing group in step 2415. In other words, the electronic device confirms the sharing group to include the candidate devices confirmed by the user verification procedure.

After determining the sharing group, the electronic device transmits data to the other electronic devices in the group via the base station in step 2417. That is, since the direct communication between electronic devices is not possible, the electronic device transmits the data via the base station. The data can be transmitted after a photo is taken. The data can include contents such as photo and video.

Figure 25:
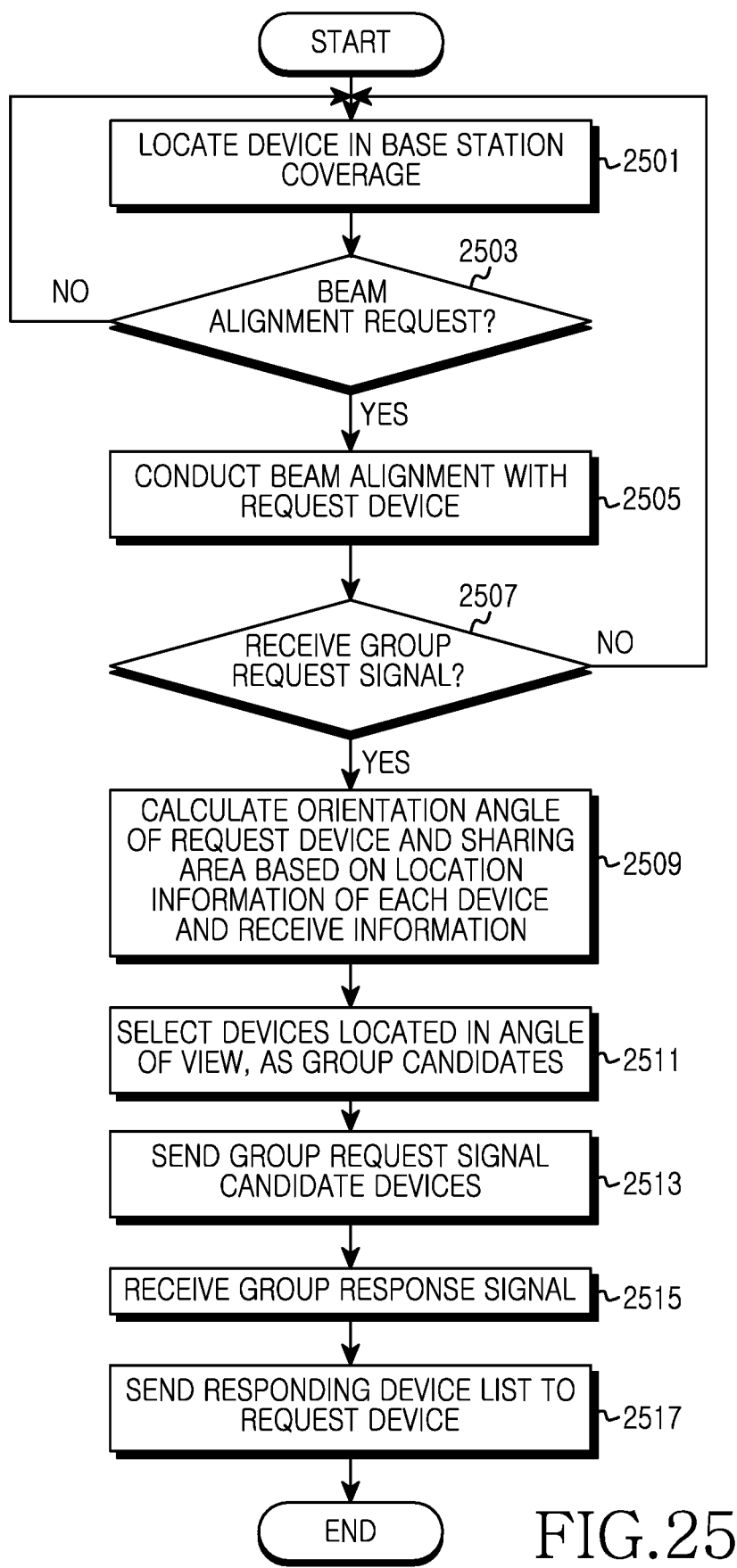
FIG. 25 depicts an operation procedure of a base station for sharing data using a multi-access network in an electronic device according to an embodiment of the present invention.

FIG. 25 depicts an operation procedure of a base station for sharing data using a multi-access network in an electronic device according to an embodiment of the present invention. FIG. 25 illustrates an operating method of the base station.

Referring to FIG. 25, the base station performs location estimation with respect to electronic devices located in coverage in step 2501. The location estimation can be conducted in various manners. For example, the base station can transmit a radio signal for the location estimation, and receive feedback of estimated location information from each electronic device. For example, the location estimation can be conducted using beam direction, signal power, Time Difference Of Arrival (TDOA), Global Positioning System (GPS), and so on.

Next, the base station determines whether beam alignment is requested from the electronic device in step 2503. Hereafter, to ease explanations, the electronic device requesting the beam alignment is referred to as a 'request device' or a 'source device'.

When the beam alignment is requested, the base station performs the beam alignment procedure in step 2505. The beam alignment is the procedure for determining a beam direction facing each other between the request device and the base station. For example, the base station can use the AoA of the signal obtained in the location estimation. For example, one of the request device and the base station can repeatedly transmit a pre-arranged signal (e.g., training signal, sync signal, preamble, etc.) over transmit beams of different directions, and the other can receive the signals repeatedly transmitted, over different receive beams. Thus, the base station can determine a pair of an optimal transmit beam and an optimal receive beam having the greatest received signal strength. Next, the base station can transmit or receive information of the optimal beam pair to or from the request device. Through the beam alignment, the electronic device and the base station can set the same angle reference.

Next, the base station determines whether a group request signal is received in step 2507. The group request signal is the message or the frame with which the request device requests other electronic devices to participate in a sharing group, and can include at least one of a message or frame type, user identification information, content related information to share, and a data processing scheme. In particular, the group request signal can further include information of the distance between the request device and the subject, the orientation angle of the request device, the angle of view of the request device, and the angle difference between the orientation angle of the request device and the reference angle. That is, the group request signal can include information for determining the sharing area specified by the angle of view of the camera of the request device and the distance from the subject from the request device. Upon receiving the group request signal, the base station estimates the orientation of the request device and calculates the sharing area based on the location information of each electronic device and the information received from the request device in step 2509. For example, the base station estimates the orientation of the request device based on the angle difference, and estimates the sharing area based on the location of the request device, the angle of view, and the distance from the subject.

Next, the base station selects electronic devices located in the angle of view, as candidate devices in step 2511. That is, the base station confirms at least one electronic device located in the sharing area among the electronic devices location-estimated in the step 2501, and selects the confirmed at least one electronic device as the candidate device for sharing data.

After selecting the candidate devices, the base station transmits a group request signal to at least one candidate device in step 2513. The group request signal is the message or the frame for the request device to request the other electronic devices to participate in the sharing group, and can include at least one of a message or frame type, user identification information, content related information to share, and a data processing scheme.

Next, the base station receives at least one group response signal in step 2515. The group response signal is a message or a frame notifying that the electronic device receiving the group request signal participates in the group, and can include at least one of a message or frame type, user identification information, and hardware/software capability information.

After receiving the group response signal, the base station transmits a list of the responding electronic devices to the request device in step 2517. That is, the base station transmits the list of at least one other electronic device which notifies the group participation, to the request device. Next, although not depicted in FIG. 25, the base station can receive data from the request device and transmit the data to the at least one other electronic device which responds.

In the embodiment described by referring to FIG. 22 through FIG. 25, it is assumed that the direct communication between the electronic devices is not possible. However, the location recognizing procedure via the control node explained by referring to FIG. 22 through FIG. 25 can be performed even when the direct communication is possible. For example, when the direct communication is possible but periphery location recognition is difficult or impossible, or to increase accuracy of the periphery location recognition, the electronic device and the control node can perform the above-mentioned procedure.

That is, the electronic device can create the sharing group based on the location information owned or measured by the control node or the other electronic device. Specifically, the electronic device can receive relative location information owned or measured by the other electronic device, identify other electronic devices located in the angle of view, and then transmit the group request signal. For doing so, although the direct communication is possible, the electronic device performs the beam alignment and provides the base station with the angle difference between the orientation angle and the aligned beam. The base station detects the other electronic devices located in the angle of view using the angle difference, and provides information about the other electronic devices to the electronic device.

In this case, since the exchange of the group request/response signal is not performed between the control node and the other electronic devices, the information about all of the other electronic devices located in the angle of view is provided. That is, in FIG. 25, the steps 2513 and 2515 can be omitted. Also, the group request signal received in the step 2507 of FIG. 25 can exclude information about the data sharing (e.g., information relating to contents to share, data processing scheme, etc.), and include only information for determining the sharing area (e.g., the angle of view, the angle difference between the orientation angle and the reference angle, etc.). Also, in FIG. 24, the electronic device can receive the candidate device information in the step 2411, and then transmit the group request signal to at least one other electronic device indicated by the candidate device information. Also, in the step 2417 of FIG. 24, the electronic device can transmit data to the at least one other electronic device, rather than the base station.

To supplement the scanning through the signaling, in addition to the signal transmission for the scanning, the electronic device can request and receive the information about the other electronic devices. That is, direct scanning by the signaling and indirect scanning via the control node can be performed together, or selectively.

A dynamic group management procedure based on a group lifetime is as follows. The lifetime indicates the time when the created sharing group is effectively maintained. The lifetime proceeds after the sharing group is created, and the sharing group can be reused until the lifetime expires. That is, the lifetime is defined in order to reutilize the sharing group which is created once. Hence, the user can assign the lifetime to the sharing group, freely share contents during a period until the lifetime expires, and release the sharing relation after the lifetime expires. By use of the lifetime, the dynamic sharing group management is possible. For example, to share photos and video footage taken with companies during a travel, when a travel duration is defined as the lifetime, free content sharing is possible during a corresponding travel.

Figure 26:
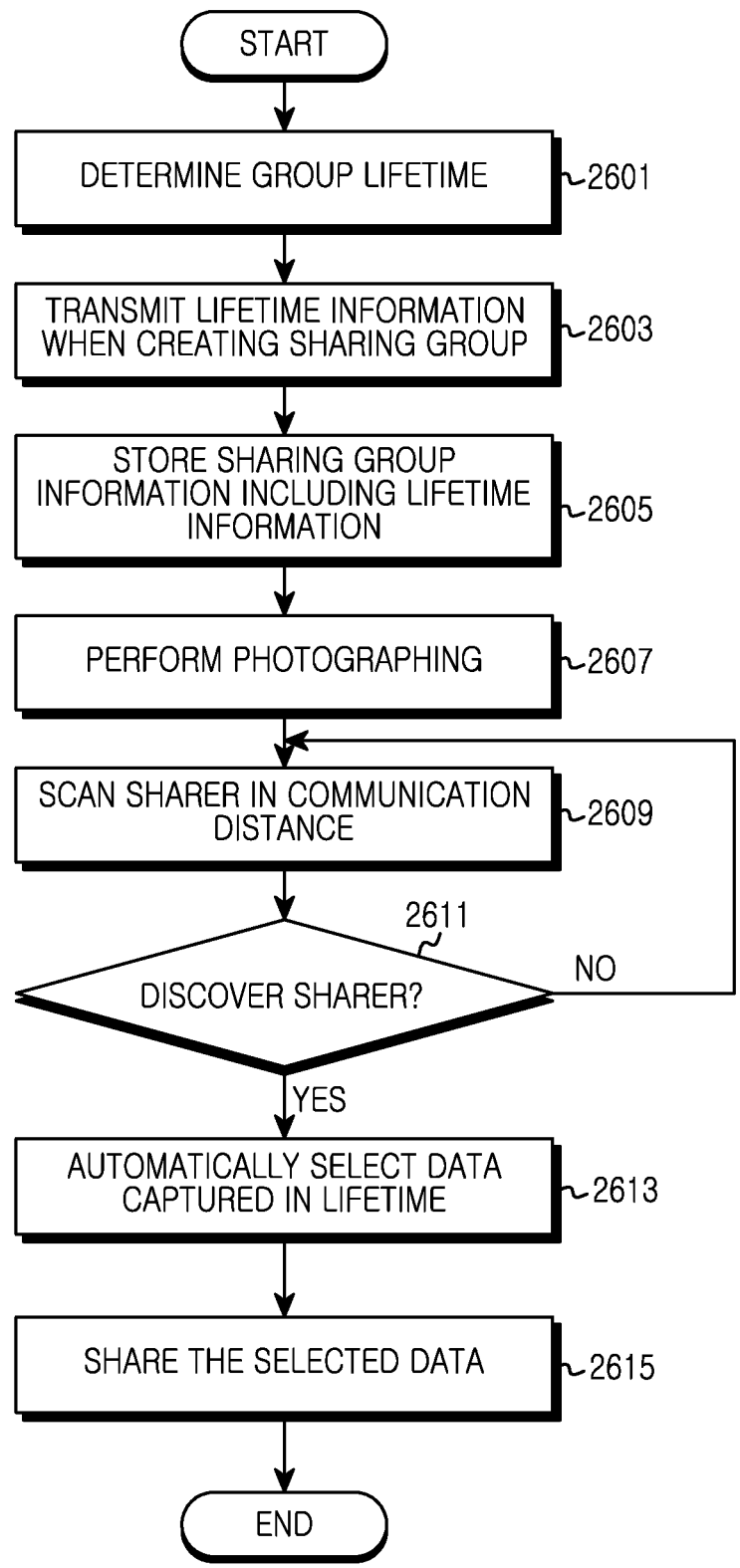
FIG. 26 depicts a data sharing procedure based on a lifetime in an electronic device according to an embodiment of the present invention.

A data sharing procedure based on the lifetime can be conducted as shown in FIG. 26. FIG. 26 depicts a data sharing procedure based on a lifetime in an electronic device according to an embodiment of the present invention. FIG. 26 illustrates an operating method of the electronic device.

Referring to FIG. 26, the electronic device determines a group lifetime in step 2601. The lifetime can be determined according to a user's input. According to another embodiment of the present invention, the electronic device can determine the lifetime according to a predefined rule without user's intervention.

Next, the electronic device transmits lifetime information when creating the sharing group in step 2603. That is, although not depicted in FIG. 26, the electronic device can perform the sharing group creation procedure. During the sharing group creation procedure, the electronic device can transmit a group request signal and receive a group response signal. In so doing, the lifetime information can be included in the group request signal. For example, as shown in FIG. 27, the lifetime information can include at least one of an element identifier (ID) 2701, a length 2704, a group lifetime 2706, and a lifetime unit 2708. The group lifetime 2706 indicates a validity period of the sharing group, and the lifetime unit 2708 indicates a unit of a set value in the group lifetime 2706. The group lifetime 2706 can be set in various units such as day, hour, minute, second, etc. For example, when the lifetime is one hour, the 'group lifetime 2706' can be set to '1' and the 'lifetime unit 2708' can be set to 'hour'. For example, when the lifetime is three days, the 'group lifetime 2706' can be set to '3' and the 'lifetime unit 2708' can be set to 'day. The lifetime information can be referred to as a group lifetime Information Element (IE).

Next, the electronic device stores information about the sharing group including the lifetime information in step 2605. The lifetime can be defined per sharing group. Accordingly, when a plurality of sharing groups is determined, the lifetime is managed independently per sharing group.

After storing the lifetime information, the electronic device performs photographing in step 2607. That is, the electronic device takes an image or a video according to a user's command. In so doing, other sharers belonging to the sharing group can photograph at a different place.

After photographing, the electronic device scans a sharer in a communication distance, that is, other electronic device of the sharing group in step 2609. The electronic device can transmit a signal for scanning, and determine whether a response of the signal is received. When direct communication between devices is not supported, the electronic device can request distance information of other electronic device from a control node such as base station, and then determine whether the other electronic device is located in the communication distance based on the distance information.

Next, the electronic device determines whether at least one sharer is discovered in step 2611. When not discovering other electronic device of the sharing group, the electronic device repeats the scanning back in the step 2609. Yet, although another electronic device of the sharing group is discovered, the step 2609 can be performed still because yet another electronic device can be discovered.

By contrast, when discovering another electronic device of the sharing group, the electronic device selects data captured within the lifetime of the sharing group in step 2613. Namely, the electronic device checks contents such as images or videos created before the lifetime expiry after the sharing group is created.

Next, the electronic device shares the selected data in step 2615. That is, the electronic device transmits the data to at least one electronic device discovered in the step 2609. Alternatively, the electronic device receives data from at least one electronic device discovered.

An individual sharing procedure based on a user request is as follows.

Hardware capability, software capability, and resource condition of an electronic device having source data to share, for example, an electronic device of a photographer and other electronic device in a sharing group can differ from each other. For example, some electronic device in the sharing group may not support a particular resolution and a particular compression type. Alternatively, some electronic device may support a particular resolution and a particular compression type, but can prefer other method according to an available resource status. Also, since there can be a difference in a transmission technique and a bandwidth capacity, adaption for the transmission technique is required. Thus, contents are shared within the sharing group, and the sharing can be conducted with a different resolution and compression type according to hardware/software capability and a user's request. In other words, the shared contents can be processed in a manner selected by the electronic device of the sharer.

For the individual sharing procedure based on the user request as stated above, in the signaling for group creation, capability information of each electronic device can be exchanged. A group request signal and a group response signal including the capability information can be constructed as shown in FIG. 28. FIG. 28 depicts a configuration example of control information for sharing in consideration of electronic device characteristics according to an embodiment of the present invention. In FIG. 28, (a) shows a structure of a group request signal, (b) shows a structure of a group response signal, and (c) shows a structure of capability information.

Referring to (a) of FIG. 28, the group request signal can include a type 2802, a user ID 2804, a source type 2806, a resolution 2808, and a compression type 2810. The type 2802 is information for distinguishing the group request signal and the group response signal, and the user ID 2804 is information for identifying an electronic device which transmits the group request signal. The source type 2806 indicates a type of a sharing source, that is, sharing data to share in the sharing group. For example, the source type 2806 can indicate a photo, a video, data, and the like. The resolution 2808 indicates a resolution of data when sharing contents consumed in the form of a display such as photo and video. The compression type 2810 includes information about a compression type when the sharing data is compressed. For example, the compression type 2810 can include a compression type, and necessary information for decompression, and the like. The group request signal can further include lifetime information of FIG. 27 and capability information of (c) of FIG. 28.

Referring to (b) of FIG. 28, the group response signal can include a type 2812, a user ID 2814, a resolution select 2816, and a compression type select 2818. The type 2812 is information for distinguishing the group request signal and the group response signal, and the user ID 2814 is information for identifying an electronic device which transmits the group response signal. The resolution select 2816 includes information about a resolution desired by the electronic device which transmits the group response signal, and the compression type select 2818 includes information about a compression type desired by the electronic device which transmits the group response signal.

Referring to (c) of FIG. 28, the capability information can include an element ID 2822, a length 2824, a supported resolution 2826, and a supported compression type 2828. The capability information can be referred to as a capability IE. The capability information is used to notify the hardware and software capabilities of the electronic device which is the sharing subject, in the sharing group. The supported resolution 2826 includes information about a supportable resolution in addition to a resolution currently set in the electronic device. The supported compression type 2828 includes information about a supportable compression type. An electronic device receiving the capability information can notify intended resolution and compression type through the resolution select 2816 and the compression type select 2818 of the group response signal.

Figure 29:
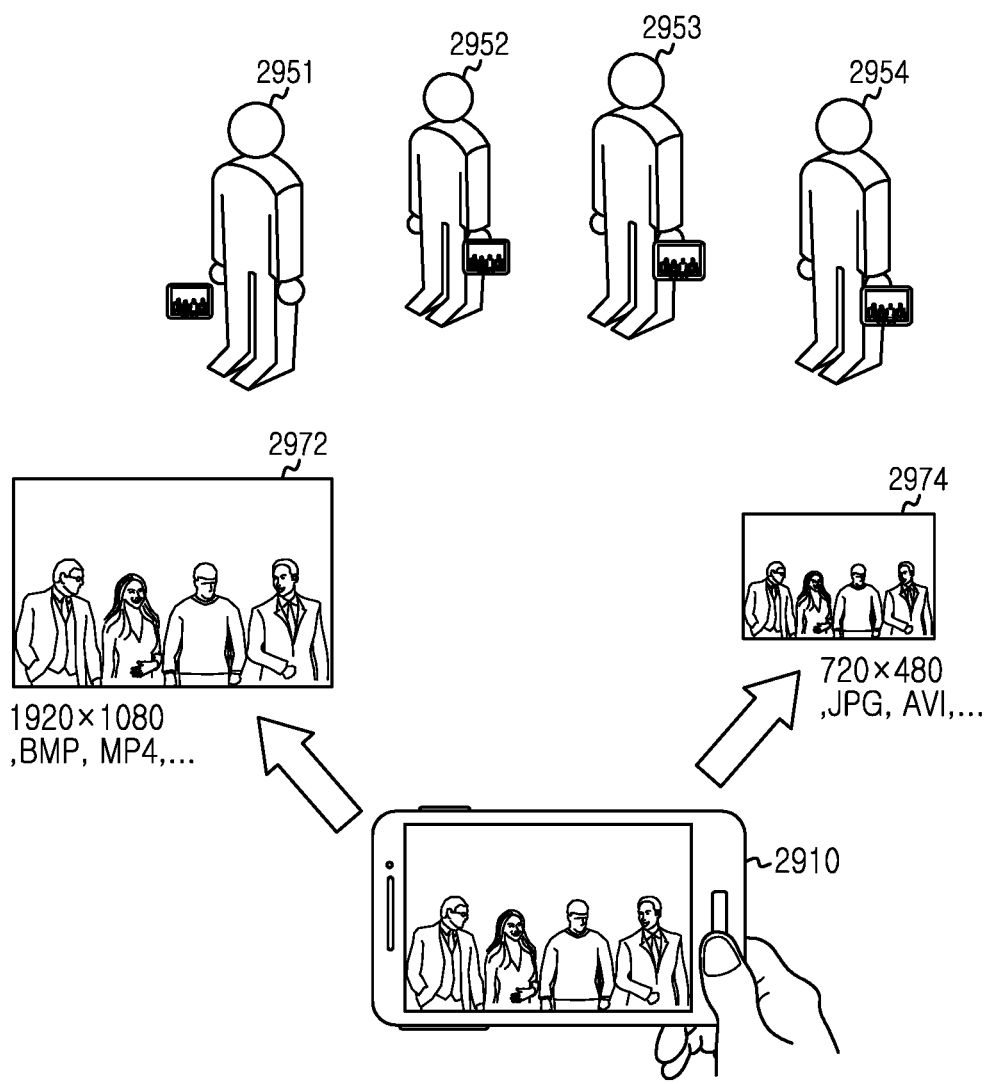
FIG. 29 depicts an example of data sharing in consideration of device characteristics in an electronic device according to an embodiment of the present invention.

Through the control information of FIG. 28, data sharing can be performed as shown in FIG. 29. FIG. 29 depicts an example of data sharing in consideration of device characteristics in an electronic device according to an embodiment of the present invention. Referring to FIG. 29, an electronic device 2910 of a photographer transmits a captured image to other electronic devices 2951 through 2954. In so doing, based on capability information and resource condition of the electronic device 2951, the electronic device 2910 can adjust a resolution of the image to 1920×1080 and encode a file format with BitMap (BMP). Also, based on capability information and resource condition of the electronic device 2954, the electronic device 2910 can adjust the resolution of the image to 720×480 and encode a file format with Joint Photographic coding experts Group (JPG). Alternatively, when transmitting a video, the electronic device 2910 can encode a file format transmitted to the electronic device 2951 with Moving Picture Experts Group-4 (MP4) and a file format transmitted to the electronic device 2954 with Audio Video Interleaved (AVI).

Figure 30A:
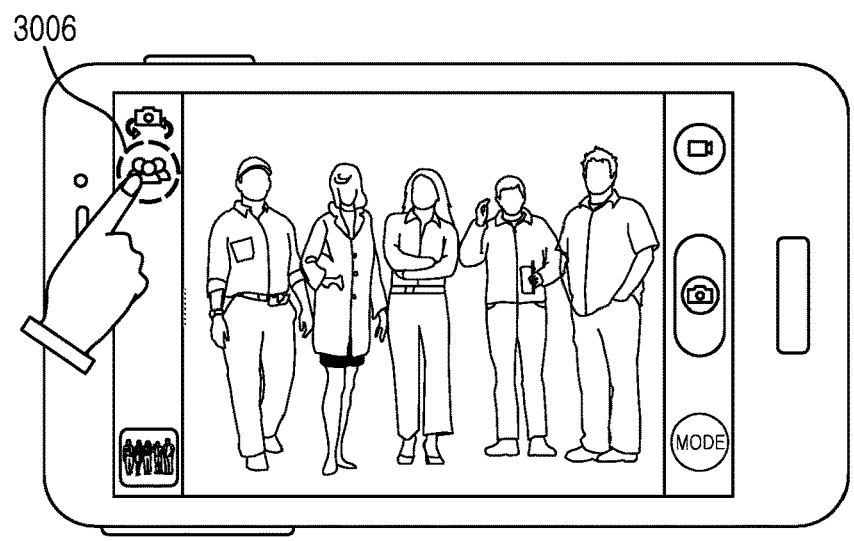
FIG. 30 depicts an example of a UI/UX for data retransmission in an electronic device according to an embodiment of the present invention.
Figure 30B:
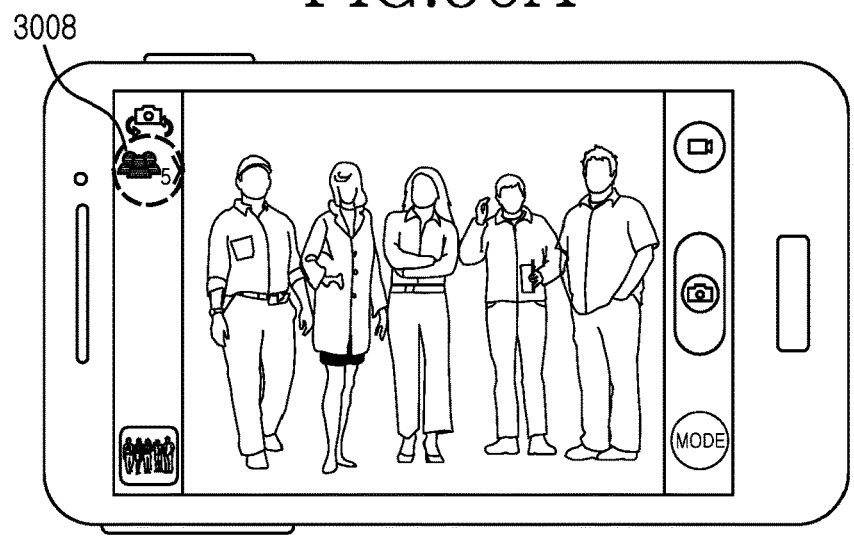
Figure 30C:
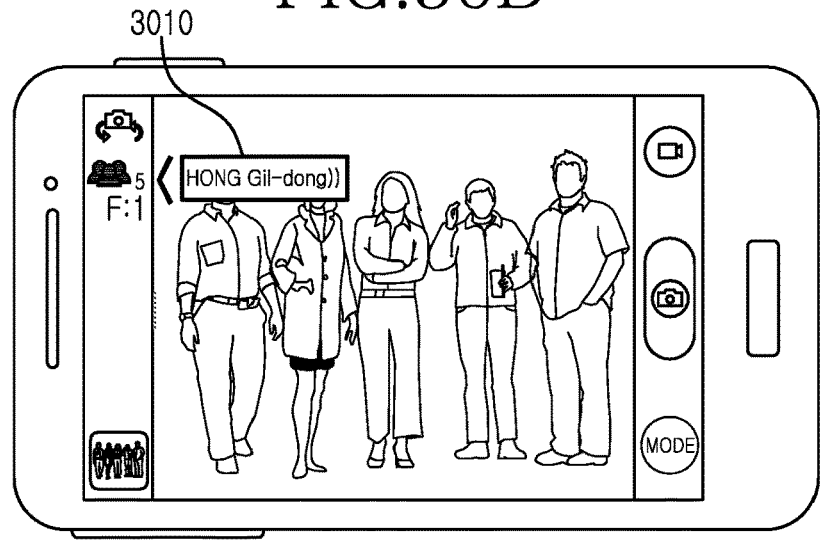

Through the above-stated procedures, the data can be shared. For the data sharing, the electronic device transmits data to other electronic device, but the reception cannot be guaranteed all the time. Accordingly, when the reception fails, a UI/UX for retransmission can be provided as shown in FIG. 30. FIG. 30 depicts an example of a UI/UX for data retransmission in an electronic device according to an embodiment of the present invention.

Referring to (a) of FIG. 30, an electronic device displays a preview image and displays a button 3006 for sharing group creation. When the user selects the button 3006 for the sharing group creation, the electronic device performs a sharing group creation procedure. For example, the electronic device can perform the sharing group creation procedure as shown in FIG. 17.

Next, when the sharing group is created, as shown in (b), an indicator 3008 indicating the number of sharers belonging to the created sharing group is displayed. Hence, the user can compare the number of subjects and the number of the sharers, and determine whether they match. In so doing, when the number of the subjects and the number of the sharers match, the user commands to take a picture. However, when the number of the subjects and the number of the sharers do not match, the user can change the sharers by selecting the indicator 3008. According to another embodiment of the present invention, without the user's command, the electronic device can determine whether the number of the subjects and the number of the sharers match, based on a face recognition result in the preview image.

In FIG. 30, the present invention assumes that the number of the subjects and the number of the sharers match and the shooting is executed immediately. Hence, the electronic device transmits a captured image to electronic devices of the sharers. In so doing, data transmission to the sharer 'HONG Gil-dong' fails. Whether or not the data transmission fails can be determined by receiving Acknowledge (ACK)/Non-ACK (NACK) of the data. Accordingly, as shown in (c) of FIG. 30, the electronic device displays a list 3010 of the transmission failed sharers. Next, the electronic device can retransmit the data according to a user's selection or according to a predefined protocol without user's intervention. The predefined rule can define whether to conduct the retransmission, a retransmission time, and the like.

The retransmission can be performed through a wireless interface different from a wireless interface used in the failed data transmission. That is, the electronic device can increase a success possibility of the retransmission by using different wireless interfaces in the initial transmission and the retransmission. In this case, the electronic device can further conduct the connection establishment procedure for the different wireless interface.

Figure 31:
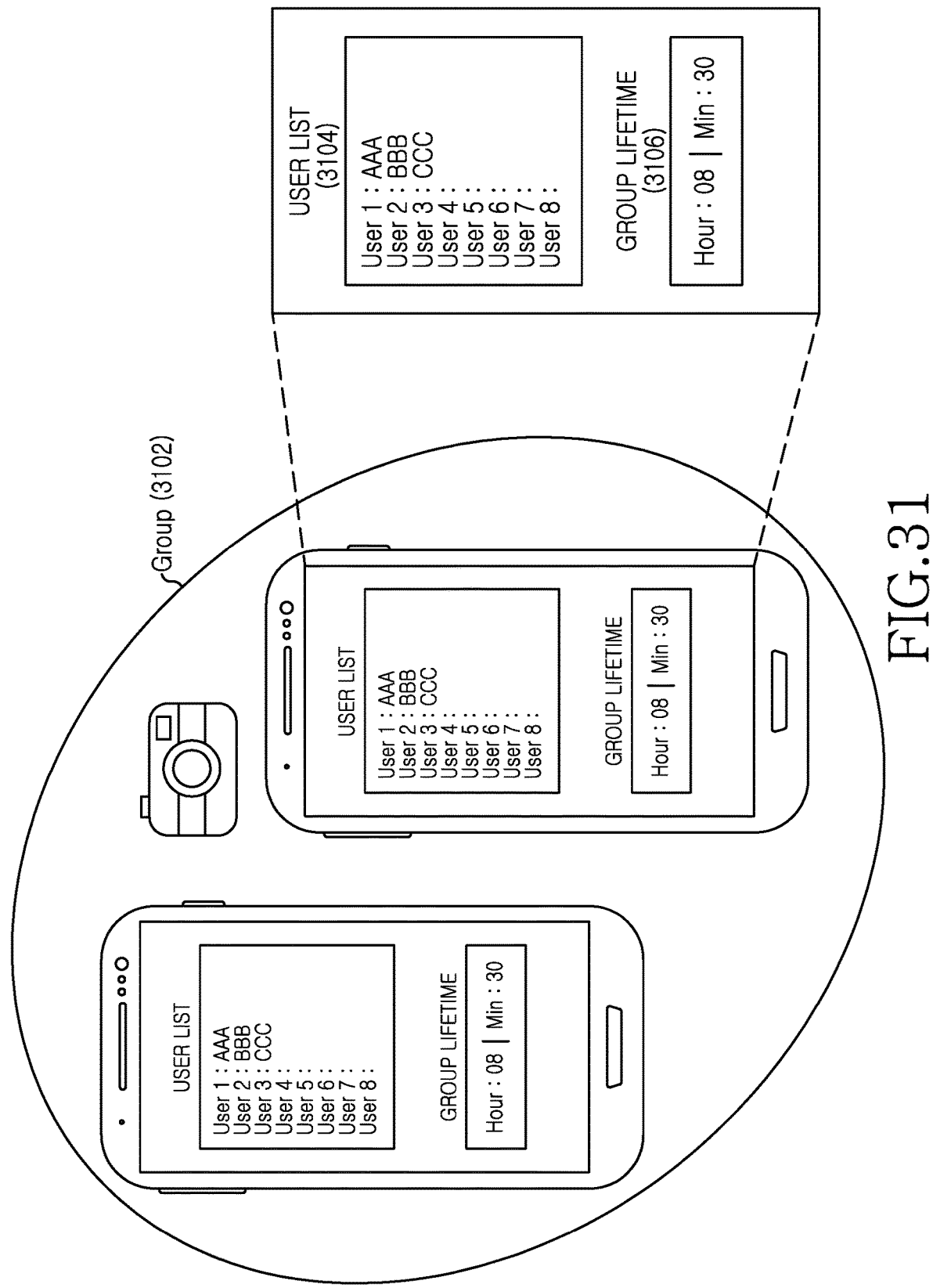
FIG. 31 depicts an example of a UI/UX displaying a lifetime in data sharing in an electronic device according to an embodiment of the present invention.

As stated above, when the lifetime is applied, the lifetime can be displayed to the user through a UI/UX. The UI/UX indicting the lifetime can be configured as shown in FIG. 31. FIG. 31 depicts an example of a UI/UX displaying a lifetime in data sharing in an electronic device according to an embodiment of the present invention. Referring to FIG. 31, a sharing group 3102 includes three electronic devices. At this time, the UI/UX indicating the lifetime can include a list 3104 of sharers included in the corresponding sharing group 3002, and a group lifetime 3106. The group lifetime 3106 can be expressed in hour and minute.

Also, using the lifetime, a service of FIG. 32 is possible. FIG. 32 depicts an example of data sharing using a lifetime in an electronic device according to an embodiment of the present invention. Referring to FIG. 32, an electronic device A 3211, an electronic device B 3212, and an electronic device C 3213 are sharers of the same sharing group. As shown in (a), a user of the electronic device A 3211 takes a picture, and as shown in (b), a user of the electronic device B 3212 takes a picture. Next, as shown in (c), the electronic device A 3211, the electronic device B 3212, and the electronic device C 3213 are located in a mutual communication range. At this time, before the lifetime of the sharing group expires, the electronic device A 3211 and the electronic device B 3212 transmit the captured image to other electronic devices in the sharing group.

Figure 33:
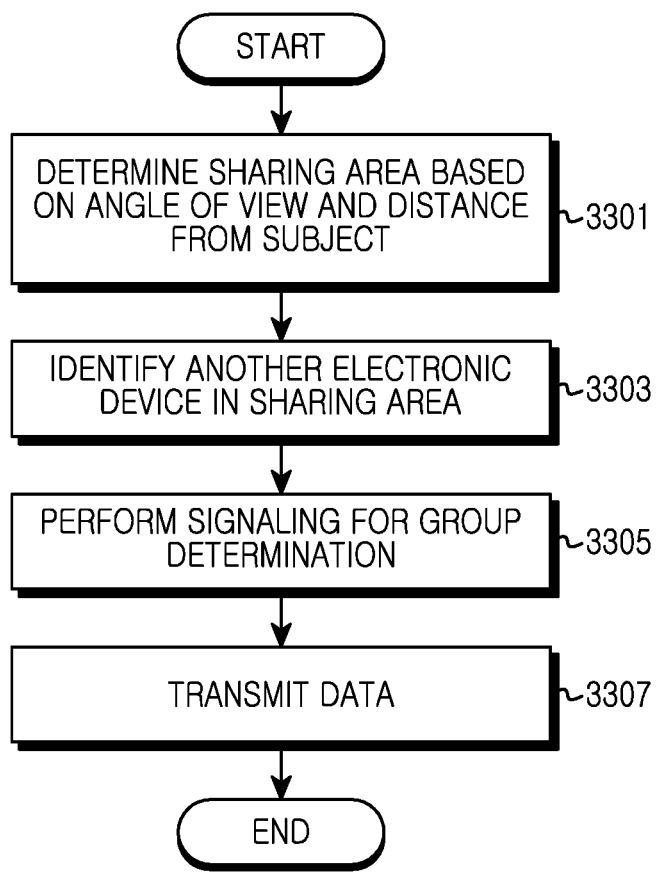
FIG. 33 depicts an operation procedure of an electronic device for transmitting data according to an embodiment of the present invention.

FIG. 33 depicts an operation procedure of an electronic device for transmitting data according to an embodiment of the present invention. FIG. 33 illustrates an operating method of the electronic device.

Referring to FIG. 33, the electronic device determines a sharing area based on an angle of view and a distance from a subject in step 3301. The sharing area indicates a geographical/physical space where sharers for sharing data are located. The electronic device includes a camera, and recognizes a light beam received through a lens of the camera, through an image sensor. In so doing, the electronic device can determine the sharing area based on the angle of view of the camera and the distance from the subject. For example, the electronic device can determine an angle range of the sharing area based on the angle of view, and determine a distance range of the sharing area based on the distance from the subject. For example, the electronic device can determine the sharing area as shown in FIG. 12.

Next, the electronic device identifies at least one other electronic device located in the sharing area in step 3303. To identify the at least one other electronic device, the electronic device can determine at least one of a transmit power of a signal, a beam width, and a beam set such that an electronic device in the sharing area can receive and an electronic device outside the sharing area cannot receive. The electronic device can transmit a signal for scanning by applying the determined transmit power, beamwidth, and beam set, receive a response of the signal for the scanning, and thus identify at least one other electronic device located in the sharing area. According to another embodiment of the present invention, the electronic device can receive information about at least one other electronic device located in the sharing area from a control node such as base station. In this case, the electronic device can transmit information of an angle difference between a direction of the base station and a facing direction of the electronic device, the angle of view, and the distance from the subject, to the base station, and receive information about at least one other electronic device from the base station. For example, the electronic device can identify at least one other electronic device located in the sharing area as shown in FIG. 17 or FIG. 24. According to yet another embodiment of the present invention, in addition to the operation for receiving the signal for the scanning and the response, the electronic device can receive information about at least one other electronic device from the base station. In this case, the at least one other electronic device can be identified more precisely.

Next, the electronic device performs signaling for group determination in step 3305. For example, the electronic device can transmit a request signal to at least one other electronic devices identified in the step 3303, and receive a response signal from the at least one other electronic devices. In the step 3303, when the information about the at least one other electronic device located in the sharing area is received from the control node, the step 3305 can be omitted. That is, in this case, the signaling for the group determination is performed between the control node and the other electronic device, and the electronic device receives a result from the base station. Further, the electronic device can add or exclude at least one sharer by reflecting the at least one other electronic device confirmed through the signaling or the information received from the base station, that is, the user's correction in the sharing group. For example, the user's correction can be input through the UX/UI as shown in FIG. 20 or FIG. 21.

Next, the electronic device transmits data to the at least one other electronic device in step 3307. That is, the electronic device transmits data to share according to a user's command. The user's command can have various formats. For example, a photographing command can be interpreted as the data transmission command, and an explicit data transmission command can be defined. The user's command can be defined as button pressing, a voice, or a motion (e.g., rotate, shake, impact, movement of a particular pattern, etc.) of the electronic device recognizable by various sensors. Prior to the data transmission, the electronic device needs to establish connections with the at least one other electronic devices. For doing so, the electronic device can establish the connection through the signaling for the group determination, and independently perform the connection establishment procedure. According to another embodiment of the present invention, the electronic device can transmit the data via a control node such as base station. In this case, the connection establishment procedure can be omitted.

Figure 34:
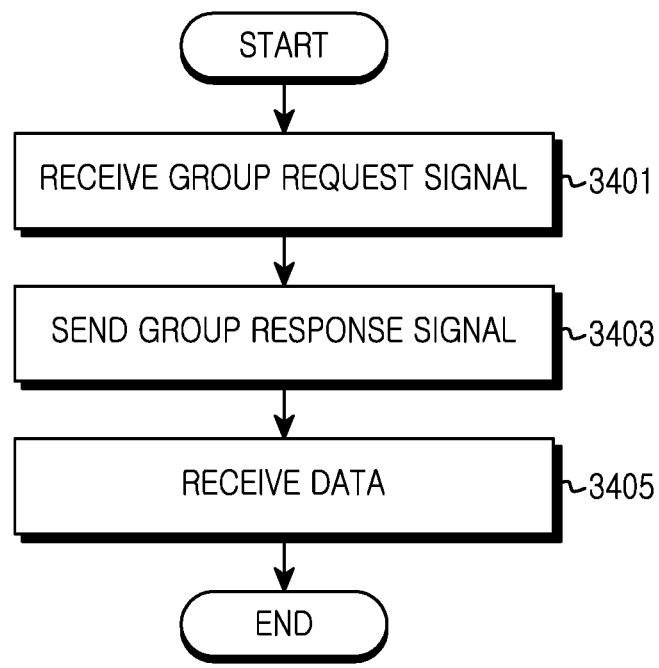
FIG. 34 depicts an operation procedure of an electronic device for receiving data according to an embodiment of the present invention.

FIG. 34 depicts an operation procedure of an electronic device for receiving data according to an embodiment of the present invention. FIG. 33 illustrates an operating method of the electronic device.

Referring to FIG. 34, the electronic device receives a group request signal in step 3401. The group request signal is a message or a frame requesting to participate in a group of sharers for data sharing. The group request signal is received from a source device which provides data or a control node such as base station. The group request signal can include at least one of validity period information of the sharing group, and information about software/hardware capability (e.g., resolution, compression type, etc.) supported by the electronic device.

Next, the electronic device transmits a group response signal in step 3403. The group response signal is a signal notifying the participation in the sharing group. That is, the electronic device is operating in a mode supporting the data sharing. The electronic device can transmit the group response signal to the source device or the control node. The group response signal can include a content format (e.g., resolution, compression type information, etc.) requested from the electronic device.

Next, the electronic device receives the data in step 3405. The data is received from the source device or the control node. In so doing, contents included in the data can be processed according to the contents forma delivered by the group response signal. Yet, when the source device excludes the electronic device from the sharers, the step 3405 can be omitted.

Figure 35:
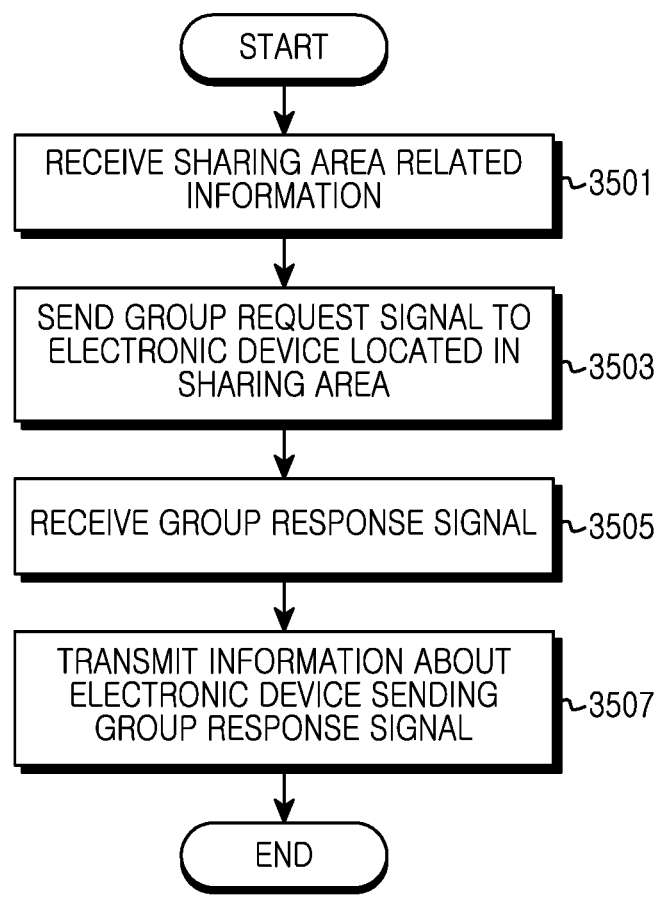
FIG. 35 depicts an operation procedure of a control node according to an embodiment of the present invention.

FIG. 35 depicts an operation procedure of a control node according to an embodiment of the present invention. The control node indicates a node which provides the wireless connection to a plurality of terminals over a multi-access network such as AP of the wireless LAN or base station of the cellular network. That is, FIG. 35 illustrates an operating method of the AP or the base station.

Referring to FIG. 35, the control node receives sharing area related information from a source device which provides data in step 3501. The sharing area related information indicates necessary information for the control node to determine the sharing area. For example, the sharing area related information can include at least one of an angle difference between a direction from the source device toward the control node and an orientation of the source device, an angle of view of the source device, and a distance from the source device to a subject.

Next, the control node transmits a group request signal to at least one other electronic device located in the sharing area in step 3503. The group request signal is a message or a frame requesting to participate in a group for the data sharing. That is, the control node determines the sharing area based on a location of the source device and the information received from the source device. The control node selects at least one other electronic device located in the sharing area, as a candidate device, and transmits the group request signal.

Next, the base station receives a group response signal from the at least one other electronic device in step 3505. The group response signal is a message or a frame notifying that an electronic device receiving the group request signal participates in the group. The group response signal includes at least one of resolution information requested from the at least one other electronic device, and compression type information requested from the at least one other electronic device. At this time, the group response signal can be received from some of the electronic devices receiving the group request signal.

After receiving the group response signal, the base station transmits information about the at least one other electronic devices to the source device in step 3507. That is, the base station transmits a list of at least one other electronic device notifying the group participation, to the request device. Next, although not depicted in FIG. 35, the control node can receive data from the source device and transmit the data to the at least one other electronic device.

Figure 36:
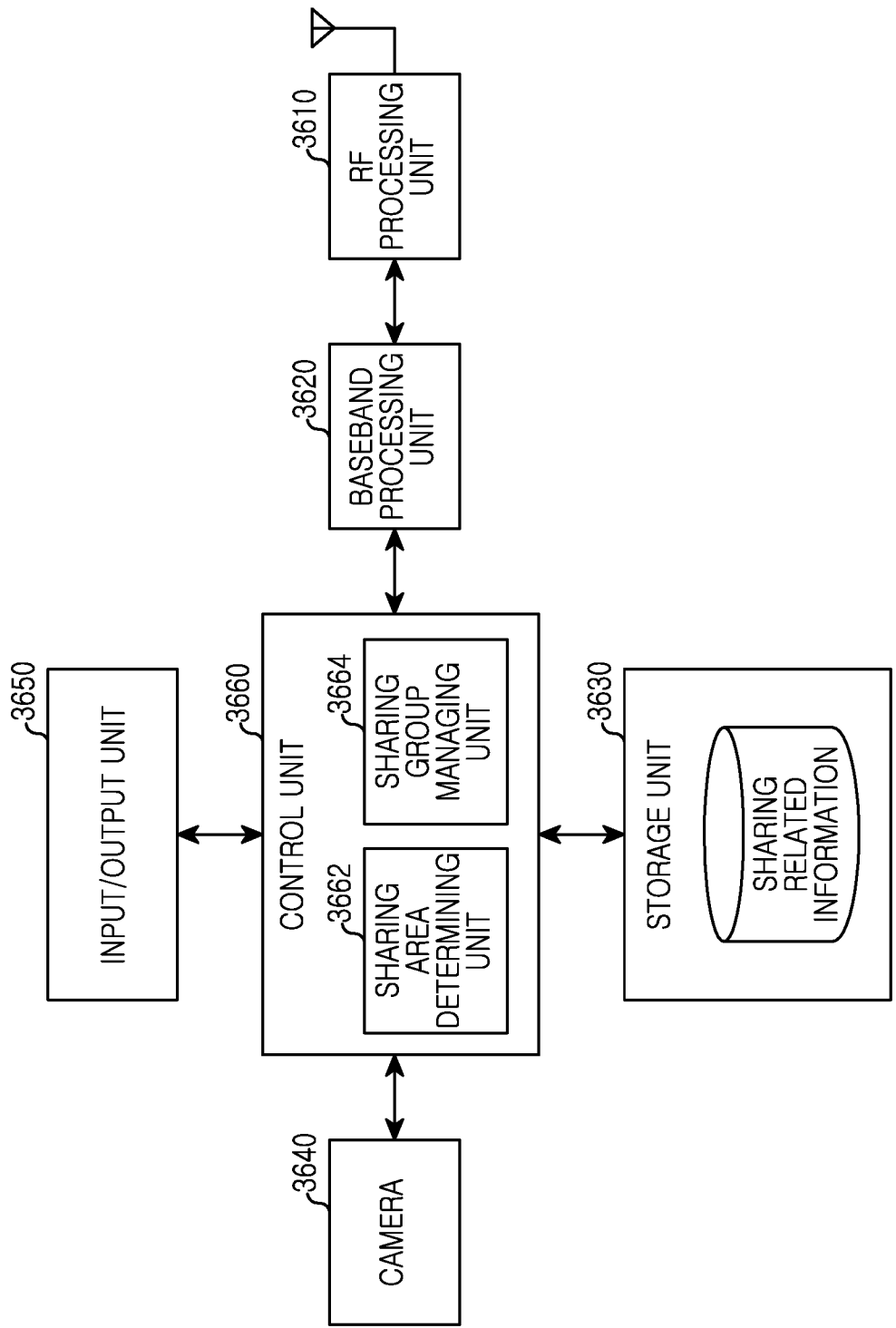
FIG. 36 depicts a block diagram of an electronic device according to an embodiment of the present invention.

FIG. 36 depicts a block diagram of an electronic device according to an embodiment of the present invention.

Referring to FIG. 36, the electronic device includes a Radio Frequency (RF) processing unit 3610, a baseband processing unit 3620, a storage unit 3630, a camera 3640, an input/output unit 3650, and a control unit 3660.

The RF processing unit 3610 performs functions for transmitting and receiving signals over a radio channel such as band conversion of signal and amplification. That is, the RF processing unit 3610 up-converts a baseband signal provided from the baseband processing unit 3620 to an RF signal and then transmits over an antenna, and down-converts an RF signal received over the antenna to a baseband signal. For example, the RF processing unit 3610 can include a transmit filter, a receive filter, an amplifier, a mixer, an oscillator, a Digital to Analog Converter (DAC), an Analog to Digital Converter (ADC), and the like. In FIG. 36, although the single antenna is depicted, the electronic device can include a plurality of antennas. Also, the RF processing unit 3610 can include a plurality of RF chains. Further, the RF processing unit 3610 can perform beamforming. For the beamforming, the RF processing unit 3610 can adjust a phase and a magnitude of signals transmitted and received through a plurality of antennas or antenna elements.

The baseband processing unit 3620 performs a function for converting a baseband signal and a bit stream according to a physical layer standard of a system. For example, in data transmission, the baseband processing unit 3620 generates complex symbols by encoding and modulating a transmit bit stream. Also, in data reception, the baseband processing unit 3620 restores a receive bit stream by demodulating and decoding a baseband signal fed from the RF processing unit 3610.

The baseband processing unit 3620 and the RF processing unit 3610 transmit and receive the signals as mentioned above. Hence, the baseband processing unit 3620 and the RF processing unit 3610 can be referred to as a transmitting unit, a receiving unit, a transceiving unit, or a communication unit. Further, at least one of the baseband processing unit 3620 and the RF processing unit 3610 can include a plurality of communication modules for supporting a plurality of different communication standards. Also, at least one of the baseband processing unit 3620 and the RF processing unit 3610 can include different communication modules for processing signals of different frequency bands. For example, the different communication standards can include the wireless LAN (e.g., IEEE 802.11), the cellular network (e.g., Long Term Evolution (LTE)), and the like. Also, the different frequency bands can include a Super High Frequency (SHF) (e.g., 2.5 GHz, 5 GHz) band, and a millimeter weave (e.g., 60 GHz) band.

The storage unit 3630 stores a basic program for the operations of the electronic device, an application program, and data such as setting information. In particular, the storage unit 3630 stores data sharing related information. For example, the data sharing related information can include information (e.g., identification information, capability information, etc.) of sharers of a sharing group, lifetime information of the sharing group, and so on. The storage unit 3630 provides the stored data according to a request of the control unit 3660.

The camera 3640 includes an image sensor, a lens, a lens driving device, and the like, and converts the light input through the lens to an electric signal. That is, the camera 3640 performs a function for capturing an image. As the image sensor, at least one of a Charged Coupled Device (CCD) and a Complementary Metal-Oxide Semiconductor (CMOS) can be used. For example, the camera 3640 recognizes the light input through the lens using the image sensor, and converts an image recognized by the image sensor to data.

The input/output unit 3650 provides information in a manner the user can recognize, and provides an interface for recognizing a user's command. For example, the input/output unit 3650 includes a display means and an input means. The display means and the input means can be constructed independently, or as one combined module. For example, the input/output unit 3650 can include a touch screen. Further, as the input means, a physical button, a switch, a dial, a stick, and the like can be further included. The display means can be implemented using at least one of Liquid Crystal Display (LCD), Light Emitting Diodes (LED), Light emitting Polymer Display (LPD), Organic LED (OLED), Active Matrix OLED (AMOLED), and Flexible LED (FLED). The input/output unit 3650, which displays an image and graphics, can be referred to as a 'display unit'.

The control unit 3660 controls overall operations of the electronic device. For example, the control unit 3660 transmits/receives signals through the baseband processing unit 3620 and the RF processing unit 3610. Also, the control unit 3660 records and reads data to and from the storage unit 3650. For doing so, the control unit 3660 can include at least one processor. For example, the control unit 3660 can include a Communication Processor (CP) for controlling communication and an Application Processor (AP) for controlling a high layer such as application program. According to an embodiment of the present invention, the control unit 3660 includes a sharing area determining unit 3662 for determining a sharing area for the data sharing and determining a transmit power, a beamwidth, and a beam set of a signal to transmit to other electronic devices in the sharing area, and a sharing group managing unit 3664 for managing information about the sharing group. For example, the control unit 3660 can control to realize various embodiments of the electronic device explained in FIG. 1 through FIG. 35. Operations of the control unit 3660 according to an embodiment of the present invention are as follows.

According to an embodiment of the present invention, when the electronic device transmits data, the control unit 3660 determines a sharing area based on an angle of view of the camera 3640 and a distance from a subject. For example, the control unit 3660 can determine an angle range of the sharing area through the angle of the view, and determine a distance range of the sharing area through the distance from the subject. The control unit 3660 identifies at least one electronic device located in the sharing area. For doing so, the control unit 3660 can transmit a request signal and receive a response signal through the baseband processing unit 3620 and the RF processing unit 3610 by applying a transmit power, a beamwidth, and a beam set of the signal determined such that an electronic device located in the sharing area can receive and an electronic device outside the sharing area cannot receive. For example, the control unit 3660 can receive information about at least one other electronic device located in the sharing area from a control node such as base station. Further, the control unit 3660 can add or exclude at least one sharer by reflecting the at least one other electronic device confirmed through the signaling or the information received from the base station, that is, the user's correction in the sharing group. Next, the control unit 3660 transmits data to the at least one other electronic device through the baseband processing unit 3620 and the RF processing unit 3610. In so doing, the data can be transmitted through direct communication with the other electronic device or the base station.

According to another embodiment of the present invention, when the electronic device receives data, the control unit 3660 receives a group request signal and transmits a group response signal through the baseband processing unit 3620 and the RF processing unit 3610. In so doing, the group request signal can be received from an electronic device which provides data or a control node such as base station. The group response signal can be transmitted to the electronic device which provides data or the control node such as base station. Next, the control unit 3660 receives the data. At this time, contents included in the data can be processed according to a contents format delivered by the group response signal.

In the above-stated embodiments, devices such as base station and AP which function as the control node of the multi-access network can include a control unit, a communication unit, and a storage unit, similarly to FIG. 36. Further, the base station can further include an interface for communicating with a backhaul network. The interface for communicating with the backhaul network can be referred to as a 'backhaul communication unit'.

Figure 37:
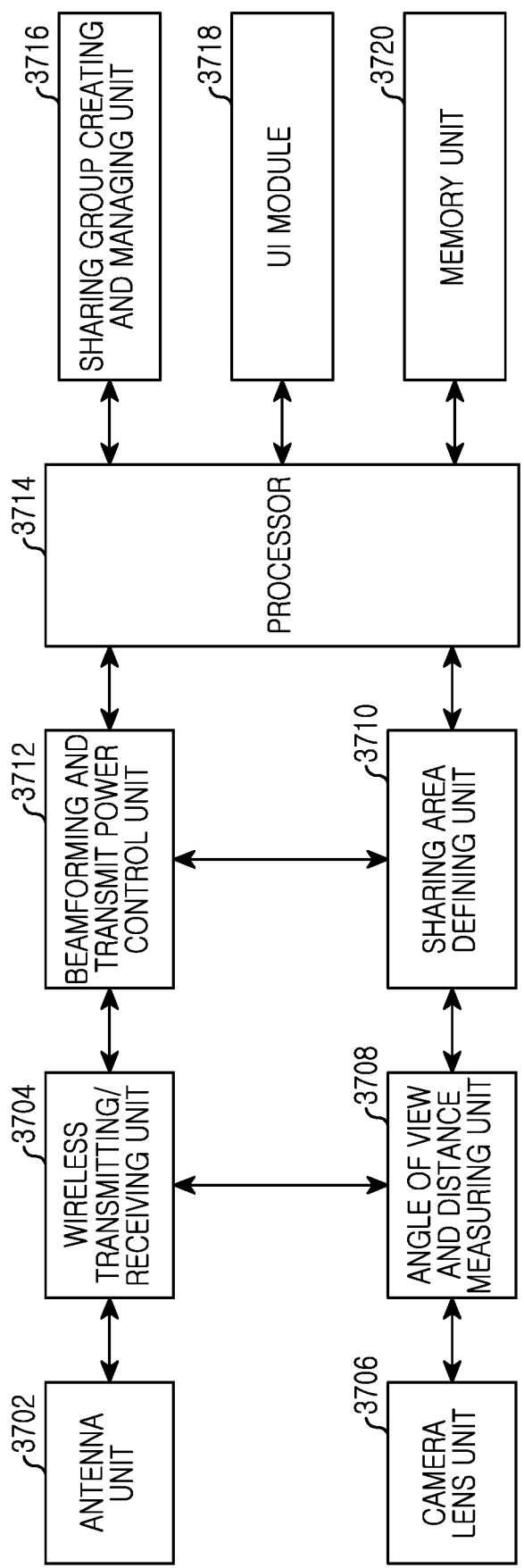
FIG. 37 depicts a block diagram of an electronic device according to another embodiment of the present invention.

FIG. 37 depicts a block diagram of an electronic device according to another embodiment of the present invention.

Referring to FIG. 37, the electronic device includes an antenna unit 3702, a wireless transmitting/receiving unit 3704, a camera lens unit 3706, an angle of view and distance measuring unit 3708, a sharing area defining unit 3710, a beamforming and transmit power control unit 3712, a processor 3714, a sharing group creating and managing unit 3716, a UI module 3718, and a memory unit 3720.

The antenna unit 3702 can include a plurality of array antennas, and processes physical beam radiation pattern generation and signal transmission/reception. The wireless transmitting/receiving unit 3704, which is a part for implementing a wireless communication technique, can include a modulator/demodulator, a Forward Error Correction (FEC), a high frequency processor, and the like, and performs a function for normally transmitting/receiving signals wirelessly. The camera lens unit 3706 processes and converts an incident light from a subject into image data, and can further perform an AF function and an image zoom-in/out function. The angle of view and distance measuring unit 3708 measures or calculates angle of view information and a distance from a subject displayed in a current view finder. The sharing area defining unit 3710 defines a sharing area for sharing based on the angle of view and the subject distance. The beamforming and transmit power control unit 3712 controls a beam and a transmit power so as to create the sharing group in the sharing area.

The processor 3714 controls an overall operation flow of the electronic device. In particular, according to an embodiment of the present invention, the processor 3714 performs a role for controlling a necessary flow to define the sharing area and to generate and manage the sharing group in the sharing area, logical determination, calculation, and so on. The sharing group creating and managing unit 3716 creates and manages the sharing group. The UI module 3718 provides a relevant UI/UX to intuitively perform the process for creating and managing the sharing group in terms of the user. The memory unit 3720 stores a program required for the operations of the electronic device, data, and the like.

Figure 38:
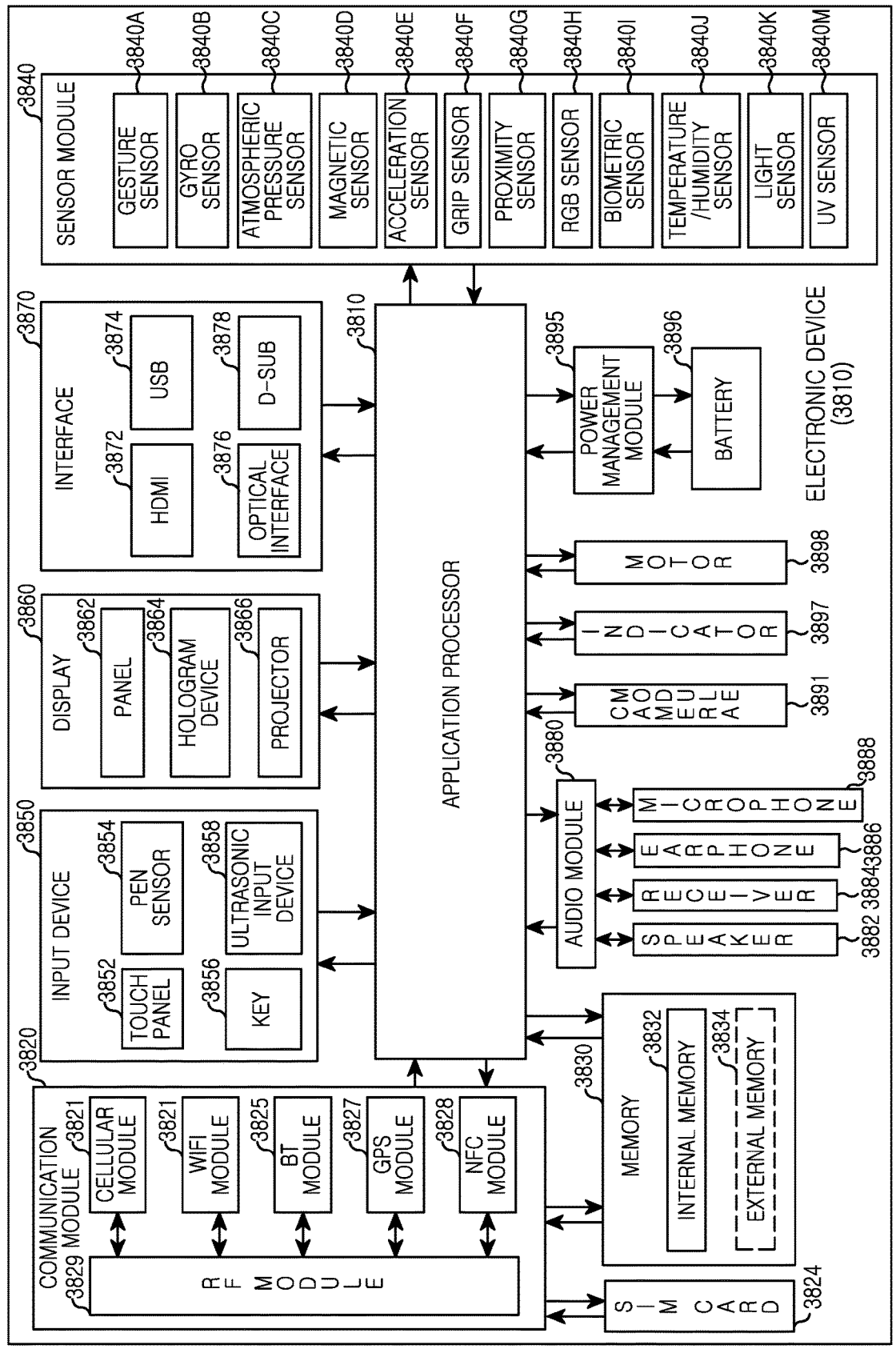
FIG. 38 depicts a block diagram of an electronic device according to yet another embodiment of the present invention.

FIG. 38 depicts a block diagram of an electronic device according to yet another embodiment of the present invention. The electronic device can include, for example, whole or part of the electronic device as explained in the above-stated embodiments.

Referring to FIG. 38, the electronic device can include one or more APs 3810, a communication module 3820, a Subscriber Identification Module (SIM) card 3824, a memory 3830, a sensor module 3840, an input device 3850, a display 3860, an interface 3870, an audio module 3880, a camera module 3891, a power management module 3895, a battery 3896, an indicator 3897, and a motor 3898.

The AP 3810 can control a plurality of hardware or software components connected to the AP 3810 by executing an operating system or an application program, and perform various data processing including multimedia data and operations. For example, the AP 3810 can be implemented with a System on Chip (SoC). According to one embodiment, the AP 3810 can further include a Graphic Processing Unit (GPU, not shown).

The communication module 3820 (e.g., the communication interface 160) perform data transmission/reception in communication with other electronic devices connected with the electronic device over a network. According to an embodiment, the communication module 3820 can include a cellular module 3821, a WiFi module 3823, a Bluetooth (BT) module 3825, a GPS module 3827, an NFC module 3828, and an RF module 3829.

The cellular module 3821 can provide a voice call, a video call, a text service, or an Internet service through a communication network (e.g., LTE, LTE-A, CDMA, WCDMA, UMTS, WiBro, or GSM). Also, the cellular module 3821 can identify and authenticate the electronic device in the communication network by using, for example, a SIM (e.g., the SIM card 3824). According to an embodiment, the cellular module 3821 can perform at least part of a function the AP 3810 can provide. For example, the cellular module 3821 can execute at least part of a multimedia control function.

According to an embodiment, the cellular module 3821 can further include a CP. Also, the cellular module 3821 can be implemented using, for example, an SoC. While the components such as the cellular module 3821 (e.g., CP), the memory 3830, or the power management module 3895 are depicted as separate components from the AP 3810 in FIG. 38, according to an embodiment, the AP 3810 can be implemented to include at least part (e.g., the cellular module 3821) of the above-stated components.

According to an embodiment, the AP 3810 or the cellular module 3821 (e.g., the CP) can load and process an instruction or data received from its connected non-volatile memory or at least one of the other components, in a volatile memory. Also, the AP 3810 or the cellular module 3821 can store data received from at least one of the other components or generated by at least one of the other components, in the non-volatile memory.

The WiFi module 3823, the BT module 3825, the GPS module 3827, or the NFC module 3828 each can include, for example, a processor for processing the data transmitted and received via the corresponding module. While the cellular module 3821, the WiFi module 3823, the BT module 3825, the GPS module 3827, or the NFC module 3828 is depicted as the separate block in FIG. 38, according to an embodiment, at least some (e.g., two or more) of the cellular module 3821, the WiFi module 3823, the BT module 3825, the GPS module 3827, or the NFC module 3828 can be included in a single Integrated Chip (IC) or an IC package. For example, at least part (e.g., a CP corresponding to the cellular module 3821 and a WiFi processor corresponding to the WiFi module 3823) of the processors corresponding to the cellular module 3821, the WiFi module 3823, the BT module 3825, the GPS module 3827, or the NFC module 3828 can be implemented as a single SoC.

The RF module 3829 can transmit and receive data, for example, RF signals. The RF module 3829 can include, although not depicted, for example, a transceiver, a Power Amp Module (PAM), a frequency filter, or a Low Noise Amplifier (LNA). Also, the RF module 3829 can further include a part, for example, a conductor or a conducting wire, for transmitting and receiving electromagnetic waves in free space during the wireless communication. While the cellular module 3821, the WiFi module 3823, the BT module 3825, the GPS module 3827, and the NFC module 3828 share the single RF module 3829 in FIG. 38, according to an embodiment, at least one of the cellular module 3821, the WiFi module 3823, the BT module 3825, the GPS module 3827, or the NFC module 3828 can transmit and receive the RF signals through a separate RF module.

The SIM card 3824 can be a card including the SIM and inserted into a slot formed at a specific location of the electronic device. The SIM card 3824 can include unique identification information (e.g., Integrated Circuit Card Identifier (ICCID)) or subscriber information (e.g., International Mobile Subscriber Identity (IMSI)).

The memory 3830 can include an internal memory 3832 or an external memory 3834. The internal memory 3832 can include, for example, at least one of the volatile memory (e.g., Dynamic Random Access Memory (DRAM), Static RAM (SRAM), Synchronous Dynamic RAM (SDRAM), etc.) or the non-volatile memory (e.g., One-Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

According to an embodiment, the internal memory 3832 can be a Solid State Drive (SSD). The external memory 3834 can include a flash drive, for example, a Compact Flash (CF), a Secure Digital (SD), a Micro-SD, a Mini-SD, an extreme digital (xD), or a memory stick. The external memory 3834 can be functionally connected to the electronic device through various interfaces. According to an embodiment, the electronic device can further include a storage device (or a storage medium) such as hard drive.

The sensor module 3840 can measure a physical quantity or detect an operation status of the electronic device, and convert the measured or detected information to an electric signal. The sensor module 3840 can include at least one of, for example, a gesture sensor 3840A, a gyro sensor 3840B, an atmospheric pressure sensor 3840C, a magnetic sensor 3840D, an acceleration sensor 3840E, a grip sensor 3840F, a proximity sensor 3840G, a color sensor 3840H (e.g., a Red, Green, Blue (RGB) sensor), a biometric sensor 3840I, a temperature/humidity sensor 3840J, a light sensor 3840K, or an UltraViolet (UV) sensor 3840M. Additionally or alternatively, the sensor module 3840 can include, for example, an E-noise sensor (not shown), an electromyography (EMG) sensor (not shown), an electroencephalogram (EEG) sensor (not shown), an electrocardiogram (ECG) sensor (not shown), an Infra Red (IR) sensor (not shown), an iris sensor (not shown), or a finger print sensor (not shown). The sensor module 3840 can further include a control circuit for controlling its at least one or more sensors.

The input device 3850 can include a touch panel 3852, a (digital) pen sensor 3854, a key 3856, or an ultrasonic input device 3858. The touch panel 3852 can recognize touch input using, for example, at least one of capacitive, resistive, infrared, or ultrasonic wave techniques. Also, the touch panel 3852 may further include a control circuit. The capacitive type can recognize physical contact or proximity. The touch panel 3852 may further include a tactile layer. In this case, the touch panel 3852 can provide a tactile response to the user.

The (digital) pen sensor 3854 can be implemented using, for example, the same or similar method as or to the user's touch input, or using a separate recognition sheet. The key 3856 can include, for example, a physical button, an optical key, or a keypad. The ultrasonic input device 3858 is a device capable of obtaining data by detecting microwaves through a microphone (e.g., a microphone 3888) in the electronic device through an input tool which generates an ultrasonic signal, and allows radio frequency identification. The electronic device may receive user input from an external device (e.g., a computer or a server) connected using the communication module 3820.

The display 3860 can include a panel 3862, a hologram device 3864, or a projector 3866. The panel 3862 can be, for example, an LCD or an AMOLED. The panel 3862 can be implemented, for example, to be flexible, transparent, or wearable. The panel 3862 may be constructed as the single module with the touch panel 3852. The hologram device 3864 can present a three-dimensional image in the air using interference of light. The projector 3866 can display an image by projecting the light onto a screen. The screen can be placed, for example, inside or outside the electronic device. According to an embodiment, the display 3860 can further include a control circuit for controlling the panel 3862, the hologram device 3864, or the projector 3866.

The interface 3870 can include, for example, a High-Definition Multimedia Interface (HDMI) 3872, a USB 3874, an optical interface 3876, or a D-subminiature (D-sub) 3878. Additionally or alternatively, the interface 3870 can include, for example, Mobile High-Definition Link (MHL) interface, SD card/Multi-Media Card (MMC) interface, or Infrared Data Association (IrDA) standard interface.

The audio module 3880 can convert sound to an electric signal and vice versa. The audio module 3880 can process sound information which is input or output through, for example, a speaker 3882, a receiver 3884, an earphone 3886, or the microphone 3888.

The camera module 3891 is a device for capturing a still picture and a moving picture, and can include, according to an embodiment, one or more image sensors (e.g., a front sensor or a rear sensor), a lens (not shown), an Image Signal Processor (ISP) (not shown), or a flash (e.g., LED or xenon lamp) (not shown).

The power management module 3895 can manage power of the electronic device. Although not depicted, the power management module 3895 can include, for example, a Power Management IC (PMIC), a charger IC (IC), or a battery or fuel gauge.

The PMIC can be mounted in, for example, an IC or an SoC conductor. The charging type can be divided to a wired type and a wireless type. The charger IC can charge the battery, and prevent overvoltage or overcurrent flow from the charger. According to an embodiment, the charger IC can include a charger IC for at least one of the wired charging type or the wireless charging type. The wireless charging type includes, for example, a magnetic resonance type, a magnetic induction type, or a microwave type, and can add an additional circuit for the wireless charging, for example, a circuit such as coil loop, resonance circuit, or rectifier.

The battery gauge can, for example, measure the remaining capacity of the battery 3896 and the voltage, the current, or the temperature of the charging. The battery 3896 can generate or store electricity, and supply the power to the electronic device using the stored or generated electricity. The battery 3896 can include, for example, a rechargeable battery or a solar battery The indicator 3897 can display a specific status of the electronic device or its part (e.g., AP 3810), for example, a booting state, a message state, or a charging state. The motor 3899 can convert the electric signal to a mechanic vibration. Although it is not depicted, the electronic device can include a processing device (e.g., a GPU) for mobile TV support. The processing device for the mobile TV support can process media data in conformity to a standard, for example, Digital Multimedia Broadcasting (DMB), Digital Video Broadcasting (DVB), or media flow.

The aforementioned components of the electronic device according to various embodiments of the present invention each can include one or more components, and the name of the corresponding component can differ according to the type of the electronic device. The electronic device according to various embodiments of the present invention can include at least one of the aforementioned components, omit some components, or further include other components. Also, some of the components of the electronic device according to various embodiments of the present invention can be united into a single entity to thus carry out the same functions of the corresponding components.

Figure 39:
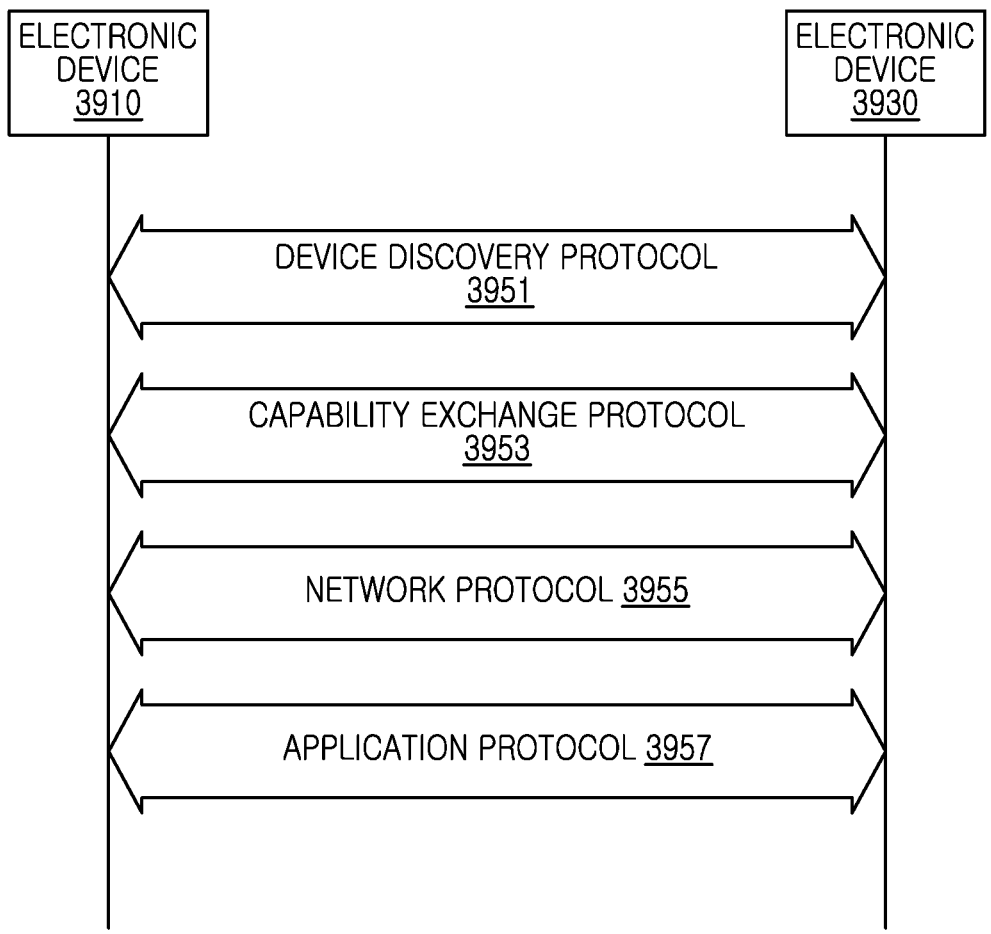
FIG. 39 depicts a communication protocol between electronic devices according to yet another embodiment of the present invention.

FIG. 39 depicts a communication protocol between electronic devices according to yet another embodiment of the present invention.

Referring to FIG. 39, for example, the communication protocol can include a device discovery protocol 3951, a capability exchange protocol 3953, a network protocol 3955, an application protocol 3957, and so on.

According to an embodiment, the device discovery protocol 3951 can be a protocol for electronic devices (e.g., an electronic device 3910 or an electronic device 3930) to detect an external electronic device which can communicate with it or to connect with a detected external electronic device. For example, the electronic device 3910 is a device which can communicate with the electronic device 3910 through a communication method (e.g., WiFi, BT, or USB) usable by the electronic device 3910, and can detect the electronic device 3930 using the device discovery protocol 3951. The electronic device 3910, for the communication connection with the electronic device 3930, can obtain and store identification information about the detected electronic device 3930 using the device discovery protocol 3951. The electronic device 3910 can establish the communication connection with the electronic device 3930 based on, for example, at least the identification information.

According to a certain embodiment, the device discovery protocol 3951 can be a protocol for mutual authentication between a plurality of electronic devices. For example, the electronic device 3910 can perform authentication between the electronic device 3910 and the electronic device 3930 based on communication information (e.g., MAC address, Universally Unique Identifier (UUID), SSID, IP address) for the communication with at least the electronic device 3930.

According to an embodiment, the capability exchange protocol 3953 can be a protocol for exchanging information relating to a function of a service supportable by at least one of the electronic device 3910 or the electronic device 3930. For example, the electronic device 3910 and the electronic device 3930 can exchange information relating to a function of a service currently provided, through the capability exchange protocol 3953. The exchangeable information can include identification information indicating a particular service among a plurality of services supportable by the electronic device 3910 and the electronic device 3930. For example, the electronic device 3910 can receive identification information of a particular service provided by the electronic device 3930 from the electronic device 3930 through the capability exchange protocol 3953. In this case, based on the received identification information, the electronic device 3910 can determine whether the electronic device 3910 can support the particular service.

According to an embodiment, the network protocol 3955 can be a protocol for controlling, for example, a data flow transmitted/received in association with the service between electronic devices (e.g., the electronic device 3910, the electronic device 3930) connected to communicate. For example, at least one of the electronic device 3910 or the electronic device 3930 can perform error control or data quality control using the network protocol 3955. Additionally or alternately, the network protocol 3955 can determine a transmission format of data transmitted/received between the electronic device 3910 and the electronic device 3930. Also, at least one of the electronic device 3910 or the electronic device 3930 can manage at least a session (e.g., session connection or session termination) for the mutual data exchange using the network protocol 3955.

According to an embodiment, the application protocol 3957 can be a protocol for providing a procedure or information for exchanging data relating to a service provided to an external electronic device. For example, the electronic device 3910 can provide a service to the electronic device 3930 through the application protocol 3957.

According to an embodiment, the communication protocol can include a standard communication protocol, or an individual or organization designated communication protocol (e.g., a communication protocol designated by a communication device manufacturer a network provider itself), or their combination.

The term "module" used in various embodiments of the present invention can indicate, for example, a unit including a combination of one or more of hardware, software, or firmware. The "module" can be interchangeably used with the terms, for example, a unit, logic, a logical block, a component, or a circuit. The "module" can be a minimum unit or part of the components integrally formed. The "module" can be a minimum unit or part for performing one or more functions. The "module" can be implemented mechanically or electronically. For example, the "module" according to various embodiments of the present invention can include at least one of an Application-Specific Integrated Circuit (ASIC), a Field-Programmable Gate Array (FPGA), or a programmable-logic device for performing operations which are well known or will be developed.

The above-stated embodiments of the present invention have been explained with the photographing by way of example. However, the present invention is not limited to a case where the photographing is performed. That is, the present invention can be applied to any electronic device including the wireless communication function and the imaging function through the lens. For example, various embodiments of the present invention can be realized by not only an electronic device such as smart phone, laptop computer, but also a wearable device in the form of glasses, a watch, and so on.

In case of a glass-type wearable device, by applying an eyeball movement_tracking technique, the electronic device can easily recognize a user's command (e.g., group creation request, etc.) and realize the above-mentioned embodiments. Alternatively, command input through a button and command input through voice are also possible.

The methods according to embodiments described in the claims or the specification of the present invention can be implemented in software, firmware, hardware, or in their combinations.

As for the software, a computer-readable storage medium storing one or more programs (software modules) can be provided. One or more programs stored in the computer-readable storage medium can be configured for execution by one or more processors of the electronic device. One or more programs can include instructions for enabling the electronic device to execute the methods according to the embodiments described in the claims or the specification of the present invention.

Such a program (software module, software) can be stored to a random access memory, a non-volatile memory including a flash memory, a ROM, an EEPROM, a magnetic disc storage device, a CD-ROM, Digital Versatile Discs (DVDs) or other optical storage devices, and a magnetic cassette. Alternatively, the program can be stored to a memory combining part or all of those recording media. Also, a plurality of memories may be included.

Also, the program can be stored in an attachable storage device accessible via a communication network such as Internet, Intranet, LAN, Wide LAN (WLAN), or Storage Area Network (SAN), or a communication network by combining these networks. The storage device can access the device of the present invention through an external port. Also, a separate storage device may access the device of the present invention over the communication network.

In the specific embodiments of the present invention, the elements included in the invention are expressed in a singular or plural form. However, the singular or plural expression is appropriately selected according to a proposed situation for the convenience of explanation, and the present invention is not limited to a single element or a plurality of elements. The elements expressed in the plural form may be configured as a single element and the elements expressed in the singular form may be configured as a plurality of elements.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for operating an electronic device, the method comprising:
   determining an area where at least one other electronic device to share data is located based on an angle of view of a camera and a distance from a subject;
   determining a beam set based on the angle of view of the camera and the distance from the subject;
   transmitting a scanning signal using the determined beam set for identifying the at least one other electronic device located in the area;
   receiving, from the at least one other electronic device, a response signal corresponding to the scanning signal, the response signal including information on hardware/software capability and available resource status of the at least one other electronic device; and
   transmitting, to the at least one other electronic device, the data in a specific format based on the hardware/software capability and the available resource status of the at least one other electronic device.

2. The method of claim 1, wherein the transmitting the scanning signal for identifying the at least one other electronic device comprises:
   transmitting one of:
      the scanning signal using at least one beam having an orientation angle belonging to a range of the angle of view;
      the scanning signal applying a maximum beamwidth and a minimum transmit power satisfying a required receive power according to the distance; or
      at least one of an angle difference between a direction toward a base station and an orientation of the electronic device, the angle of view, and the distance.

3. The method of claim 1,
   wherein the scanning signal includes a message requesting to participate in a group for data sharing to the at least one other electronic device; and
   wherein the response signal includes a message notifying participation of the data sharing group.

4. The method of claim 3, further comprising:
   when a number of subjects is changed through an image input through the camera, re-transmitting the scanning signal.

5. The method of claim 1, further comprising:
   transmitting a request signal for connection establishment with the at least one other electronic device; and
   receiving a second response signal of the request signal.

6. The method of claim 1, wherein the transmitting the data comprises:
   transmitting the data to the at least one other electronic device except an electronic device which is excluded by a user input among the at least one other electronic devices which transmit the response signal;
   before a validity period of a group comprising the at least one other electronic device is expired, transmitting the data to the at least one other electronic device; or
   transmitting data comprising contents processed in a format selected by the at least one other electronic device.

7. The method of claim 1, further comprising one of:
   displaying a user interface (UI) for commanding to create a group to share an image input through the camera and the data;
   displaying a list of an electronic device which fails in data reception among the at least one other electronic device;
   displaying an indicator for indicating a number of electronic devices which transmit a response signal which notifies participation in the data sharing group; or
   displaying a UI for changing an angle range of the area.

8. The method of claim 7, further comprising:
   re-transmitting the data to the electronic device which fails in the data reception, through a wireless interface different from an interface used in an initial transmission.

9. The method of claim 1, further comprising:
   displaying a list of electronic device which transmit the response signal,
   wherein the list comprises a UI for excluding the electronic devices transmitting the response signal from sharers.

10. A method operating a control node which provides a wireless connection in a multi-access network, the method comprising:
    receiving information for determining an area that comprises an angle of view of a camera of a first electronic device and a distance from a subject, from the first electronic device;
    transmitting information on hardware/software capability and available resource status of a second electronic device located in the area, to the first electronic device; and
    receiving, from the first electronic device, data to be shared with the second electronic device in a specific format based on the hardware/software capability and the available resource status of the second electronic device,
    wherein the second electronic device is identified by the first electronic device by using a beam set,
    wherein the beam set is determined based on the angle of view of the camera of a first electronic device and the distance from the subject.

11. The method of claim 10, wherein the information for determining the area comprises at least one of an angle difference between a direction from the first electronic device toward the control node and an orientation of the first electronic device, the angle of view of the camera of the first electronic device, and the distance from the first electronic device to a subject.

12. The method of claim 10, further comprising:
    transmitting a request signal requesting participation in a data sharing group, to the second electronic device; and
    receiving a response signal notifying the group participation from the second electronic device.

13. The method of claim 12, wherein the request signal comprises at least one of validity period information of the group, resolution information supported by an electronic device transmitting the request signal, and compression type information supported by the electronic device which transmits the request signal.

14. The method of claim 12, wherein the response signal comprises at least one of resolution information requested by the first electronic device which transmits the response signal, compression type information requested by the first electronic device which transmits the response signal, and information notifying connection establishment acceptance.

15. An electronic device comprising:
    a camera comprising a lens and an image sensor;
    a transmitter;
    a receiver; and a processor operably connected to the camera, the transmitter, and the receiver, wherein the processor is configured to:

determine an area where at least one other electronic device to share data is located based on an angle of view of the camera and a distance from a subject, determine a beam set based on the angle view of the camera and the distance from the subject, transmit a scanning signal using the determined beam set for identifying the at least one other electronic device located in the area, receive, from the at least one other electronic device, a response signal corresponding to the scanning signal, the response signal including information on hardware/software capability and available resource status of the at least one other electronic device, and transmit, to the at least one other electronic device, the data to the at least one other electronic device in a specific format based on the hardware/software capability and the available resource status of the at least one other electronic device.

16. The electronic device of claim 15, wherein the processor is further configured to transmit one of:

the scanning signal using at least one beam having an orientation angle belonging to a range of the angle of view;

the scanning signal applying a maximum beamwidth and a minimum transmit power satisfying a required receive power according to the distance; or at least one of an angle difference between a direction toward a base station and an orientation of the electronic device, the angle of view, and the distance.

17. The electronic device of claim 15, wherein the scanning signal includes a message requesting to participate in a group for data sharing to the at least one other electronic device, wherein the response signal includes a message notifying participation of the data sharing group.

18. The electronic device of claim 15, wherein the processor is further configured to re-transmit the scanning signal, when a number of subjects is changed through an image input through the camera.

19. The electronic device of claim 15, wherein the processor is further configured to:

transmit a request signal for connection establishment with the at least one other electronic device; and receive a second response signal of the request signal.

20. The electronic device of claim 15, wherein the processor is further configured to transmit one of:

the data to the at least one other electronic device except an electronic device that is excluded by a user input among the at least one other electronic devices which transmit the response signal;

the data to the at least one other electronic device, before a validity period of a group comprising the at least one other electronic device is expired; or the data comprising contents processed in a format selected by the at least one other electronic device.

* * * * *